United States Patent
Kondo

(10) Patent No.: US 9,591,329 B2
(45) Date of Patent: Mar. 7, 2017

(54) IMAGE PROCESSING DEVICE AND METHOD FOR ENCODING AND DECODING IMAGE

(71) Applicant: SONY CORPORATION, Tokyo (JP)

(72) Inventor: Kenji Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/423,491

(22) PCT Filed: Sep. 19, 2013

(86) PCT No.: PCT/JP2013/075227
§ 371 (c)(1),
(2) Date: Feb. 24, 2015

(87) PCT Pub. No.: WO2014/050676
PCT Pub. Date: Apr. 3, 2014

(65) Prior Publication Data
US 2015/0189327 A1    Jul. 2, 2015

(30) Foreign Application Priority Data

Sep. 28, 2012 (JP) ................................ 2012-218305

(51) Int. Cl.
*G06K 9/36* (2006.01)
*H04N 19/61* (2014.01)
(Continued)

(52) U.S. Cl.
CPC ............ *H04N 19/61* (2014.11); *H04N 19/00* (2013.01); *H04N 19/124* (2014.11);
(Continued)

(58) Field of Classification Search
CPC .. H04N 19/124; H04N 19/176; H04N 19/157; H04N 19/18; H04N 19/61; H04N 19/126; H04N 19/159
See application file for complete search history.

(56) References Cited

U.S. PATENT DOCUMENTS

| | | | |
|---|---|---|---|
| 2014/0086311 A1* | 3/2014 | Lou .................. | H04N 19/00424 375/240.03 |
| 2015/0063446 A1* | 3/2015 | Sugio .................... | H04N 19/13 375/240.03 |
| 2015/0189289 A1* | 7/2015 | Kim ..................... | H04N 19/176 375/240.02 |

FOREIGN PATENT DOCUMENTS

| WO | WO2007/091588 A1 | 8/2007 |
|---|---|---|
| WO | WO2007/148619 A1 | 12/2007 |

OTHER PUBLICATIONS

Gabriellini, Andrea, et al. "Adaptive transform skipping for improved coding of motion compensated residuals." Signal Processing: Image Communication 28.3 (2013): 197-208.*

(Continued)

*Primary Examiner* — Li Liu
(74) *Attorney, Agent, or Firm* — Paratus Law Group, PLLC

(57) ABSTRACT

The present disclosure relates to an image processing device and method capable of suppressing a reduction in encoding efficiency. The image processing device includes a setting unit which, in decoding of encoded data where image data are encoded, in a case where a current block is a block on which an orthogonal transform process is skipped, sets a custom scaling list for the block on which the orthogonal transform process is skipped as a scaling list used for an inverse quantization process on the current block and a decoding unit which performs a decoding process including the inverse quantization process using the scaling list set by (Continued)

the setting unit and decodes the encoded data. The present disclosure may be applied to, for example, an image processing device.

16 Claims, 32 Drawing Sheets

(51) Int. Cl.
　　*H04N 19/00*　　　　(2014.01)
　　*H04N 19/124*　　　(2014.01)
　　*H04N 19/159*　　　(2014.01)
　　*H04N 19/176*　　　(2014.01)
　　*H04N 19/30*　　　　(2014.01)
(52) U.S. Cl.
　　CPC ......... *H04N 19/159* (2014.11); *H04N 19/176* (2014.11); *H04N 19/30* (2014.11)

(56) References Cited

OTHER PUBLICATIONS

Lan, et al., Intra transform skipping, Joint Collaborative Team on Video Coding (JCT-VC) of ITU-T SG 16 WP 3 and ISO/IEC JTC 1/SC 29/WG 11, Apr. 27-May 7, 2012, p. 1-11, Geneva, Switzerland.

Bross, et al., High efficiency video coding (HEVC) text specification draft 6, Joint Collaborative Team on Video Coding (JCT-VC) of ITU-T SG16 WP3 and ISO/IEC JTC1/SC29/WG11, Feb. 1-10, 2012, p. 1-249, San Jose, California.

Morigami, et al., On Transform Skipping, Joint Collaborative Team on Video Coding (JCT-VC) of ITU-T SG 16 WP 3 and ISO/IEC JTC 1/SC 29/WG 11, Jul. 11-20, 2012, p. 1-11, Stockholm, Sweden.

Lan, et al., Intra and inter coding tools for screen contents, Joint Collaborative Team on Video Coding (JCT-VC) of ITU-T SG16 WP3 and ISO/IEC JTC1/SC29/WG11, Mar. 16-23, 2011, p. 1-11, Geneva, Switzerland.

Narroschke, et al., Adaptive prediction error coding in spatial and frequency domain for H.264/AVC, ITU—Telecommunications Standardization Sector Study Group 16 Question 6 Video Coding Experts Group (VCEG), Jan. 16-20, 2006, p. 1-13, Bangkok, Thailand.

Lan, et al., CE5.f: Residual Scalar Quantization for HEVC, Joint Collaborative Team on Video Coding (JCT-VC) of ITU-T SG16 WP3 and ISO/IEC JTC1/SC29/WG11, Feb. 1-10, 2012, p. 1-7, San Jose, California.

Francois, et al., AHG11: Syntax harmonisation of the I_PCM and TransQuantBypass modes, Joint Collaborative Team on Video Coding (JCT-VC) of ITU-T SG 16 WP 3 and ISO/IEC JTC 1/SC 29/WG 11, Jul. 11-20, 2012, p. 1-7, Stockholm, Switzerland.

* cited by examiner

FIG. 3

| 16 | 16 | 16 | 16 |
|----|----|----|----|
| 16 | 16 | 16 | 16 |
| 16 | 16 | 16 | 16 |
| 16 | 16 | 16 | 16 |

FIG. 4

| 16 | 16 | 17 | 21 |
|----|----|----|----|
| 16 | 17 | 20 | 25 |
| 17 | 20 | 30 | 41 |
| 21 | 16 | 16 | 70 |

FIG. 5

| 16 | 16 | 16 | 14 |
|----|----|----|----|
| 16 | 16 | 16 | 14 |
| 16 | 16 | 16 | 14 |
| 14 | 14 | 14 | 14 |

FIG. 6

| 16 | 16 | 16 | 14 |
|----|----|----|----|
| 16 | 16 | 16 | 14 |
| 16 | 16 | 16 | 14 |
| 14 | 14 | 14 | 12 |

FIG. 7

| 18 | 18 | 18 | 16 |
|----|----|----|----|
| 18 | 18 | 18 | 16 |
| 18 | 18 | 18 | 16 |
| 16 | 16 | 16 | 16 |

FIG. 16

| 16 | 16 | 16 | 14 |
|----|----|----|----|
| 16 | 16 | 16 | 14 |
| 16 | 16 | 16 | 14 |
| 16 | 16 | 16 | 14 |

FIG. 17

| 16 | 16 | 16 | 16 |
|----|----|----|----|
| 16 | 16 | 16 | 16 |
| 16 | 16 | 16 | 16 |
| 14 | 14 | 14 | 14 |

IMAGE PROCESSING DEVICE AND METHOD FOR ENCODING AND DECODING IMAGE

CROSS REFERENCE TO PRIOR APPLICATION

This application is a National Stage Patent Application of PCT International Patent Application No. PCT/JP2013/075227 (filed on Sep. 19, 2013) under 35 U.S.C. §371, which claims priority to Japanese Patent Application No. 2012-218305 (filed on Sep. 28, 2012), which are all hereby incorporated by reference in their entirety.

TECHNICAL FIELD

The present disclosure relates to an image processing device and method, and particularly, to an image processing device and method capable of suppressing an increase in quantization error.

BACKGROUND ART

Recently, a device which treats image information as digital and compresses and encodes an image by using redundancy unique to the image information for the purpose of highly efficient information transmission and accumulation and by employing an encoding scheme where compression is performed through orthogonal transform such as discrete cosine transform and motion compensation. As the encoding scheme, there are, for example, MPEG (Moving Picture Experts Group), and the like.

Particularly, MPEG2 (ISO/IEC 13818-2) is defined as a general-purpose image encoding scheme and is a standard which covers both of an interlaced scanning image and an progressive scanning image, a standard-resolution image, and a high-definition image. For example, currently, the MPEG2 has been widely used in a wide range of applications for professional purposes and consumer purposes. By using the MPEG2 compression scheme, in the case of a standard-resolution interlaced scanning image having, for example, 720×480 pixels, a code amount (bit rate) of 4 to 8 Mbps can be allocated. In addition, by using the MPEG2 compression scheme, in the cased of a high-resolution interlaced scanning image having, for example, 1920×1088 pixels, a code amount (bit rate) of 18 to 22 Mbps can be allocated. Accordingly, it is possible to realize a high compression ratio and a good image quality.

The MPEG2 is mainly intended for high image quality encoding suitable for broadcasting, but it does not cope with an encoding scheme for a higher code amount (bit rate) than that of MPEG 1, that is, for a higher compression ratio. With the spread of mobile terminals, demands for such encoding scheme are considered to be increased in the figure, and thus, an MPEG4 encoding scheme was standardized for coping with this. With respect to the image encoding scheme, the standard was approved as International Standard ISO/IEC 14496-2 in December, 1998.

In addition, recent years, originally for the purpose of image encoding for TV conferencing, standardization of H.26L (ITU-T (International Telecommunication Union Telecommunication Standardization Sector) Q6/16 VCEG (Video Coding Expert Group)) has proceeded. It is known that, in comparison to the encoding scheme such as MPEG2 or MPEG4 in the related art, the H.26L requires a large calculation amount by the encoding and the decoding, but a higher encoding efficiency is realized. In addition, at present, as a part of activities of MPEG4, standardization which is based on the H.26L and incorporates a function which is not supported by the H.26L so as to realize a higher encoding efficiency has proceeded as Joint Model of Enhanced-Compression Video Coding.

As a schedule of the standardization, in March, 2003, International standard was made on the basis is of the name of H.264 and MPEG-4 Part 10 (Advanced Video Coding, hereinafter, referred to as AVC).

Furthermore, as an extension of the H.264/AVC, the standardization of EExt (Fidelity Range Extension) including encoding tools necessary for business such as RGB, 4:2:2, or 4:4:4, 8×8 DCT or quantization matrices defined by MPEG-2 was completed in February, 2005. Accordingly, by using the H.264/AVC, an encoding scheme capable of representing even film noise included in a movie well, so that it is used in a wide range of applications such as Blu-Ray Disc (trade mark) in progress.

However, in recent years, demands for much higher compression ratio encoding desired to compress an image of about 4000×2000 pixels which is four times the resolution of a high-definition image or desired to deliver a high-definition image in an environment of a limited transmission capacity such as the internet have been increased. Therefore, in the aforementioned VCEG of the ITU-T, studies on the improvement of the encoding efficiency have continued to be made.

Therefore, at present, for the purpose of improving the encoding efficiency further than the AVC, JCTVC (Joint Collaboration Team-Video Coding) which is a joint standardization organization of the ITU-T and ISO/IEC has proceeds standardization of an encoding scheme called HEVC (High Efficiency Video Coding). With respect to the HEVC standard, a committee draft, as a first draft of specifications was issued in February, 2012 (for example, refer to Non-Patent Document 1).

In the HEVC standard disclosed in Non-Patent Document 1, a scheme which is referred to as "intra Transform Skipping" is employed (for example, refer to Non-Patent Document 2).

Namely, first, a flag in a PPS (picture parameter set) as to whether to apply transform skip (sometimes, referred as orthogonal transform skip) to the picture is transmitted. The orthogonal transform skip denotes that an orthogonal transform process/inverse orthogonal transform process is skipped (omitted).

When the value is 1, the orthogonal transform skip can be applied to 4×4 orthogonal transform blocks (TU). For each block, a flag on on/off of the orthogonal transform skip is transmitted. With respect to the block to which the orthogonal transform skip is applied, there is no change into processes such as entropy encoding, quantization, and loop filtering.

In other words, for the block to which the orthogonal transform skip is applied, the orthogonal transform/inverse orthogonal transform is not performed, but the encoding or the decoding is performed. For example, a before-orthogonal-transform difference value is quantized and lossless-encoded. In the case of decoding the encoded data obtained in this manner, as a matter of course, the inverse orthogonal transform process is not required.

The orthogonal transform skip is particularly effective in improving an image quality of CG images or screen content such as captions.

CITATION LIST

Non-Patent Document

Non-Patent Document 1: Benjamin Bross, Woo-Jin Han, Jens-Rainer Ohm, Gary J. Sullivan, Thomas Wiegand, "High efficiency video coding (HEVC) text specification draft 6", JCTVC-H1003 ver21, Joint Collaborative Team on Video Coding (JCT-VC) of ITU-T SG16 WP3 and ISO/IEC JTC1/SC29/WG11 7th Meeting: Geneva, CH, 21-30 Nov. 2011

Non-Patent Document 2: Cuiling Lan, Jizheng Xu, Gary J. Sullivan, Feng Wu, "Intra transform skipping", JCTVC-I0408, Joint Collaborative Team on Video Coding (JCT-VC) of ITU-T SG16 WP3 and ISO/IEC JTC1/SC29/WG11 9th Meeting: Geneva, CH, 27 Apr.-7 May 2012

SUMMARY OF THE INVENTION

Problems to be Solved by the Invention

A case where the orthogonal transform process is skipped and a case where the orthogonal transform process is performed are different in terms of a coefficient of quantization. However, in the method of the related art, the influence of the orthogonal transform skip on the quantization is not taken into consideration. Therefore, there is a risk in that a scaling list used for a quantization process is not appropriate and quantization error is unnecessarily increased.

The present disclosure is made by taking into consideration the above-described situations and is to suppress an increase in quantization error.

Solutions to Problems

According to an aspect of the present technique, there is provided an image processing device including: a setting unit which, in decoding of encoded data where image data are encoded, in a case where a current block is a block on which an orthogonal transform process is skipped, sets a custom scaling list for the block on which the orthogonal transform process is skipped as a scaling list used for an inverse quantization process on the current block; and a decoding unit which performs a decoding process including the inverse quantization process using the scaling list set by the setting unit and decodes the encoded data.

The custom scaling list may be configured so that a quantization step of a portion corresponding to a pixel which has a possibility to be referred to in intra prediction is smaller than a quantization step of a portion corresponding to a pixel which has no possibility to be referred to in the intra prediction.

The custom scaling list is configured so that the quantization step of the portion corresponding to the pixel which has a possibility to be referred to in the intra prediction is set to be smaller than a value in the case of a default custom scaling list or so that the quantization step of the portion corresponding to the pixel which has no possibility to be referred to in the intra prediction is set to be larger than the value in the case of the default custom scaling list.

Each quantization step of the portion corresponding to the pixel which has a possibility to be referred to in the intra prediction of the custom scaling list may have a value according to the level of the possibility that the corresponding pixel is referred to in the intra prediction.

In a case where the current block is a block on which the orthogonal transform process is not skipped, the setting unit may be set a default scaling list where all values of quantization steps are the same or a quantization step of a pixel corresponding to a high frequency component has a large value as the scaling list used for the inverse quantization process on the current block.

The image processing device may further include an end detection unit which detects an end of a reference available range in the intra prediction, and in a case where the current block is a block in the end of the reference available range detected by the end detection unit, the setting unit may set the custom scaling list according to a position of the end of the reference available range as the scaling list used for the inverse quantization process on the current block.

The image processing device may further include a reception unit which receives information on the skip of the orthogonal transform process and a determination unit which determines based on the information on the skip of the orthogonal transform process which received by the reception unit whether or not the current block is the block on which the orthogonal transform process is skipped, and in a case where it is determined by the determination unit that the current block is the block on which the orthogonal transform process is skipped, the setting unit may set the custom scaling list as the scaling list used for the inverse quantization process on the current block.

In a case where a value of skip enabling information which is included in the information on the skip of the orthogonal transform process and indicates as to whether to enable the skip of the orthogonal transform process in a picture is false, the determination unit may disable the skip of the orthogonal transform process in the picture.

The determination unit may further determine a slice type of the current block, and in a case where it is determined by the determination unit that the current block is the block on which the orthogonal transform process is skipped and the current slice is a slice on which only the intra prediction is performed, the setting unit may set the custom scaling list as the scaling list used for the inverse quantization process on the current block.

According to an aspect of the present technique, there is provided an image processing method of an image processing device, including the image processing device, in decoding of encoded data where image data are encoded, in a case where a current block is a block on which an orthogonal transform process is skipped, setting a custom scaling list for the block on which the orthogonal transform process is skipped as a scaling list used for an inverse quantization process on the current block and performing a decoding process including the inverse quantization process using the set scaling list and decoding the encoded data.

According to another aspect of the present technique, there is provided an image processing device including a setting unit which, in encoding of image data, in a case where an orthogonal transform process on a current block is skipped, sets a custom scaling list for a block on which the orthogonal transform process is skipped as a scaling list used for a quantization process on the current block and an encoding unit which performs an encoding process including the quantization process using the scaling list set by the setting unit and encodes the image data.

The custom scaling list may be configured so that a quantization step of a portion corresponding to a pixel which has a possibility to be referred to in intra prediction is smaller than a quantization step of a portion corresponding to a pixel which has no possibility to be referred to in the intra prediction.

The custom scaling list may be configured so that the quantization step of the portion corresponding to the pixel which has a possibility to be referred to in the intra prediction is smaller than a value in the case of a default custom scaling list or so that the quantization step of the portion corresponding to the pixel which has no possibility to be referred to in the intra prediction is larger than the value in the case of the default custom scaling list.

Each quantization step of the portion corresponding to the pixel which has a possibility to be referred to in the intra prediction of the custom scaling list may have a value according to the level of the possibility that the corresponding pixel is referred to in the intra prediction.

In a case where the current block is a block on which the orthogonal transform process is not skipped, the setting unit may set a default scaling list where all values of quantization steps are the same or a quantization step of a pixel corresponding to a high frequency component has a large value as the scaling list used for the quantization process on the current block.

The image processing device may further include an end detection unit which detects an end of a reference available range in the intra prediction, and in a case where the current block is a block in the end of the reference available range detected by the end detection unit, the setting unit may set the custom scaling list according to a position of the end of the reference available range as the scaling list used for the quantization process on the current block.

The image processing device may further include a determination unit which determines based on the information on the skip of the orthogonal transform process whether or not the orthogonal transform process on the current block is skipped, and in a case where it is determined by the determination unit that the orthogonal transform process on the current block is skipped, the setting unit may set the custom scaling list as the scaling list used for the quantization process on the current block.

In a case where a value of skip enabling information which is included in the information on the skip of the orthogonal transform process and indicates as to whether to enable the skip of the orthogonal transform process in a picture is false, the determination unit may disable the skip of the orthogonal transform process in the picture.

The determination unit may further determine a slice type of the current block, and in a case where it is determined by the determination unit that the current block is the block on which the orthogonal transform process is skipped and the current slice is a slice on which only the intra prediction is performed, the setting unit may set the custom scaling list as the scaling list used for the quantization process on the current block.

According to another aspect of the present technique, there is provided an image processing method of an image processing device, including the image processing device, in encoding of image data, in a case where an orthogonal transform process on a current block is skipped, setting a custom scaling list for a block on which the orthogonal transform process is skipped as a scaling list used for a quantization process on the current block and performing an encoding process including the quantization process using the set scaling list and encoding the image data.

According to an aspect of the present technique, in decoding of encoded data where image data are encoded, in a case where a current block is a block on which an orthogonal transform process is skipped, a custom scaling list for the block on which the orthogonal transform process is skipped is set as a scaling list used for inverse quantization process on the current block, a decoding process including an inverse quantization process using the scaling list is performed, and the encoded data are decoded.

According to an aspect of the present technique, in encoding of image data, in a case where an orthogonal transform process of a current block is skipped, a custom scaling list for a block on which the orthogonal transform process is skipped as a scaling list used for a quantization process on the current block, an encoding process including the quantization process using the set scaling list, and the image data are encoded.

Effects of the Invention

According to the present disclosure, it is possible to encode/decode an image. Particularly, it is possible to suppress an increase in quantization error.

BRIEF DESCRIPTION OF DRAWINGS

FIG. 3 is a diagram illustrating an example of a default scaling list.

FIG. 4 is a diagram illustrating another example of the default scaling list.

FIG. 5 is a diagram illustrating an example of a custom scaling list.

FIG. 6 is a diagram illustrating another example of the custom scaling list.

FIG. 7 is a diagram illustrating still another example of the custom scaling list.

FIG. 16 is a diagram illustrating still another example of the custom scaling list.

FIG. 17 is a diagram illustrating still another example of the custom scaling list.

MODE FOR CARRYING OUT THE INVENTION

Hereinafter, modes for carrying out the present disclosure (hereinafter, referred to as embodiments) will be described. The description will be made in the following order.

0. Overview
1. First Embodiment (Image Encoding Device)
2. Second Embodiment (Image Decoding Device)
3. Third Embodiment (Image Encoding Device)
4. Fourth Embodiment (Image Decoding Device)
5. Fifth Embodiment (Multi-View Image Encoding/Multi-View Image Decoding Device)
6. Sixth Embodiment (Hierarchical Image Encoding/Hierarchical Image Decoding Device)
7. Seventh Embodiment (Computer)
8. Application Example
9. Application Example of Scalable Encoding 0. Overview Encoding Scheme Hereinafter, the present disclosure will be described as an example of being applied to image encoding/decoding of an HEVC (High Efficiency Video Coding) scheme.

[Coding Unit]

In an AVC (Advanced Video Coding) scheme, a hierarchical structure according to a macroblock and a sub-macroblock is defined. However, the macroblock of 16 pixels×16 pixels is not optimal to a large image frame called UHD (Ultra High Definition; 4000 pixels×2000 pixels) which is to be an object of a next-generation encoding scheme.

Figure 1:
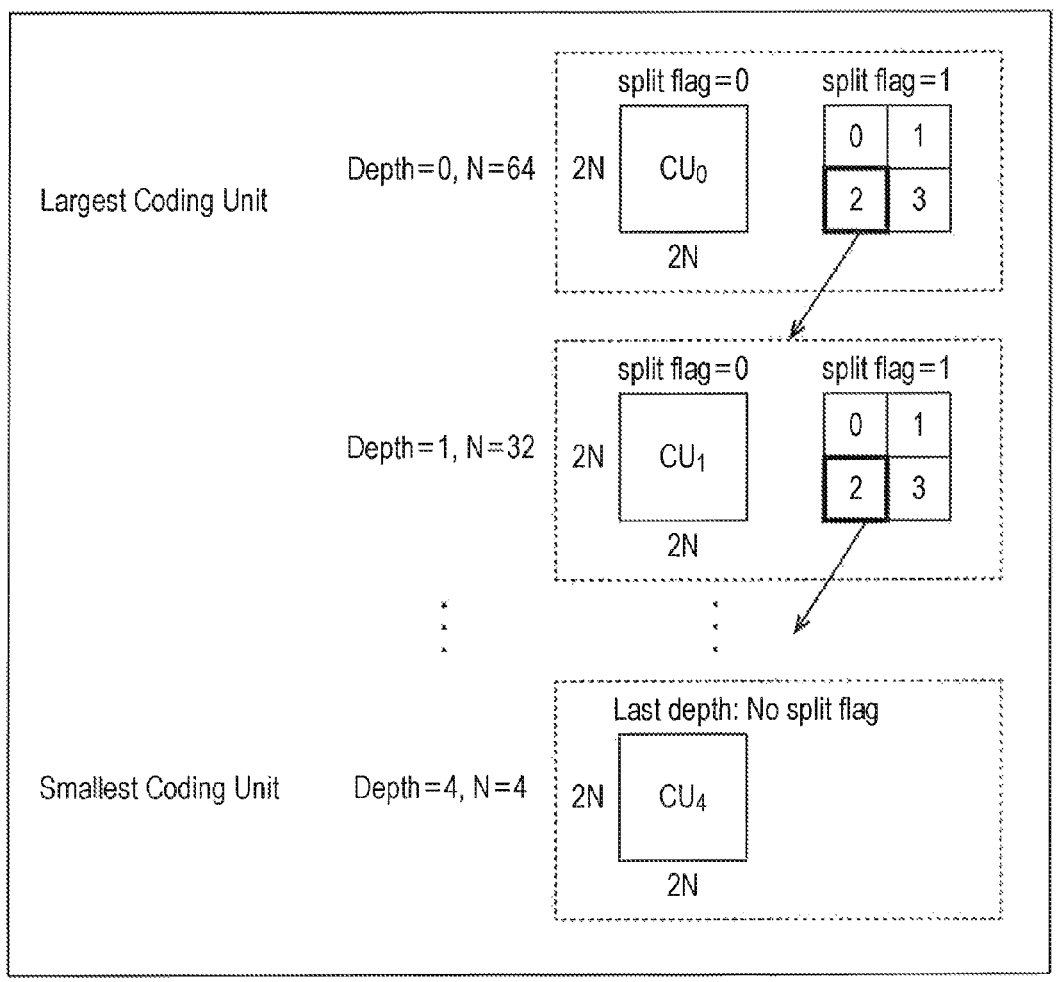
FIG. 1 is a diagram illustrating an example of a configuration of a coding unit.

On the contrary, in the HEVC scheme, as illustrated in FIG. 1, a coding unit (CU) is defined.

The CU is a partial area of image in units of a picture, which is called a coding tree block (CTB) and has the same functions as the macroblock in the AVC scheme. In the latter, the size is fixed to 1.6×16 pixels. However, in the former, the size is not fixed, but in each sequence, the size is specified in the image compression information.

For example, the largest size (LCU (Largest Coding Unit)) and smallest size (SCU (Smallest Coding Unit)) of the CU are defined in a sequence parameter set (SPS) included in the encoded data which are to be output.

In each LCU, within a range which is not less than the size of the SCU, by setting split-flag=1, the CU can be split into CUs having a smaller size. In the example of FIG. 1, the size of the LCU is 128, and the maximum hierarchical depth is 5. When a value of split_flag is "1", the CU having a size of 2N×2N is split into CUs having a size of N×N which is a layer located below by one level.

In addition, the CU is split into prediction units (PUs) which are areas (partial areas of a picture-unit image) as process units of intra prediction or inter prediction or is split into transform units (TUs) which are areas (partial areas of the picture-unit image) as process units of orthogonal transform. At present, in the HEVC scheme, 16×16 and 32×32 orthogonal transforms are available in addition to 4×4 and 8×8 orthogonal transforms.

Like the above-described HEVC scheme, in the case of the encoding scheme where the CU is defined and various processes are performed in units of the CU, it may be considered that a macroblock in the AVC scheme corresponds to the LCU and a block (subblock) corresponds to the CU. In addition, it may be considered that a motion compensation block in the AVC scheme corresponds to the PU. However, since the CU has a hierarchical structure, the size of the LCU of the highest layer is generally set to be larger than the macroblock of the AVC scheme, for example, 128×128 pixels.

Therefore, hereinafter, it is assumed that the LCU includes the macroblock of the AVC scheme and the CU includes the block (subblock) of the AVC scheme. In other words, the term "block" used in the description hereinafter represents an arbitrary partial area in a picture, but the size, shape, characteristics, and the like thereof are not limited. Namely, a "block" includes an arbitrary area (process unit), for example, a TU, a PU, an SCU, a CU, an LCU, a subblock, a macroblock, a slice, or the like. Of course, other partial areas (process units) are also included. In a case where there is a need to limit size, process unit, or the like, the description thereof will be appropriately made.

[Mode Selection]

In the AVC and HEVC encoding schemes, in order to achieve much higher encoding efficiency, it is important to select an appropriate prediction mode.

As an example of such a selection scheme, there is a method mounted on reference software called JM (Joint Model) (publicized in http://iphome.hhi.de/suehring/tml/index.htm) of the H.264/MPEG-4 AVC.

In the JM, two mode determination methods of a high complexity mode and a low complexity mode described below can be selected. In any one of the method, a cost function value on each prediction mode is calculated, and the prediction mode where the cost function value is minimized is selected as an optimal mode for the associated block or macroblock.

A cost function in the high complexity mode is expressed by the following Equation (1).

$$\text{Cost(Mode} \in \Omega) = D + \lambda * R \quad (1)$$

Herein, $\Omega$ denotes an entire set of candidate modes for encoding the associated block or macroblock, and D denotes differential energy of a decoded image and an input image in the case of encoding in the associated prediction mode. $\lambda$ denotes a Lagrange undetermined multiplier which is given as a function of a quantization parameter. R denotes a total code amount including orthogonal transform coefficients in the case of encoding in the associated mode.

Namely, in the case of encoding in the high complexity mode, in order to calculate the above-described parameters D and R, there is a need to perform a provisional encoding process by all candidate modes once, and thus, much larger calculation amount is required.

A cost function in the low complexity mode is expressed by the following Equation (2).

$$\text{Cost}(Mode \in \Omega) = D + QP2 \, \text{Quant}(QP) * \text{HeaderBit} \qquad (2)$$

Herein, unlike the case of the high complexity mode, D denotes differential energy of a predicted image and an input image. QP2 Quant (QP) is given as a function of a quantization parameter QP, and HeaderBit denotes a code amount on information included in Header called a motion vector or a mode which does not including the orthogonal transform coefficients.

Namely, in the low complexity mode, there is a need to perform a prediction process on each candidate mode, but since a decoded image is not required, there is no need to perform the encoding process. Therefore, the low complexity mode can be realized with a lower calculation amount than the high complexity mode.

[Intra Prediction]

In the related art, as a method of generating a predicted image in the encoding or decoding, there is intra prediction where prediction is performed by using other pixels in a screen.

In the intra prediction, multiple modes are prepared as intra prediction modes, pixels at positions according to the modes in the vicinity of a current block as a process target are referred to, and the prediction of the current block is performed by using the pixel values. The pixels used in the intra prediction are referred to as reference pixels. In addition, as the reference pixels, encoding-completed pixels which are processed previously are employed.

Figure 2:
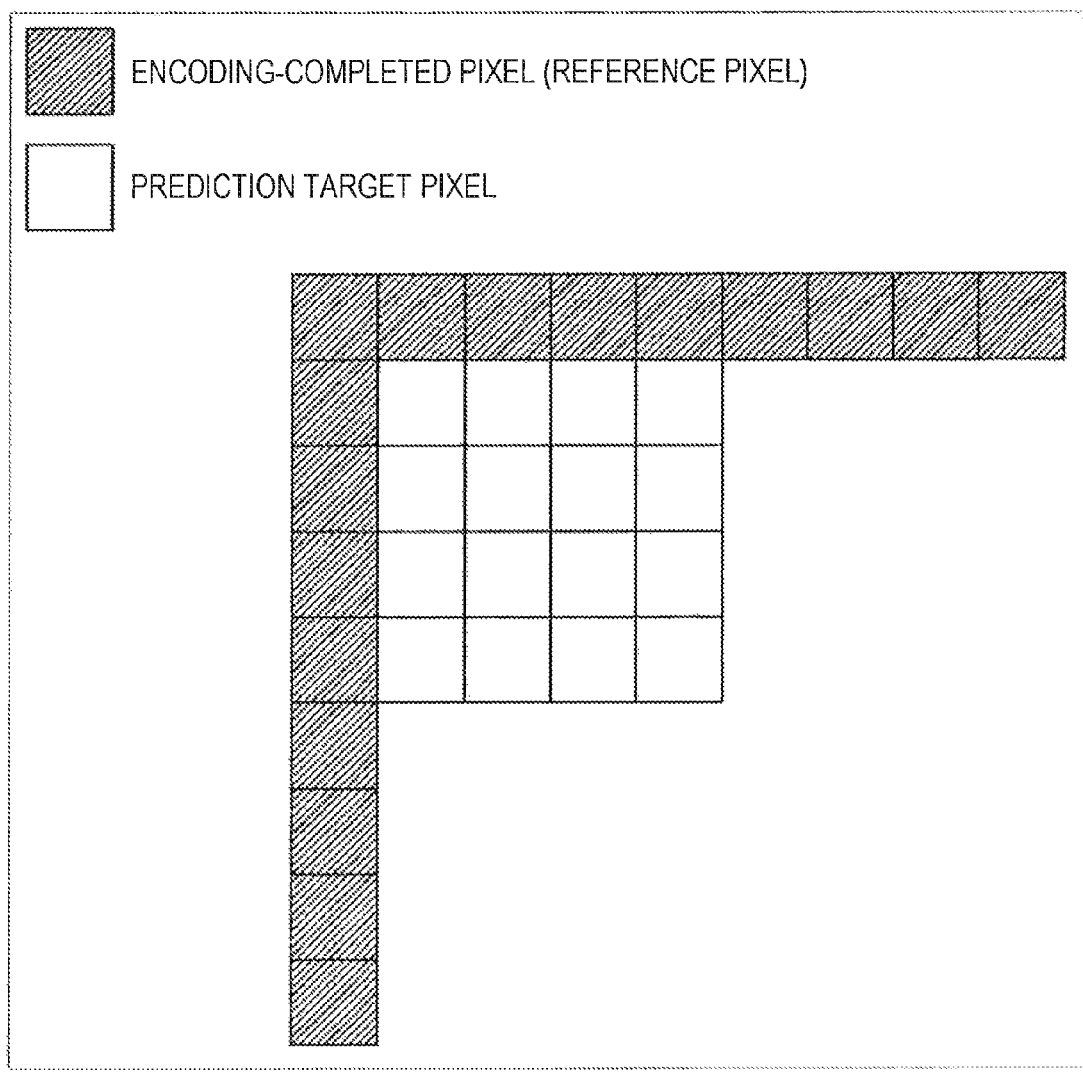
FIG. 2 is a diagram illustrating an example of reference pixels for intra prediction.

An example of positions of the reference pixels is illustrated in FIG. 2. In FIG. 2, white squares indicate the pixels of the current block (prediction target pixels), and squares with slanted lines in the vicinity thereof indicate the reference pixels as the encoding-completed pixels. In other words, the prediction of the current block is performed by using the pixel values of the pixels corresponding to the intra prediction mode among the pixels indicated by the squares with the slanted lines.

[Quantization]

In the case of the encoding scheme such AVC or HEVC, in order to improve the encoding efficiency, orthogonal-transformed coefficients are quantized. Next, the obtained quantized coefficients are lossless-encoded. Therefore, in the decoding process, quantized coefficient obtained from the encoded data by lossless decoding are inverse-quantized.

The quantization/inverse quantization is performed by using a predetermined scaling list, for example, for each unit block (for example, TU) of the orthogonal transform process. The scaling list is information collecting quantization steps corresponding to the respective pixels of the associated block. In the quantization/inverse quantization, for example, a default scaling list which is prepared in advance is used.

Examples of the default scaling list having a size of 4 pixels×4 pixels are illustrated in FIG. 3 and FIG. 4. In the case of the example of FIG. 3, values of all the 4×4 quantization steps equal to each other. In addition, in the case of the example of FIG. 4, among the 4×4 quantization steps, the value of the lower right quantization step is relatively large. In the encoding such as HEVC or AVC, the pixel values are orthogonal-transformed to be quantized. In other words, the quantization is performed on the orthogonal transform coefficient. Therefore, in the case of the default scaling list of the example of FIG. 4, the quantization is performed on larger quantization steps so as to reduce a code amount of high frequency components (orthogonal transform coefficient) in comparison to that of the current block.

[Orthogonal Transform Skip]

In the HEVC standard, a scheme "Intra Transform Skipping" proposed Non-Patent Document 2 is employed. An orthogonal transform skip (Transform Skip) is a scheme of omitting (skipping) an orthogonal transform process or an inverse orthogonal transform process.

In general, the orthogonal transform process is performed for each block on image data (differential image data) to convert information on the spatial domain in the block into information on the frequency domain, so that the coefficients in the block are configured to be concentrated on a low frequency region, and thus, it is possible to increase deflection. Accordingly, the encoding efficiency is improved.

However, it may be considered that there is a case where such deflection hardly occurs depending on a pattern in the block. For example, in the case of an artificial image such as a CG image or a caption, in comparison to a natural image, gradation, or intense edge easily occurs. Therefore, high frequency components easily occur, and even though the orthogonal transform process is performed, the deflection hardly occurs. Therefore, with respect to such a block, the skipping of the orthogonal transform process is configured to be enabled, so that it is possible to further improve the encoding efficiency.

[Custom Scaling List]

If the orthogonal transform skip described above is applied, instead of the orthogonal transform coefficients, before-orthogonal-transform pixels values are quantized. However, in the quantization/inverse quantization of the related art, measures to the orthogonal transform skip were not considered. Therefore, even the before-orthogonal-transform pixels values were quantized/inverse-quantized by using the same scaling list as that in the case of the orthogonal transform coefficients.

However, since the scaling list is used for the orthogonal transform coefficients, the scaling list is not optimized for the before-orthogonal-transform pixels values. Therefore, there is a risk in that the quantization error may be unnecessarily increased.

Therefore, in a case where the orthogonal transform process/inverse orthogonal transform process on the current block is skipped in the encoding of the image data, a custom scaling list more suitable for the quantization/inverse quantization of the before-orthogonal-transform pixels values is set as the scaling list used for the quantization process on the current block.

In the quantization/inverse quantization of the before-orthogonal-transform pixels values, instead of the default scaling list of the related art which is suitable for the quantization/inverse quantization of the orthogonal transform coefficient, the custom scaling list is used, so that it is possible to suppress an increase in quantization error.

Particularly, in the intra prediction, the reference pixels in the vicinity of the current block are used to generate multiple pixels of the predicted image. Therefore, there was a risk in that the quantization error included in the pixel values of the reference pixels are spread to the larger number of pixels than those of the predicted image by the intra prediction. Therefore, there was a risk in that the prediction accuracy of the intra prediction is greatly lowered, the encoding efficiency is decreased, and deterioration in image quality caused by the encoding or decoding is increased.

Therefore, in the custom scaling list, the values of the quantization steps may be set so that the prediction accuracy of the intra prediction is not lowered by the quantization error, that is, so that the quantization error included in the pixel values of the pixels in the block which have a possibility to be referred to in the intra prediction is decreased.

Furthermore, if the values of all the quantization steps of the scaling list are set to be small, the code amount is unnecessarily increased; there is a risk in that the encoding efficiency is reduced. Therefore, in the custom scaling list, the value of the quantization step corresponding to the pixel which has a possibility to be referred to in the intra prediction is set so as to be smaller than the value of the quantization step corresponding to the pixel which has no possibility to be referred to in the intra prediction.

By doing in this manner, in the block where the orthogonal transform process and the inverse orthogonal transform process are skipped, in comparison to the case of performing the quantization/inverse quantization by using the default scaling list, in the case of performing the quantization/inverse quantization by using the custom scaling list, it is possible to decrease the quantization error included in the predicted image, to improve the encoding efficiency, and to reduce a deterioration in image quality caused by the encoding or decoding.

An example of the custom scaling list is illustrated in FIG. 5. It is assumed that the scaling list illustrated in FIG. 5 corresponds to the example of the default scaling list illustrated in of FIG. 3. Namely, in the custom scaling list of the example of FIG. 5, the quantization steps corresponding to the pixels which have a possibility to be referred to in the intra prediction (quantization steps of the right end and the lower end of the block) illustrated by the pattern with the slanted lines are set to be smaller than those in the case of the default scaling list. In addition, other quantization steps (quantization steps corresponding to the pixels which have no possibility to be referred to in the intra prediction) indicated by white squares remain in the default scaling list.

In this manner, only the values of the quantization steps corresponding to the pixels which have a possibility to be referred to in the intra prediction are configured to be reduced, so that it is possible to decrease the quantization error included in the predicted image. In addition, it is possible to suppress an unnecessary increase in code amount, and is possible to further suppress a reduction in encoding efficiency.

In addition, instead of the default scaling list of the example of FIG. 4, the custom scaling list of FIG. 5 may be used. Namely, in the custom scaling list, the value of the quantization step corresponding to the pixel which has no possibility to be referred to in the intra prediction may not be uniform like the example of FIG. 5.

Similarly, in the custom scaling list, the value of the quantization step corresponding to the pixel which has a possibility to be referred to in the intra prediction may not be uniform like the example of FIG. 5.

For example, each quantization step of the portion corresponding to the pixel which has a possibility to be referred to in the intra prediction may be configured to have the value according to the level of the possibility that the corresponding pixel is referred to in the intra prediction.

An example of the custom scaling list is illustrated in FIG. 6. The custom scaling list illustrated in FIG. 6 is set so that the value of the quantization step at the lower right corner is much smaller. The pixel corresponding to the quantization step has a possibility to be referred to in the intra prediction of many blocks such a block at the left side of or below the associated block. In other words, it may be stated that the associated quantization step has higher possibility to be referred to than other quantization steps.

The values of the quantization steps corresponding to the pixels having a high possibility to be referred to are configured to be smaller (according to the level of the possibility), so that it is possible to more efficiently decrease the quantization error included in the predicted image. Therefore, while suppressing an unnecessary increase in code amount, it is possible to further suppress a reduction in encoding efficiency.

In addition, in such a custom scaling list, it is important that the value of the quantization step corresponding to the pixel which has a possibility to be referred to in the intra prediction is smaller than the value of the quantization step corresponding to the pixel which has no possibility to be referred to in the intra prediction, and the specific value is arbitrary and may be set to an appropriate value according to an actual code amount or the like.

In other words, instead of setting the value of the quantization step corresponding to the pixel which has a possibility to be referred to in the intra prediction to be small, the value of the quantization step corresponding to the pixel which has no possibility to be referred to in the intra prediction may be set to be large.

Figure 7:
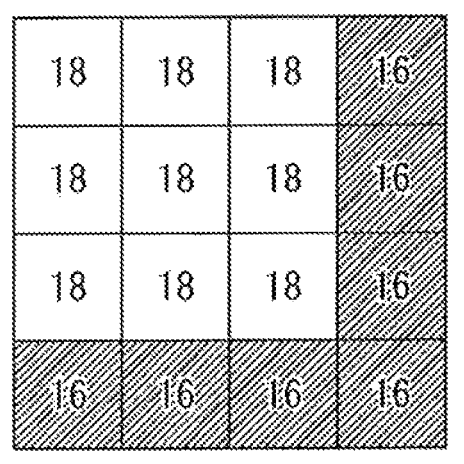

For example, like the example of the custom scaling list illustrated in FIG. 7, the quantization step of the portion corresponding to the pixel which has no possibility to be referred to in the intra prediction may be set to be larger than the value in the case of the default custom scaling list.

For example, in a case where there is no room for increasing the code amount, such a custom scaling list of the example of FIG. 7 is configured to be applied, so that in comparison to the case of using the default scaling list, while decreasing the code amount, it is possible to suppress an increase in quantization error included in the predicted image.

[Generation of Custom Scaling List]

Furthermore, such a custom scaling list may be prepared in advance or be configured to be appropriately generated. In the case of preparing in advance, an arbitrary number of the custom scaling lists may be prepared.

In addition, the used custom scaling list may be configured to be transmitted from the encoding side to the decoding side. For example, in a sequence parameter set, a picture parameter set, or the like, the custom scaling list may be configured to be transmitted. In addition, the custom scaling list may be configured to be transmitted as data other than the encoded data.

In addition, in the decoding side, the used custom scaling list may be configured to be set (selected or generated) by the same process as that of the encoding side. In this case, the transmission of the custom scaling list is unnecessary.

Furthermore, it may be determined based on the information on the orthogonal transform skip of the current block whether the custom scaling list is applied or the default scaling list is applied to the quantization/inverse quantization on the current block which is a process target.

[Information on Orthogonal Transform Skip]

The information on the orthogonal transform skip includes, for example, skip enabling information (transform_ skip_enable_flag) representing whether the orthogonal transform skip (Transform Skip) is enabled or disabled with respect to a predetermined range and skip identifying information (transform_skip_flag) representing whether or not the orthogonal transform skip is applied to the current block.

The skip enabling information (transform_skip_enable_flag) is information representing whether the orthogonal transform skip (Transform Skip) is enabled or disabled with respect to each of the ranges which are larger than the unit of the orthogonal transform process. For example, in a case where the value of the skip enabling information (transform_ skip_enable_flag) is false (for example, "0"), with respect to the block of the range corresponding to the associated value, the orthogonal transform skip (Transform Skip) is disabled (orthogonal transform process/inverse orthogonal transform process are necessarily performed).

In addition, for example, in a case where the value of the skip enabling information (transform_skip_enable_flag) is true (for example, "1"), with respect to the block of the range corresponding to the associated value, the orthogonal transform skip (Transform Skip) is enabled (orthogonal transform process/inverse orthogonal transform process may be skipped).

The skip enabling information (transform_skip_enable_flag) is set by, for example, a user or the like. The skip enabling information (transform skip_enable_flag) is set, for example, for each picture and is transmitted in the picture parameter set (PPS) or the like.

In a case where the value of the skip enabling information (transform skip_enable_flag) is true (for example, "1"), the orthogonal transform skip (Transform Skip) may be applied to the block (TU) having a predetermined size (for example, 4×4 size). In this case, in each block (TU) having a predetermined size (for example, 4×4 size), the skip identifying information (transform_skip_flag) is transmitted.

The skip identifying information (transform_skip_flag) is information representing whether or not the orthogonal transform skip is performed on the current block (TU) which is a process target during the encoding. In a case where this value is false (for example, "0"), the orthogonal transform skip (Transform Skip) is not performed on the current block (orthogonal transform process is performed). Namely, at the decoding side, in a case where the value of the skip identifying information (transform_skip_flag) is false (for example, "0"), the inverse orthogonal transform process is performed on the current block.

On the contrary, the value is true (for example, "1"), the orthogonal transform skip (Transform Skip) is performed on the current block (orthogonal transform process is not performed). Namely, at the decoding side, in a case where the value of the skip identifying information (transform_skip_flag) is true (for example, "1"), the inverse orthogonal transform process on the current block is skipped (omitted).

As described above, it can be determined based on the skip enabling information (transform_skip_enable_flag) and the skip identifying information (transform_skip_flag) whether or not the orthogonal transform process on the current block is skipped. Therefore, it may also be determined based on the above value whether or not the custom scaling list is applied. Namely, in a case where it is determined based on the skip enabling information (transform_ skip_enable_flag) and the skip identifying information (transform_skip_flag) that the orthogonal transform process/inverse orthogonal transform process on the current block is skipped, the custom scaling list may be configured to be applied, and in other cases, the default scaling list may be configured to be applied.

Furthermore, it may be determined based on only the skip enabling information (transform_skip_enable_flag) whether or not the custom scaling list is applied. For example, in a case where the value of the skip enabling information (transform_skip_enable_flag) is true (for example, "i"), the orthogonal transform process/inverse orthogonal transform process on the current block is configured to be skipped, so that the custom scaling list is applied. In a case where the value is false (for example, "0"), the orthogonal transform process/inverse orthogonal transform process on the current block is not configured to be skipped, so that the default scaling list is applied.

In other words, the value of the skip enabling information (transform_skip_enable_flag) is configured to be false (for example, 0), so that the application of the custom scaling list may be configured to be prohibited.

Furthermore, as an additional remark, the size of the block to which the custom scaling list can be applied is limited to a predetermined size (for example, 4×4 size) of which orthogonal transform skip is available. In a case where the skip identifying information (transform_skip_flag) is not referred to, it is preferable that this limitation be also considered.

Furthermore, in a case where a slice (current slice) including the current block is an I slice on which only the intra prediction is performed, the custom scaling list may be configured to be applied, and in the case of other types of slices, the application of the custom scaling list may be configured to be prohibited.

If the intra prediction is performed, the pixel values of the reference pixels are spread to the current block. Therefore, the values of the quantization steps are set to be small, and thus, the quantization error of the reference pixels is deceased. The advantages according to the decrease in quantization error are particularly large. Therefore, only in the case of the I slice on which the intra prediction securely performed, the application of the custom scaling list may be configured to be permitted.

In this case, in addition to the above-described information on the orthogonal transform skip, by referring to the slice type of the current slice, such control can be realized.

Next, in the present technique described above, examples of application to specific devices will be described.

1. First Embodiment

Image Encoding Device

Figure 8:
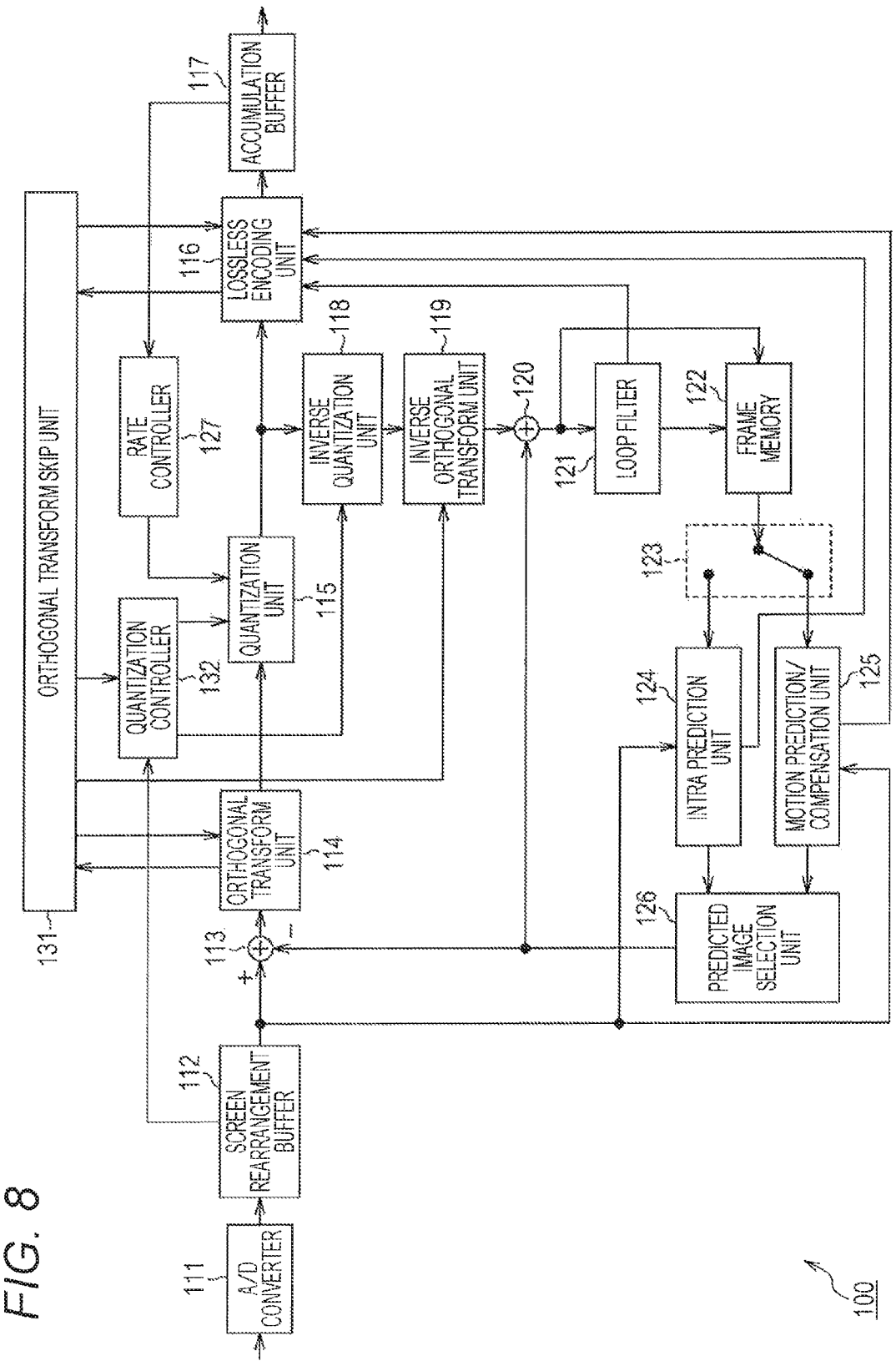
FIG. 8 is a block diagram illustrating an example of a main configuration of an image encoding device.

FIG. 8 is a block diagram illustrating an example of a main configuration of an image encoding device as an embodiment of the image processing device. An image encoding device 100 illustrated in FIG. 8 encodes image data by using a prediction process of, for example, HEVC (High Efficiency Video Coding) or a prediction process of a scheme according to the HEVC. As illustrated in FIG. 8, the image encoding device 100 is configured to include an A/D converter 111, a screen rearrangement buffer 112, a calculation unit 113, an orthogonal transform unit 114, a quantization unit 115, a lossless encoding unit 116, an accumulation buffer 117, an inverse quantization unit 118, and an inverse orthogonal transform unit 119. In addition, the image encoding device 100 is configured to include a calculation unit 120, a loop filter 121, a frame memory 122, a selection unit 123, an intra prediction unit 124, a motion prediction/compensation unit 125, a predicted image selection unit 126, and a rate controller 127.

The image encoding device 100 is configured to further include an orthogonal transform skip unit 131 and a quantization controller 132.

The A/D converter 111 A/D-converts the input image data and supplies the converted image data (digital data) to the screen rearrangement buffer 112 to store the image data therein. The screen rearrangement buffer 112 rearranges the image of a stored frame display order into a frame encoding order according to GOP (Group Of Picture), and supplies the images of which frame order is rearranged to the calculation unit 113. In addition, the screen rearrangement buffer 112 also supplies the images of which frame order is rearranged to the intra prediction unit 124 and the motion prediction/compensation unit 125.

The calculation unit 113 subtracts a predicted image supplied from the intra prediction unit 124 or the motion prediction/compensation unit 125 through the predicted image selection unit 126 from an image read from the screen rearrangement buffer 112 and outputs the difference information to the orthogonal transform unit 114. For example, in the case of intra-encoding an image, the calculation unit 113 subtracts the predicted image supplied from the intra prediction unit 124 from the image read from the screen rearrangement buffer 112. In addition, for example, in the case of inter-encoding an image, the calculation unit 113 subtracts the predicted image supplied from the motion prediction/compensation unit 125 from the image read from the screen rearrangement buffer 112.

The orthogonal transform unit 114 performs orthogonal transform such as discrete cosine transform or Karhunen-Loeve transform on the difference information supplied from the calculation unit 113. The orthogonal transform unit 114 supplies the transform coefficient to the quantization unit 115.

The quantization unit 115 quantizes a transform coefficient supplied from the orthogonal transform unit 114. The quantization unit 115 sets quantization parameters based on information on a target value of a code amount applied from the rate controller 127 and performs the quantization. The quantization unit 115 supplies the quantized transform coefficient to the lossless encoding unit 116.

The lossless encoding unit 116 encodes the transform coefficient quantized by the quantization unit 115 in an arbitrary encoding scheme. Since the coefficient data are quantized under the control of the rate controller 127, the code amount becomes the target value set by the rate controller 127 (or is approximate to the target value).

In addition, the lossless encoding unit 116 acquires information representing the mode of the intra prediction from the intra prediction unit 124 and acquires information of the mode of the inter prediction, the differential motion vector information, and the like from the motion prediction/compensation unit 125. In addition, the lossless encoding unit 116 appropriately generates an NAL unit including a video parameter set (VPS), a sequence parameter set (SPS), a picture parameter set (PPS), and the like.

The lossless encoding unit 116 encodes such various types of information in an arbitrary encoding scheme and incorporates (multiplexes) the encoded information as a portion of encoded data (sometimes, referred to an encoded stream). The lossless encoding unit 116 supplies the encoded data obtained through the encoding to the accumulation buffer 117 to supply the encoded data therein.

As the encoding scheme of the lossless encoding unit 116, for example, there is variable length encoding, arithmetic encoding, or the like. As the variable length encoding, for example, there is CAVLC (Context-Adaptive Variable Length Coding) defined in the H.264/AVC scheme or the like. As the arithmetic encoding, for example, there is CABAC (Context-Adaptive Binary Arithmetic Coding) or the like.

The accumulation buffer 117 temporarily stores the encoded data supplied the lossless encoding unit 116. At a predetermined timing, the accumulation buffer 117 outputs the stored encoded data to a recording device or a transmission line, or the like (not shown) at the post stage. Namely, the accumulation buffer 117 is also a transmission unit which transmits the encoded data.

In addition, the transform coefficient quantized by the quantization unit 115 is also supplied to the inverse quantization unit 118. The inverse quantization unit 118 inverse-quantizes the quantized transform coefficient by a method corresponding to the quantization of the quantization unit 115. The inverse quantization unit 118 supplies the obtained transform coefficient to the inverse orthogonal transform unit 119.

The inverse orthogonal transform unit 119 performs an inverse orthogonal transform process on the transform coefficient supplied from the inverse quantization unit 118 by a method corresponding to the orthogonal transform process of the orthogonal transform unit 114. The inverse-orthogonal-transformed output (recovered difference information) is supplied to the calculation unit 120.

The calculation unit 120 adds the predicted image supplied through the predicted image selection unit 126 from the intra prediction unit 124 or the motion prediction/compensation unit 125 to the recovered difference information which is a result of the inverse orthogonal transform supplied from the inverse orthogonal transform unit 119 to obtain locally decoded image (decoded image). The decoded image is supplied to the loop filter 121 or the frame memory 122.

The loop filter 121 includes a deblocking filter, an adaptive loop filter, and the like and performs an appropriate filtering process on the reconstructed image supplied from the calculation unit 120. For example, the loop filter 121 performs a deblocking filtering process on the reconstructed image to remove block distortion of the reconstructed image. In addition, for example, the loop filter 121 improves the image quality by performing a loop filtering process on the result of the deblocking filtering process (reconstructed image where the block distortion is removed) by using a Wiener filter. The loop filter 121 supplies a result of the filtering process (hereinafter, referred to as a decoded image) to the frame memory 122.

Furthermore, the loop filter 121 may also configured to further perform other arbitrary filtering processes on the reconstructed image. In addition, if necessary, the loop filter 121 may supply the information such as the filter coefficient or the like used for the filtering process to the lossless encoding unit 116 so as to encode the information.

The frame memory 122 stores the reconstructed image supplied from the calculation unit 120 and the decoded image supplied from the loop filter 121. At a predetermined timing or according to an external request of the intra prediction unit 124 or the like, the frame memory 122 supplies the stored reconstructed image through the selection unit 123 to the intra prediction unit 124. In addition, at a predetermined timing or according to external request of the motion prediction/compensation unit 125 or the like, the frame memory 122 supplies the stored decoded image through the selection unit 123 to the motion prediction/compensation unit 125.

The frame memory 122 stores the supplied decoded image and supplies the stored decoded image as a reference image to the selection unit 123 at predetermined timing.

The selection unit 123 selects a supply destination of the reference image supplied from the frame memory 122. For example, in the case of the intra prediction, the selection unit 123 supplies the reference image (pixel values in the current picture) supplied from the frame memory 122 to the motion prediction/compensation unit 125. In addition, for example, in the case of the inter prediction, the selection unit 123 supplies the reference image supplied from the frame memory 122 to the motion prediction/compensation unit 125.

The intra prediction unit 124 performs the intra prediction (inside-screen prediction) which generates a predicted image by using pixel values in the current picture which is a reference image supplied through the selection unit 123 from the frame memory 122. The intra prediction unit 124 performs the intra prediction in multiple intra prediction modes which are prepared in advance.

The intra prediction unit 124 generates the predicted images in all the candidate intra prediction modes, evaluates cost function values of the predicted images by using the input image supplied from the screen rearrangement buffer 112, and selects an optimal mode. If the intra prediction unit selects the optimal intra prediction mode, the intra prediction unit 124 supplies the predicted image generated in the optimal mode to the predicted image selection unit 126.

In addition, as described above, the intra prediction unit 124 appropriately supplies intra prediction mode information representing the employed intra prediction mode or the like to the lossless encoding unit 116 and the encoding is allowed to be performed.

The motion prediction/compensation unit 125 performs the motion prediction (inter prediction) by using the input image supplied from the screen rearrangement buffer 112 and the reference image supplied through the selection unit 123 from the frame memory 122. The motion prediction/compensation unit 125 performs the motion compensation process according to the detected motion vector and generates the predicted image (inter-predicted image information). The motion prediction/compensation unit 125 performs the inter prediction in multiple inter prediction modes which are prepared in advance.

The motion prediction/compensation unit 125 generates the predicted image in all the candidate inter prediction modes. The motion prediction/compensation unit 125 evaluates cost function values of the predicted images by using the input image supplied from the screen rearrangement buffer 112, the generated information of the differential motion vector or the like and selects an optimal mode. If the motion prediction/compensation unit 125 selects the optimal inter prediction mode, motion prediction/compensation unit 125 supplies the predicted image generated in the optimal mode to the predicted image selection unit 126.

When the motion prediction/compensation unit 125 decodes the information representing the employed inter prediction mode or the encoded data, the motion prediction/compensation unit 125 supplies the information or the like required in order to perform the process in the inter prediction mode to the lossless encoding unit 116 and the encoding is allowed to be performed. As the required information, for example, there are the generated information of the differential motion vector, a flag representing an index of the prediction/motion vector as prediction/motion vector information, and the like.

The predicted image selection unit 126 selects a supply source of the predicted image supplied to the calculation unit 113 or the calculation unit 120. For example, in the case of the intra encoding, the predicted image selection unit 126 selects the intra prediction unit 124 as the supply source of the predicted image and supplies the predicted image from the intra prediction unit 124 to the calculation unit 113 or the calculation unit 120. In addition, for example, in the case of the inter encoding, the predicted image selection unit 126 selects the motion prediction/compensation unit 125 as the supply source of the predicted image and supplies the predicted image supplied from the motion prediction/compensation unit 125 to the calculation unit 113 or the calculation unit 120.

The rate controller 127 controls the rate of the quantization operation of the quantization unit 115 based on the code amount of the encoded data accumulated in the accumulation buffer 117 so that overflow or underflow does not occur.

The orthogonal transform skip unit 131 controls the performing of the orthogonal transform process in the orthogonal transform unit 114 and the performing of the inverse orthogonal transform process in the inverse orthogonal transform unit 119. For example, the orthogonal transform skip unit 131 acquires the orthogonal transform coefficient and the before-orthogonal-transform difference value from the orthogonal transform unit 114. In addition, for example, the orthogonal transform skip unit 131 acquires the skip enabling information (transform_skip_enable_flag) from the lossless encoding unit 116. The orthogonal transform skip unit 131 determines based on such information whether or not to skip (omit) the orthogonal transform process or the inverse orthogonal transform process.

The orthogonal transform skip unit 131 controls the orthogonal transform unit 114 or the inverse orthogonal transform unit 119 based on the determination. In other words, the orthogonal transform unit 114 performs or skips the orthogonal transform process under the control of the orthogonal transform skip unit 131. Similarly, the inverse orthogonal transform unit 119 performs or skips the inverse orthogonal transform process under the control of the orthogonal transform skip unit 131.

In addition, the orthogonal transform skip unit 131 generates the determined content, that is, the skip identifying information (transform_skip_flag) representing as to whether or not skip the orthogonal transform process or inverse orthogonal transform process and supplies the information to the lossless encoding unit 116. The lossless encoding unit 116 incorporates the skip identifying information (transform_skip_flag) into, for example, the encoded data and transmits the encoded data to the decoding side. Furthermore, the skip identifying information may be configured to be transmitted to the decoding side as data different from the encoded data.

Furthermore, the orthogonal transform skip unit 131 supplies the information on the orthogonal transform skip including the skip enabling information (transform_skip_enable_flag) or the skip identifying information (transform_skip_flag) to the quantization controller 132.

The quantization controller 132 acquires the information on the orthogonal transform skip supplied from the orthogonal transform skip unit 131. In addition, the quantization controller 132 acquires the information representing the slice type of the current slice (slice included in the current block) which is a process target from the screen rearrangement buffer 112. The quantization controller 132 determines the information whether the custom scaling list is applied or the default scaling list is applied to the quantization/inverse quantization on the current block. If the quantization controller 132 determines the to-be-applied scaling list, the quantization controller 132 supplies the scaling list to the quantization unit 115 and the inverse quantization unit 118.

The quantization unit 115 performs quantization on the current block by using the scaling list supplied from the quantization controller 132. In addition, the inverse quantization unit 118 performs inverse quantization on the current block by using the scaling list supplied from the quantization controller 132.

[Quantization Controller]

Figure 9:
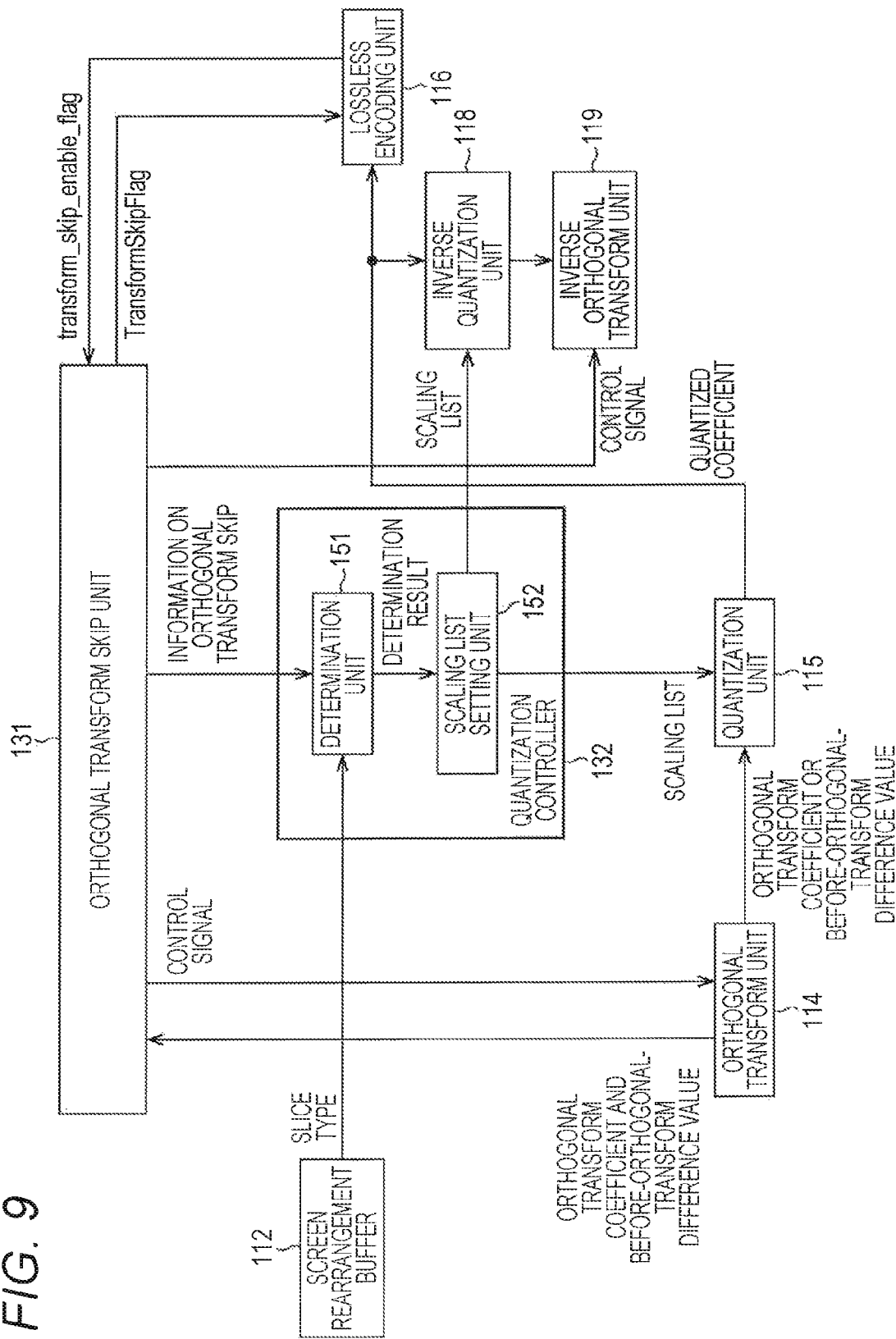
FIG. 9 is a block diagram illustrating an example of a main configuration of a quantization controller.

FIG. 9 is a block diagram illustrating an example of a main configuration of the quantization controller 132 of FIG. 8. As illustrated in FIG. 9, the quantization controller 132 is configured to include a determination unit 151 and a scaling list setting unit 152.

As illustrated in FIG. 9, the orthogonal transform skip unit 131 supplies the information on the orthogonal transform skip to the determination unit 151. In addition, the screen rearrangement buffer 112 supplies the information representing the slice type of the current slice to the determination unit 151.

The determination unit 151 performs determination on the information. For example, the determination unit 151 determines the value of the skip enabling information or the skip identifying information. In addition, for example, the determination unit 151 determines whether or not the current slice is an I slice. The determination unit 151 supplies a result of the determination to the scaling list setting unit 152.

The scaling list setting unit 152 sets the scaling list used for the quantization/inverse quantization on the current block based on the result of the determination supplied from the determination unit 151. For example, in a case where both values of the skip enabling information and the skip identifying information are true and the current slice is an I slice, the scaling list setting unit 152 applies the custom scaling list. In addition, in a case where the value of at least any one of the skip enabling information and the skip identifying information is false or the current slice is not an I slice, the scaling list setting unit 152 applies the default scaling list.

The scaling list setting unit 152 supplies the set scaling list to the quantization unit 115 and the inverse quantization unit 118. The quantization unit 115 and the inverse quantization unit 118 perform the quantization processes and the inverse quantization process by using the scaling list, respectively.

By doing in this manner, the image encoding device 100 can suppress an increase in quantization error and improve the encoding efficiency. In other words, the image encoding device 100 can suppress deterioration in image quality caused by the encoding/decoding.

[Flow of Encoding Process]

Next, a flow of processes performed by the above-described image encoding device 100 will be described. First, an example of the flow of the encoding process will be described with reference to a flowchart of FIG. 10.

If the encoding process is started, in step S101, the lossless encoding unit 116 of the image encoding device 100 generates the skip enabling information (transform_skip_enable_flag) with respect to the current picture which is a process target, for example, based on a user's instruction or the like.

In step S102, the A/D converter 111 A/D-converts the input image data. In step S103, the screen rearrangement buffer 112 stores the A/D-converted image information (digital data) and rearranges the pictures from the display order to the encoding order.

In step S104, the intra prediction unit 124 performs an intra prediction process in the intra prediction mode. In step S105, the motion prediction/compensation unit 125 performs an inter motion prediction process of performing the motion prediction or the motion compensation in the inter prediction mode. In step S106, the predicted image selection unit 126 determines an optimal mode based on the cost function values output from the intra prediction unit 124 and the motion prediction/compensation unit 125. Namely, the predicted image selection unit 126 selects any one of the predicted image generated by the intra prediction unit 124 and the predicted image generated by the motion prediction/compensation unit 125.

In step S107, the calculation unit 113 calculates a difference between the image rearranged by the process of step S103 and the predicted image selected by the process of step S106. A data amount of the difference data is decreased in comparison to the original image data. Therefore, in comparison to the case of encoding the image without change, it is possible to compress the data amount.

In step S108, the orthogonal transform skip unit 131 determines whether or not the orthogonal transform skip of the current block which is a process target is performed. In step S109, the orthogonal transform unit 114 performs the orthogonal transform process on the difference information generated by the process of step S107 according to a result of the process of step S108. For example, in a case where it is determined in step S108 that the orthogonal transform on the current block is performed, in step S109, the orthogonal transform unit 114 performs the orthogonal transform. In addition, for example, in a case where it is determined in step S108 that the orthogonal transform on the current block is not performed, in step S109, the orthogonal transform unit 114 skips the orthogonal transform.

In step S110, the quantization controller 132 performs a quantization control process according to a result of the process of step S108. In step S111, the quantization unit 115 quantizes the orthogonal transform coefficient obtained by the process of step S109 or the before-orthogonal-transform difference value by using the quantization parameters calculated by the rate controller 127 and the scaling list set in step S110.

The difference information quantized by the process of step S110 is locally decoded as follows. Namely, in step S112, the inverse quantization unit 118 inverse-quantizes the quantized coefficient (sometimes, referred to as a quantized coefficient) generated by the process of step S111 by using the scaling list set in step S110. In step S113, the inverse orthogonal transform unit 119 performs the inverse orthogonal transform process on the orthogonal transform coefficient obtained by the process of step S112 or the before-orthogonal-transform difference value according to a result of the process of step S108.

In step S114, the calculation unit 120 generates a locally-decoded image (image corresponding to the input to the calculation unit 113) by adding the predicted image to the locally-decoded difference information.

In step S115, the loop filter 121 filters the image generated by the process of step S114. Accordingly, the block distortion or the like is removed.

In step S116, the frame memory 122 stores the image where the block distortion or the like is removed by the process of step S115. Furthermore, the image which is not filtered by the loop filter 121 is also supplied from the calculation unit 120 to the frame memory 122 to be stored therein. The image stored in the frame memory 122 is used for the process of step S104 or the process of step S105.

In step S117, the lossless encoding unit 116 encodes the coefficient quantized by the process of step S111. Namely, the lossless encoding unit 116 performs lossless encoding such as variable length encoding or arithmetic encoding on the data corresponding to the differential image.

In addition, at this time, the lossless encoding unit 116 encodes the information on the prediction mode of the predicted image selected by the process of the step S106 and adds the encoded information to the encoded data obtained by encoding the differential image. Namely, the lossless encoding unit 116 encodes optimal intra prediction mode information supplied from the intra prediction unit 124 or information according to optimal inter prediction mode supplied from the motion prediction/compensation unit 125 and adds the encoded information to the encoded data.

Furthermore, the lossless encoding unit 116 appropriately further encodes, for example, the information on the orthogonal transform skip or the like such as the skip identifying information (transform_skip_flag) and adds the encoded information to the encoded data.

In step S118, the accumulation buffer 117 accumulates base layer encoded data obtained by the process of step S117. The base layer encoded data accumulated by the accumulation buffer 117 are appropriately read and transmitted to the decoding side via a transmission line or a recording medium.

In step S119, the rate controller 127 controls a rate of quantization operation of the quantization unit 115 based on the code amount (generated code amount) of the encoded data accumulated in the accumulation buffer 117 by the process of step S118 so that overflow or underflow does not occur. In addition, the rate controller 127 supplies the information on the quantization parameter to the quantization unit 115.

If the process of step S119 is ended, the encoding process is ended. The encoding process is performed, for example, in units of a picture. Namely, the encoding process is performed for each picture. Herein, each process in the encoding process is performed for each process unit.

[Flow of Quantization Control Process]

Figure 10:
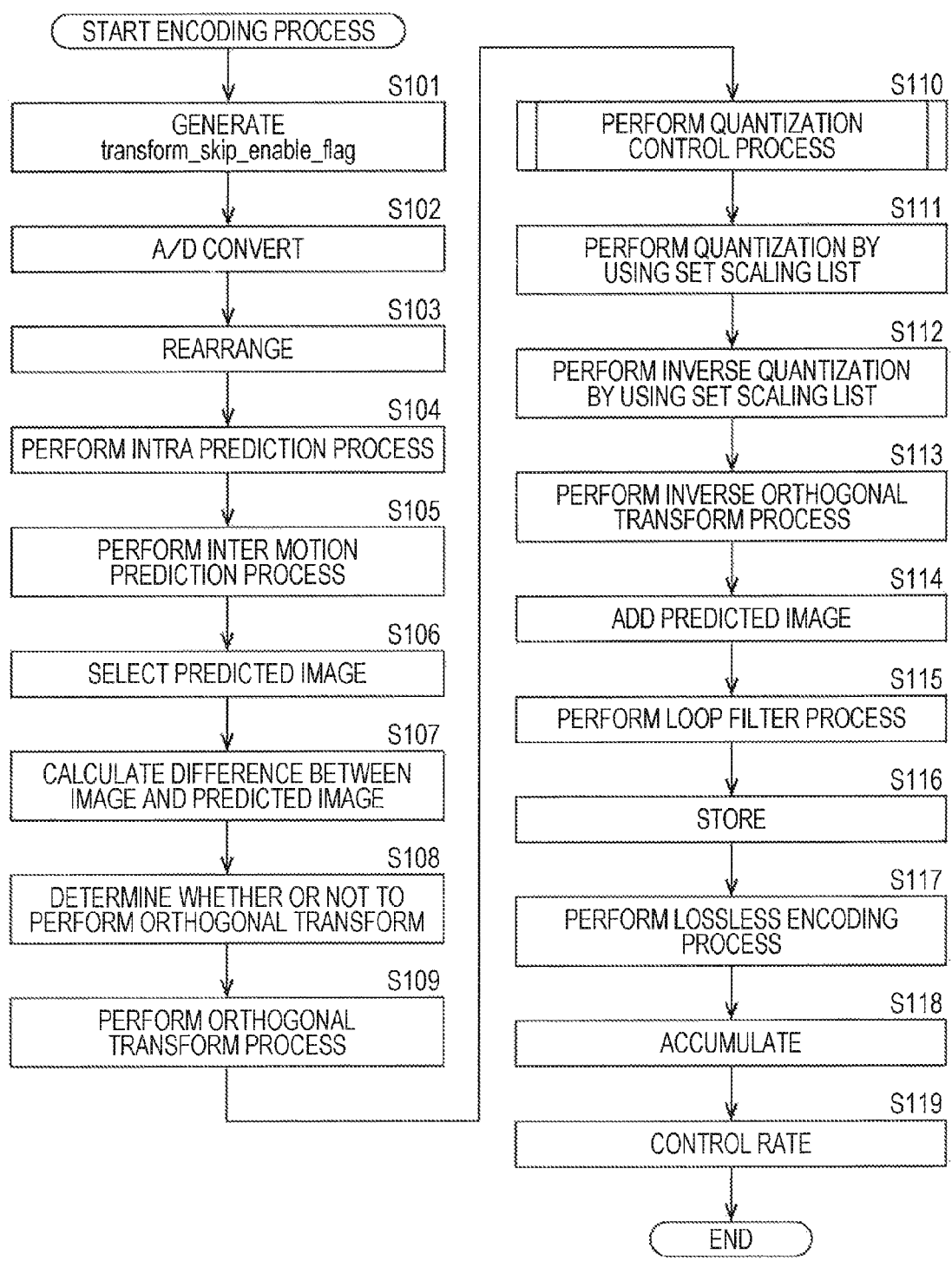
FIG. 10 is a flowchart illustrating an example of a flow of an encoding process.
Figure 11:
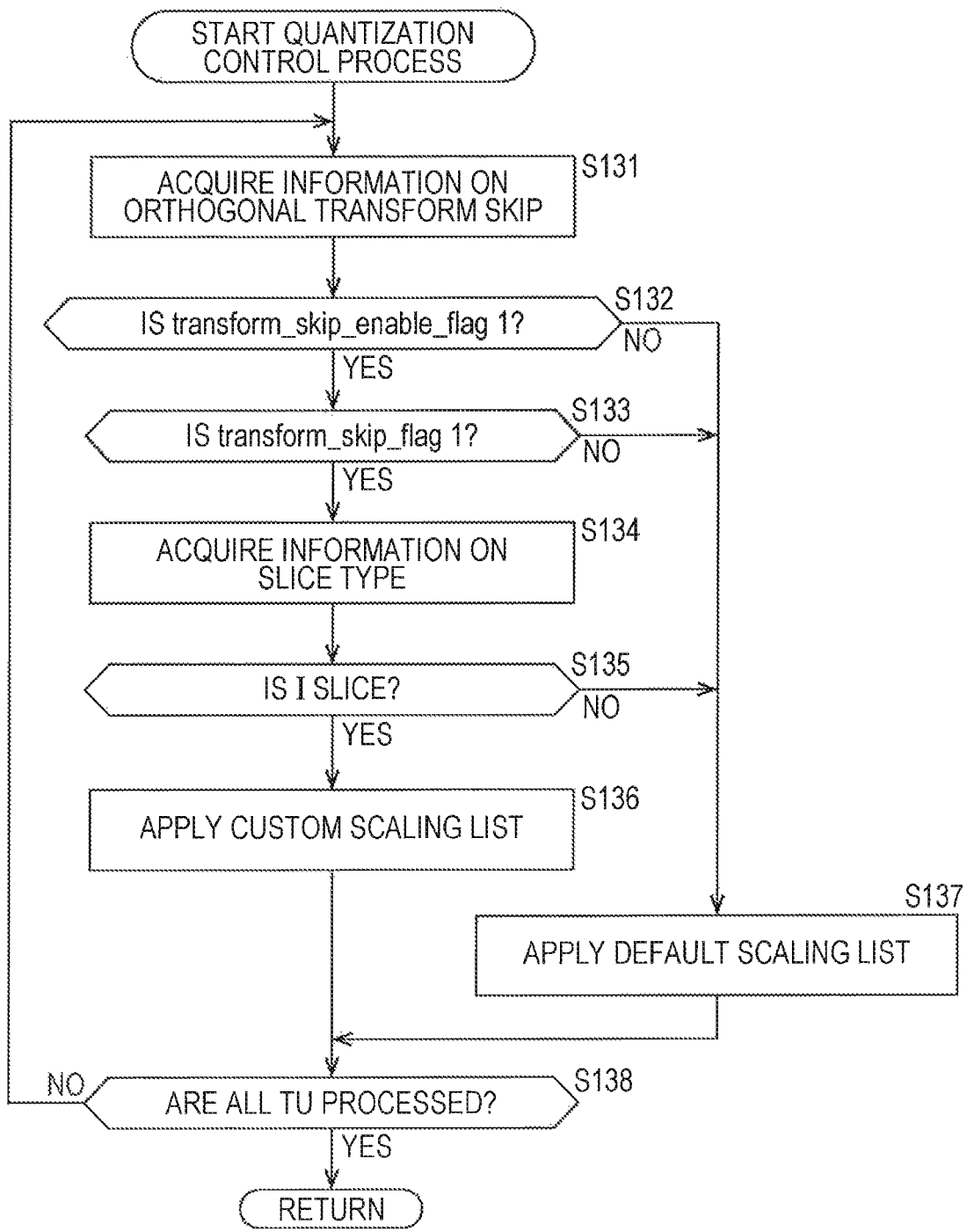
FIG. 11 is a flowchart illustrating an example of a flow of a quantization control process.

Next, an example of a flow of the quantization control process performed in step S110 of FIG. 10 will be described with reference to a flowchart of FIG. 11.

If the quantization control process is started, in step S131, the determination unit 151 acquires the information on the orthogonal transform skip from the orthogonal transform skip unit 131.

In step S132, the determination unit 151 determines whether or not the value of the skip enabling information (transform_skip_enable_flag) included in the information on the orthogonal transform skip acquired in step S131 is true (for example, "1"). In a case where it is determined that the value of the skip enabling information (transform_skip_enable_flag) is true (for example, "1"), the process proceeds to step S133.

In step 3133, the determination unit 151 determines whether or not the value of the skip identifying information (transform_skip_flag) included in the information on the orthogonal transform skip acquired in step S131 is true (for example, "1"). In a case where it is determined that the value of the skip identifying information (transform_skip_flag) is true (for example, "1"), the process proceeds to step S134.

In step S134, the determination unit 151 acquires the information of the slice type supplied from the screen rearrangement buffer 112. In step S135, the determination unit 151 determines based on the information on the slice type acquired in step S134 whether or not the current slice is an I slice. In a case where it is determined that the current slice is an I slice, the process proceeds to step S136.

In step S136, the scaling list setting unit 152 applies the custom scaling list as the scaling list used for the quantization of the current block. When the process of step S136 is ended, the process proceeds to step S138.

In addition, in a case where it is determined in step S132 that the value of the skip enabling information (transform_skip_enable_flag) is false, in a case where it is determined in step S133 that the value of the skip identifying information (transform_skip_flag) is false, or in a case where it is determined in step S135 that the current slice is not the I slice, the process proceeds to step S137.

In step S137, the scaling list setting unit 152 applies the default scaling list as the scaling list used for the quantization of the current block. When the process of step S137 is ended, the process proceeds to step S138.

In step S138, the determination unit 151 determines whether or not all the blocks (TU) are processed. In a case where it is determined that a non-processed block exists, the process returns to step S131, and the subsequent processes are repeated. The processes of step S131 to step S138 are repetitively performed, so that the process for each block is performed. In a case where it is determined in step S138 that all blocks (TU) are processed, the quantization control process is ended, the process returns to FIG. 10.

By performing each process as described above, the image encoding device 100 can suppress an increased in quantization error, suppress a reduction in encoding efficiency, and suppress a deterioration in image quality caused by the encoding/decoding.

2. Second Embodiment

Image Decoding Device

Figure 12:
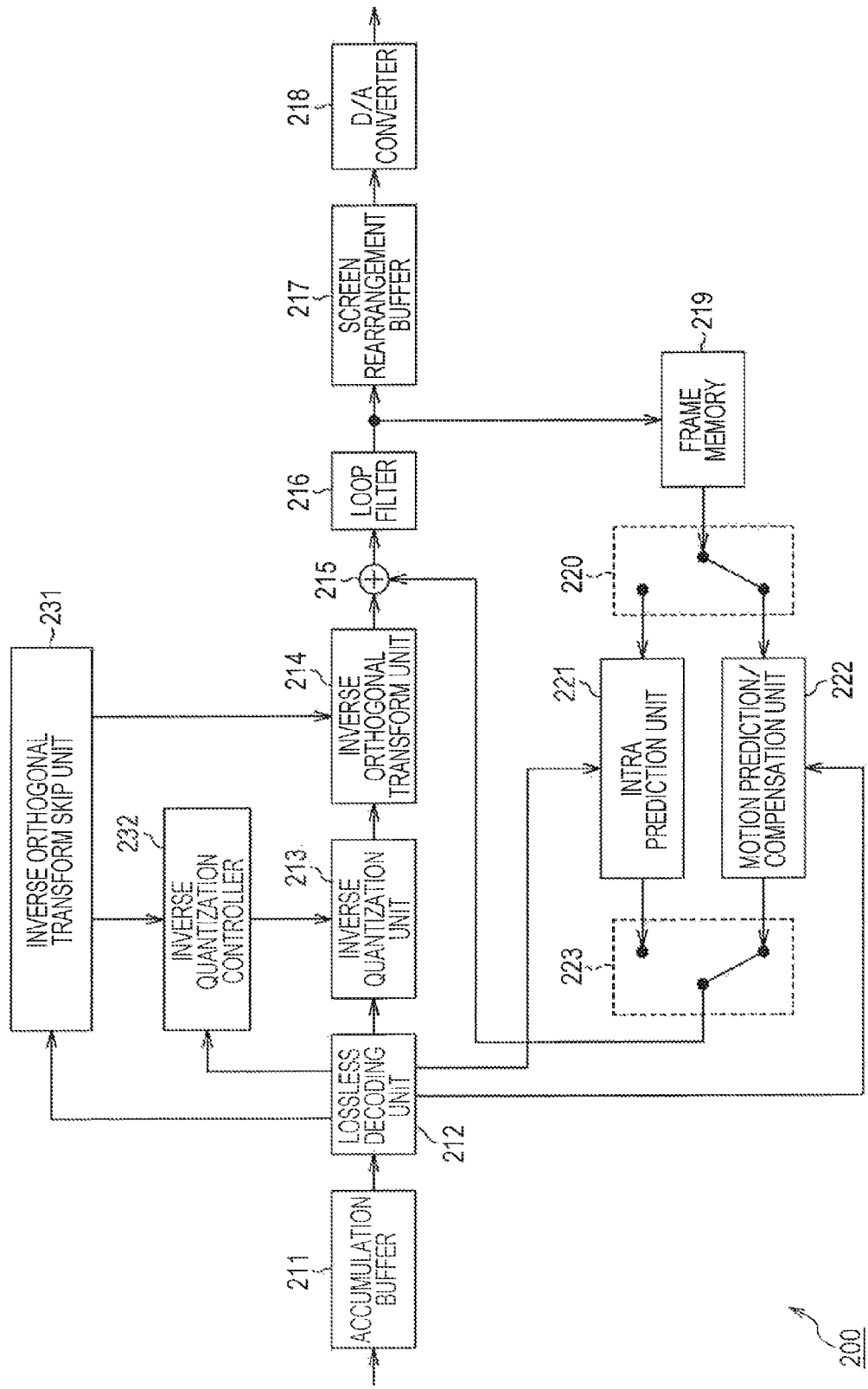
FIG. 12 is a block diagram illustrating an example of a main configuration of an image decoding device.

Next, decoding of the encoded data (bit stream) encoded as described above will be described. FIG. 12 is a block diagram illustrating an example of a main configuration of an image decoding device as an embodiment of the image processing device. An image decoding device 200 illustrated in FIG. 12 is a decoding device which decodes the encoded data in a decoding scheme corresponding to the encoding scheme of the image encoding device 100 of FIG. 8. For example, the image decoding device 200 decodes the encoded data obtained by the image encoding device 100 encoding the image data.

As illustrated in FIG. 12, the image decoding device 200 is configured to include an accumulation buffer 211, a lossless decoding unit 212, an inverse quantization unit 213, an inverse orthogonal transform unit 214, a calculation unit 215, a loop filter 216, a screen rearrangement buffer 217, and a D/A converter 218. In addition, the image decoding device 200 is configured to include a frame memory 219, a selection unit 220, an intra prediction unit 221, a motion prediction/compensation unit 222, and a selection unit 223.

Furthermore, the image decoding device 200 is configured to an inverse orthogonal transform skip unit 231 and an inverse quantization controller 232.

The accumulation buffer 211 is also a reception unit which receives the transmitted encoded data. The accumulation buffer 211 receives and accumulates the transmitted encoded data and supplies the encoded data to the lossless decoding unit 212 at a predetermined timing. Information required for the decoding such as prediction mode information, information on orthogonal transform skip (including, for example, skip enabling information or skip identifying information), information on a slice such as a slice type, and the like is added to the encoded data.

The lossless decoding unit 212 decodes the information which is supplied from the accumulation buffer 211 and encoded by the lossless encoding unit 116 in a scheme corresponding to the encoding scheme of the lossless encoding unit 116. The lossless decoding unit 212 supplies quantized coefficient data of a differential image obtained through the decoding to the inverse quantization unit 213.

In addition, the lossless decoding unit 212 appropriately extracts and acquires an NAL unit including a video parameter set (VPS), a sequence parameter set (SPS), a picture parameter set (PPS), and the like included in the encoded data. The lossless decoding unit 212 extracts information on an optimal prediction mode from the above-described information, determines based on the information whether the intra prediction mode is selected as the optimal prediction mode or the inter prediction mode is selected, and supplies the information on the optimal prediction mode to one of the intra prediction unit 221 and the motion prediction/compensation unit 222, which corresponds to the mode which is determined to be selected. Namely, for example, in a case where the intra prediction mode is selected as the optimal prediction mode in the image encoding device 100, the information on the optimal prediction mode is supplied to the intra prediction unit 221. In addition, for example, in a case where the inter prediction mode is selected as the optimal prediction mode in the image encoding device 100, the information on the optimal prediction mode is supplied to the motion prediction/compensation unit 222.

Furthermore, the lossless decoding unit 212 extracts the information required for the inverse quantization such as a quantization parameter from the NAL unit or the like and supplies the information to the inverse quantization unit 213. In addition, the lossless decoding unit 212 extracts the information required for the control of the inverse quantization such as a slice type from the NAL unit or the like and supplies the information to the inverse quantization controller 232.

Furthermore, the lossless decoding unit 212 extracts the information on the orthogonal transform skip including, for example, the skip enabling information (transform_skip_enable_flag), the skip identifying information (transform_skip_flag), and the like from the NAL unit or the like and supplies the information on the orthogonal transform skip to the inverse orthogonal transform skip unit 231.

The inverse quantization unit 213 inverse-quantizes the quantized coefficient data (quantized coefficient) obtained by the decoding of the lossless decoding unit 212 in a scheme corresponding to the quantization scheme of the quantization unit 115. The inverse quantization unit 213 performs the inverse quantization by using the scaling list supplied from the inverse quantization controller 232. The inverse quantization unit 213 supplies the obtained coefficient data (orthogonal transform coefficient or the before-orthogonal-transform difference value) to the inverse orthogonal transform unit 214.

Furthermore, the inverse quantization unit 213 is the same processing unit as the inverse quantization unit 118. Namely, the description of the inverse quantization unit 213 can also be used for the inverse quantization unit 118. However, the data input and output destinations and the like need to be appropriately changed in reading according to the device.

The inverse orthogonal transform unit 214 performs an inverse orthogonal transform process on the coefficient data (orthogonal transform coefficient or the before-orthogonal-transform difference value) supplied from the inverse quantization unit 213 under the control of the inverse orthogonal transform skip unit 231 in a scheme corresponding to the orthogonal transform scheme of the orthogonal transform unit 114, if necessary. Namely, in a case where the orthogonal transform coefficient is supplied from the inverse quantization unit 213, the inverse orthogonal transform unit 214 performs the inverse orthogonal transform process on the orthogonal transform coefficient. In addition, in a case where the before-orthogonal-transform difference value is supplied from the inverse quantization unit 213, the inverse orthogonal transform unit 214 skips the inverse orthogonal transform.

Through the inverse orthogonal transform process, the inverse orthogonal transform unit 214 obtains decoded remainder data corresponding to remainder data (before-orthogonal-transform difference value) before the orthogonal transform in the orthogonal transform unit 114. The inverse orthogonal transform unit 214 supplies the decoded remainder data to the calculation unit 215.

Furthermore, the inverse orthogonal transform unit 214 is the same processing unit as the inverse orthogonal transform unit 119. Namely, the description of the inverse orthogonal transform unit 214 can also be used for the inverse orthogonal transform unit 119. However, the data input and output destinations and the like need to be appropriately changed in reading according to the device.

Besides, the predicted image is supplied from the intra prediction unit 221 or the motion prediction/compensation unit 222 to the calculation unit 215 through the selection unit 223.

The calculation unit 215 obtains the decoded image data corresponding to the image data before the subtraction of the predicted image by the calculation unit 113 by adding the decoded remainder data and the predicted image. The calculation unit 215 supplies the decoded image data to the loop filter 216.

The loop filter 216 appropriately performs a filtering process including a deblocking filter, an adaptive loop filter, and the like on the supplied decoded image and supplies the filtered decoded image to the screen rearrangement buffer 217 and the frame memory 219. For example, the loop filter 216 removes the block distortion of the decoded image by performing the deblocking filtering process on the decoded image. In addition, for example, the loop filter 216 improves the image quality by performing a loop filtering process on a result of the deblocking filtering process (decoded image where the block distortion is removed) by using a Wiener filter. Furthermore, the loop filter 216 is the same processing unit as the loop filter 121.

In addition, the decoded image output from the calculation unit 215 may be supplied to the screen rearrangement buffer 217 or the frame memory 219 without passing through the loop filter 216. Namely, some portion or all of the filtering process by the loop filter 216 may be omitted.

The screen rearrangement buffer 217 performs decoded image rearrangement. Namely, the frame order which is rearranged for the encoding order by the screen rearrangement buffer 112 can be rearranged into the original display order. The D/A converter 218 D/A-converts the image supplied from the screen rearrangement buffer 217 and outputs the D/A-converted image to a display (not shown) to display the image.

The frame memory 219 stores the supplied decoded image and, at a predetermined timing or according to an external request of the intra prediction unit 221, the motion prediction/compensation unit 222, or the like, the frame memory supplies the stored decoded image as a reference image to the selection unit 220.

The selection unit 220 selects a supply destination of the reference image supplied from the frame memory 219. In the case of decoding the intra-encoded image, the selection unit 220 supplies the reference image supplied from the frame memory 219 to the intra prediction unit 221. In addition, in the case of decoding the inter-encoded image, the selection unit 220 supplies the reference image supplied from the frame memory 219 to the motion prediction/compensation unit 222.

Information or the like representing the intra prediction mode which is obtained by decoding header information is appropriately supplied from the lossless decoding unit 212 to the intra prediction unit 221. The intra prediction unit 221 performs the intra prediction in the intra prediction mode used in the intra prediction unit 124 by using the reference image acquired from the frame memory 219 to generate a predicted image. The intra prediction unit 221 supplies the generated predicted image to the selection unit 223.

The motion prediction/compensation unit 222 acquires information (optimal prediction mode information, reference image information, or the like) obtained by decoding the header information from the lossless decoding unit 212.

The motion prediction/compensation unit 222 performs the inter prediction in the inter prediction mode represented by the optimal prediction mode information acquired from the lossless decoding unit 212 by using the reference image acquired from the frame memory 219 to generate a predicted image.

The selection unit 223 supplies the predicted image supplied from the intra prediction unit 221 or the predicted image supplied from the motion prediction/compensation unit 222 to the calculation unit 215. Next, in the calculation unit 215, the predicted image generated by using the motion vector is added to the decoded remainder data (differential image information) supplied from the inverse orthogonal transform unit 214, so that the original image is recovered.

The inverse orthogonal transform skip unit 231 controls performing the inverse orthogonal transform process of the inverse orthogonal transform unit 214 in the same manner as that of the orthogonal transform skip unit 131. Namely, the inverse orthogonal transform skip unit 231 acquires the information on the orthogonal transform skip (for example, skip enabling information or skip identifying information) supplied from the encoding side through the lossless decoding unit 212. The inverse orthogonal transform skip unit 231 determines based on the information whether or not the inverse orthogonal transform process is skipped (omitted) and controls performing the inverse orthogonal transform process of the inverse orthogonal transform unit 214 according to the determination.

The determination method is the same as that of the orthogonal transform skip unit 131. The inverse orthogonal transform skip unit 231 controls the inverse orthogonal transform unit 214 so as to perform the inverse orthogonal transform process on the block on which the orthogonal transform is performed and so as to skip the inverse orthogonal transform process on the block on which the orthogonal transform is skipped.

The inverse orthogonal transform unit 214 performs or skips the inverse orthogonal transform process under the control of the inverse orthogonal transform skip unit 231.

In addition, the inverse orthogonal transform skip unit 231 supplies the information on the orthogonal transform skip including the obtained skip enabling information or the obtained skip identifying information to the inverse quantization controller 232.

The inverse quantization controller 232 controls performing the inverse quantization process of the inverse quantization unit 213 in the same method as that of the quantization controller 132. Namely, the inverse quantization controller 232 acquires the information on the orthogonal transform skip which is supplied from the inverse orthogonal transform skip unit 231 and is transmitted from the encoding side. In addition, the inverse quantization controller 232 acquires information representing the slice type of the current slice which is extracted from the encoded data by the lossless decoding unit 212. The inverse quantization controller 232 determines the scaling list which is to be applied to the inverse quantization on the current block based on the information and supplies the scaling list to the inverse quantization unit 213.

The determination method for the scaling list is the same as that of the quantization controller 132. The inverse quantization controller 232 applies the default scaling list to the block on which the orthogonal transform is performed and applies the custom scaling list to the block on which the orthogonal transform is skipped. The inverse quantization unit 213 performs the inverse quantization on the current block by using the scaling list supplied from the inverse quantization controller 232.

[Inverse Quantization Controller]

Figure 13:
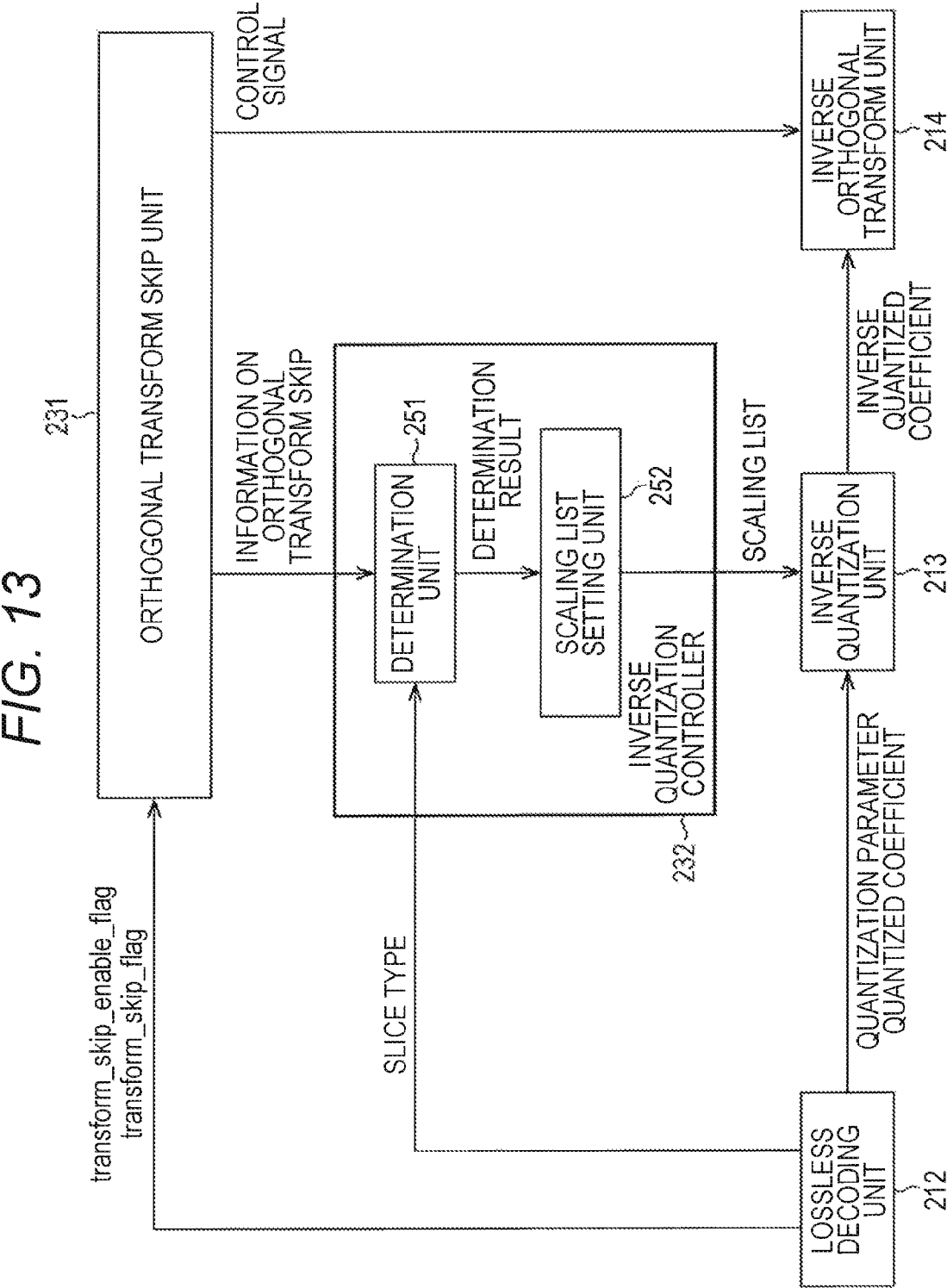
FIG. 13 is a block diagram illustrating an example of a main configuration of an inverse quantization controller.

FIG. 13 is a block diagram illustrating an example of a main configuration of the inverse quantization controller 232 of FIG. 12. As illustrated in FIG. 13, the inverse quantization controller 232 is basically the same as the quantization controller 132 and is configured to include a determination unit 251 and a scaling list setting unit 252.

As illustrated in FIG. 13, the inverse orthogonal transform skip unit 231 supplies the information on the orthogonal transform skip to the determination unit 251. In addition, the lossless decoding unit 212 supplies the information representing the slice type of the current slice to the determination unit 251.

The determination unit 251 performs determination on the information. For example, the determination unit 251 determines the value of the skip enabling information or the skip identifying information. In addition, for example, the determination unit 251 determines whether or not the current slice is an I slice. The determination unit 251 supplies a result of the determination to the scaling list setting unit 252.

The scaling list setting unit 252 sets the scaling list which is to be used for the inverse quantization of the current block based on the determination result supplied from the determination unit 251. For example, in a case where both values of the skip enabling information and the skip identifying information are true and the current block is an I slice, the scaling list setting unit 252 applies the custom scaling list. In addition, in a case where the value of at least any one of the skip enabling information and the skip identifying information is false or the current block is not an I slice, the scaling list setting unit 252 applies the default scaling list.

The scaling list setting unit 252 supplies the set scaling list to the inverse quantization unit 213. The inverse quantization unit 213 performs the inverse quantization process by using the scaling list.

By doing in this manner, the image decoding device 200 can suppress an increase in quantization error and improve the encoding efficiency. In other words, the image decoding device 200 can suppress deterioration in image quality caused by the encoding/decoding.

[Flow of Decoding Process]

Next, a flow of processes performed by the above-described image decoding device 200 will be described. First, an example of the flow of the decoding process will be described with reference to a flowchart of FIG. 14.

If the decoding process is started, in step S201, the accumulation buffer 211 accumulates the bit stream transmitted from the encoding side. In step S202, the lossless decoding unit 212 decodes the bit stream (encoded differential image information) supplied from the accumulation buffer 211. Namely, I-picture, P-picture, and B-picture which are encoded by the lossless encoding unit 116 are decoded. At this time, besides the differential image information, various types of information such as header information, which is included in the bit stream, are decoded.

In step S203, the inverse quantization controller 232 performs the inverse quantization control process and sets a to-be-applied scaling list.

In step S204, the inverse quantization unit 213 performs the intra prediction on the quantized coefficient obtained by the process of step S202 by using the scaling list set in step S203.

In step S205, the inverse orthogonal transform unit 214 performs the inverse orthogonal transform process which appropriately performs the inverse orthogonal transform on the current block (current TU) under the control of the inverse orthogonal transform skip unit 231.

In step S206, the intra prediction unit 221 or the motion prediction/compensation unit 222 performs the prediction process to generate a predicted image. Namely, the prediction process is performed in the prediction mode which is applied during the encoding and is determined in the lossless decoding unit 212. More specifically, for example, in the case were the intra prediction is applied during the encoding, the intra prediction unit 221 generates the predicted image in the intra prediction mode which is considered to be optimal during the encoding. In addition, for example, in a case where the inter prediction is applied during the encoding, the motion prediction/compensation unit 222 generate the predicted image in the inter prediction mode which is considered to be optimal during the encoding.

In step S207, the calculation unit 215 adds the predicted image generated in step S207 to the differential image information obtained by the inverse orthogonal transform process of step S205. Accordingly, the original image is decoded (decoded image is obtained).

In step S208, the loop filter 216 performs a loop filtering process which appropriately performs various filtering processes on the decoded image obtained in step S207.

In step S209, the screen rearrangement buffer 217 performs rearrangement of the images which are loop-filtered in step S208. Namely, the screen rearrangement buffer 112 can rearrange the frame order which is rearranged for encoding into the original display order.

In step S210, the D/A converter 218 D/A-converts the image of which frame order is rearranged in step S209. The image is output to a display (not shown), so that the image is displayed.

In step S211, the frame memory 219 stores the image which is loop-filtered in step S208.

If the process of step S211 is ended, the decoding process is ended. The decoding process is performed, for example, in units of a picture. Namely, the decoding process is performed for each picture. Herein, each process in the decoding process is performed for each process unit.

[Flow of Quantization Control Process]

Figure 14:
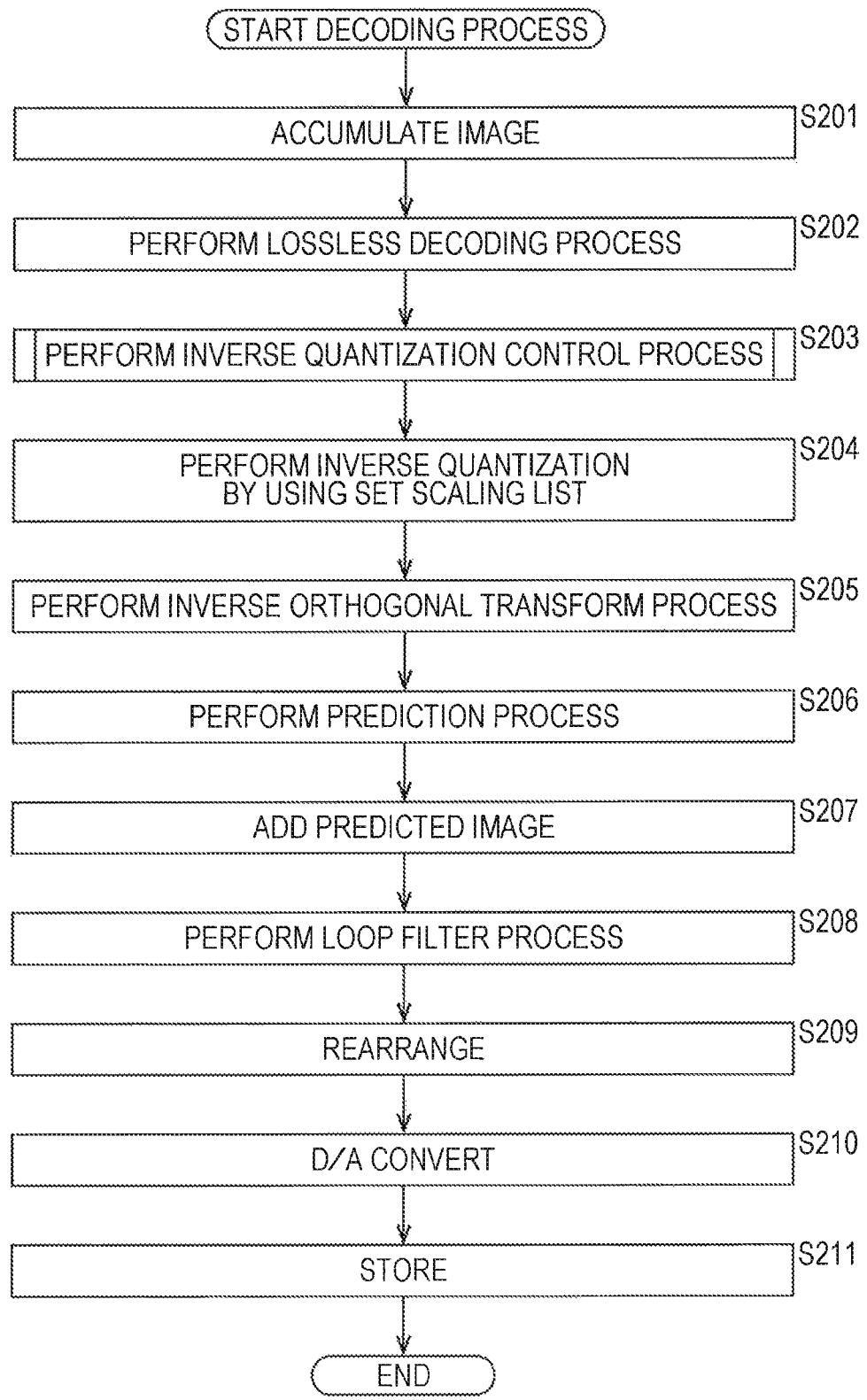
FIG. 14 is a flowchart illustrating an example of a flow of a decoding process.
Figure 15:
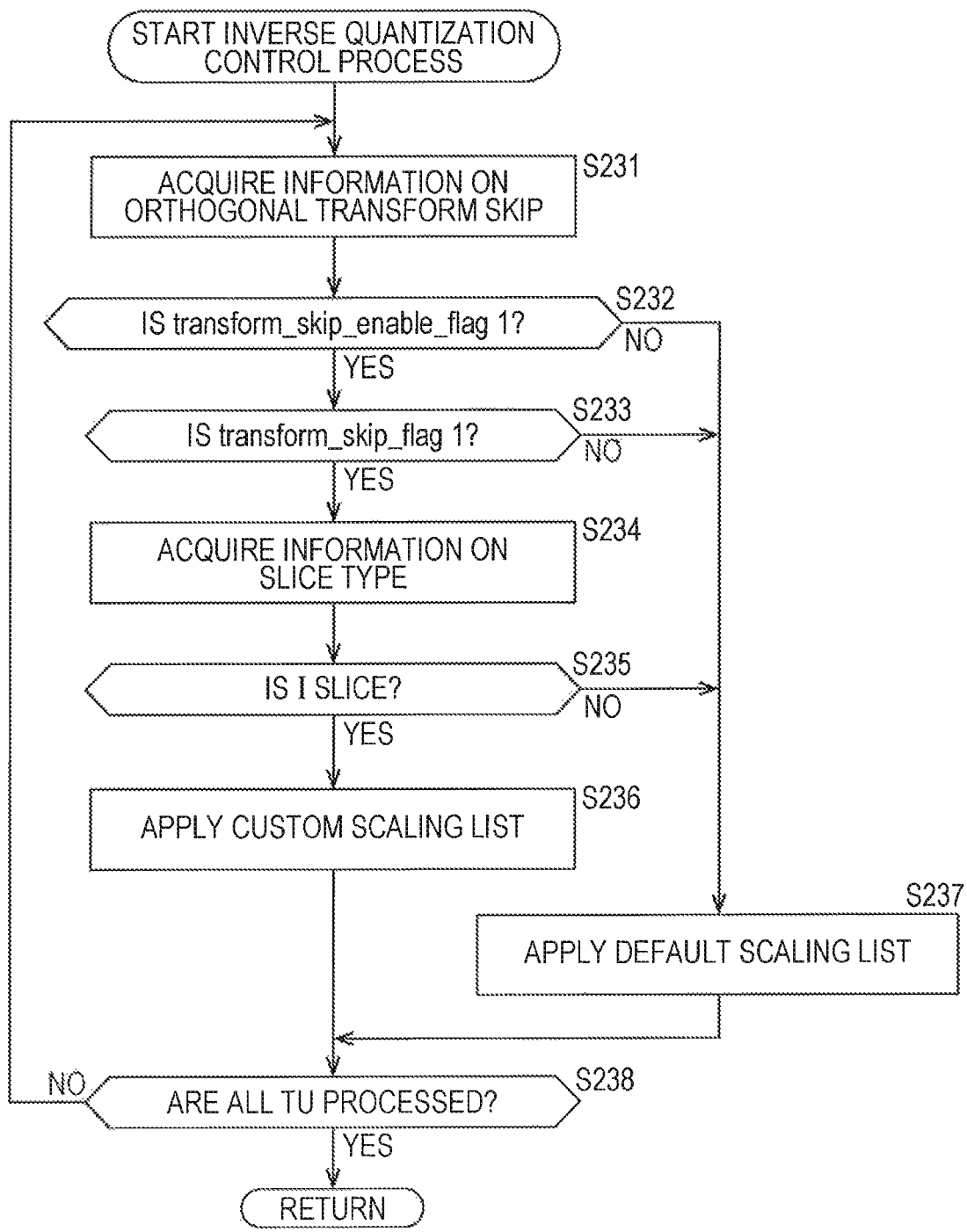
FIG. 15 is a flowchart illustrating an example of a flow of an inverse quantization control process.

Next, an example of a flow of the inverse quantization control process performed in step S203 of FIG. 14 will be described with reference to a flowchart of FIG. 15.

If the inverse quantization control process is started, in step S231, the determination unit 251 acquires the information on the orthogonal transform skip.

In step S232, the determination unit 251 determines whether or not the value of the skip enabling information (transform_skip_enable_flag) included in the information on the orthogonal transform skip acquired in step S231 is true (for example, "1"). In a case where it is determined that the value is true (for example, "1"), the process proceeds to step S233.

In step S233, the determination unit 251 determines whether or not the value of the skip identifying information (transform_skip_flag) included in the information on the orthogonal transform skip acquired in step S231 is true (for example, "1"). In a case where it is determined that the value is true (for example, "1"), the process proceeds to step 3234.

In step S234, the determination unit 251 acquires the information on the slice type. In step S235, the determination unit 251 determines based on the information on the slice type acquired in step S234 whether or not the current slice is an I slice. In a case where it is determined that the current slice is an I slice, the process proceeds to step S236.

In step S236, the scaling list setting unit 252 applies the custom scaling list as the scaling list used for the quantization of the current block. When the process of step S236 is ended, the process proceeds to step S238.

In addition, in a case where it is determined in step S232 that the value of the skip enabling information (transform_skip_enable_flag) is false, in a case where it is determined in step S233 that the value of the skip identifying information (transform_skip_flag) is false, or in a case where it is determined in step S235 that the current slice is not the I slice, the process proceeds to step S237.

In step S237, the scaling list setting unit 252 applies the default scaling list as the scaling list used for the quantization of the current block. When the process of step S236 is ended, the process proceeds to step S238.

In step S238, the determination unit 251 determines whether or not all the blocks (TU) are processed. In a case where it is determined that a non-processed block exists, the process returns to step S231, and the subsequent processes are repeated. The processes of step S231 to step S238 are repetitively performed, so that the process for each block is performed. In a case where it is determined in step S238 that all blocks (TU) are processed, the inverse quantization control process is ended, the process returns to FIG. 14.

By performing each process as described above, the image decoding device 200 can suppress an increased in quantization error, suppress a reduction in encoding efficiency, and suppress a deterioration in image quality caused by the encoding/decoding.

3. Third Embodiment

Detection of Slice Edge

With respect to the control (setting of the scaling list) of the quantization/inverse quantization described above, detection of a slice end (slice boundary) may be further performed, and the detection result may be reflected on the control.

A slice is a process unit which is independently encoded in a picture (image). An arbitrary number (single or multiple) of slices are formed in the picture. The intra prediction is independently performed for each slice. Namely, the reference pixels which are referred to in the intra prediction are also limited to the inside of the slice which includes the current block. Namely, in the block adjacent to the slice end (slice boundary) there is a possibility that the reference direction is limited.

Therefore, this limitation may be reflected on the custom scaling list.

For example, the block (including the block of the lower end of the screen) adjacent to the lower end of the slice is not referred to by the other block which is below the associated block. Namely, in the associated block, the pixels having a possibility to be referred to are only in the right-end column. Therefore, the custom scaling list like an example illustrated in FIG. 16 may be applied to the associated block.

As illustrated in FIG. 16, the custom scaling list is set so that only the values of the quantization steps in the right-end column corresponding to the pixels having a possibility to be referred to in the intra prediction are small.

In addition, for example, the block (including the block of the right end of the screen) adjacent to the right end of the slice is not referred to by the other block which is at the right of the associated block. Namely, in the associated block, the pixels having a possibility to be referred to are only in the lower-end row. Therefore, the custom scaling list like an example illustrated in FIG. 17 may be applied to the associated block.

As illustrated in FIG. 17, the custom scaling list is set so that only the values of the quantization steps in the lower-end row corresponding to the pixels having a possibility to be referred to in the intra prediction are small.

As illustrated in FIGS. 16 and 17, in the custom scaling list, the number of quantization steps of which values are set to be small is smaller than those of the examples of FIGS. 5 to 7. Namely, in the associated custom scaling list, the quantization steps corresponding to the pixels having no possibility to be referred to actually are not set to be small. Therefore, the slice end (slice boundary) is detected, and the custom scaling list reflecting the detection result is applied to the quantization/inverse quantization, so that it is possible to suppress an unnecessary increase in code amount caused by setting the quantization steps to be unnecessarily small. Accordingly, it is possible to suppress deterioration in image quality caused by the encoding/decoding.

In addition, in this case, similarly to the case described hereinbefore, the value of the quantization step corresponding to the pixel which has no possibility to be referred to in the intra prediction may not be uniform, and the value of the quantization step corresponding to the pixel which has a possibility to be referred to in the intra prediction may not be uniform. For example, each quantization step of the portion corresponding to the pixel which has a possibility to be referred to in the intra prediction may be configured to have a value according to the level of the possibility that the corresponding pixel is referred to in the intra prediction. Instead of setting the value of the quantization step corresponding to the pixel which has a possibility to be referred to in the intra prediction to be small, the value of the quantization step corresponding to the pixel which has no possibility to be referred to in the intra prediction may be set to be large.

[Quantization Controller]

Figure 18:
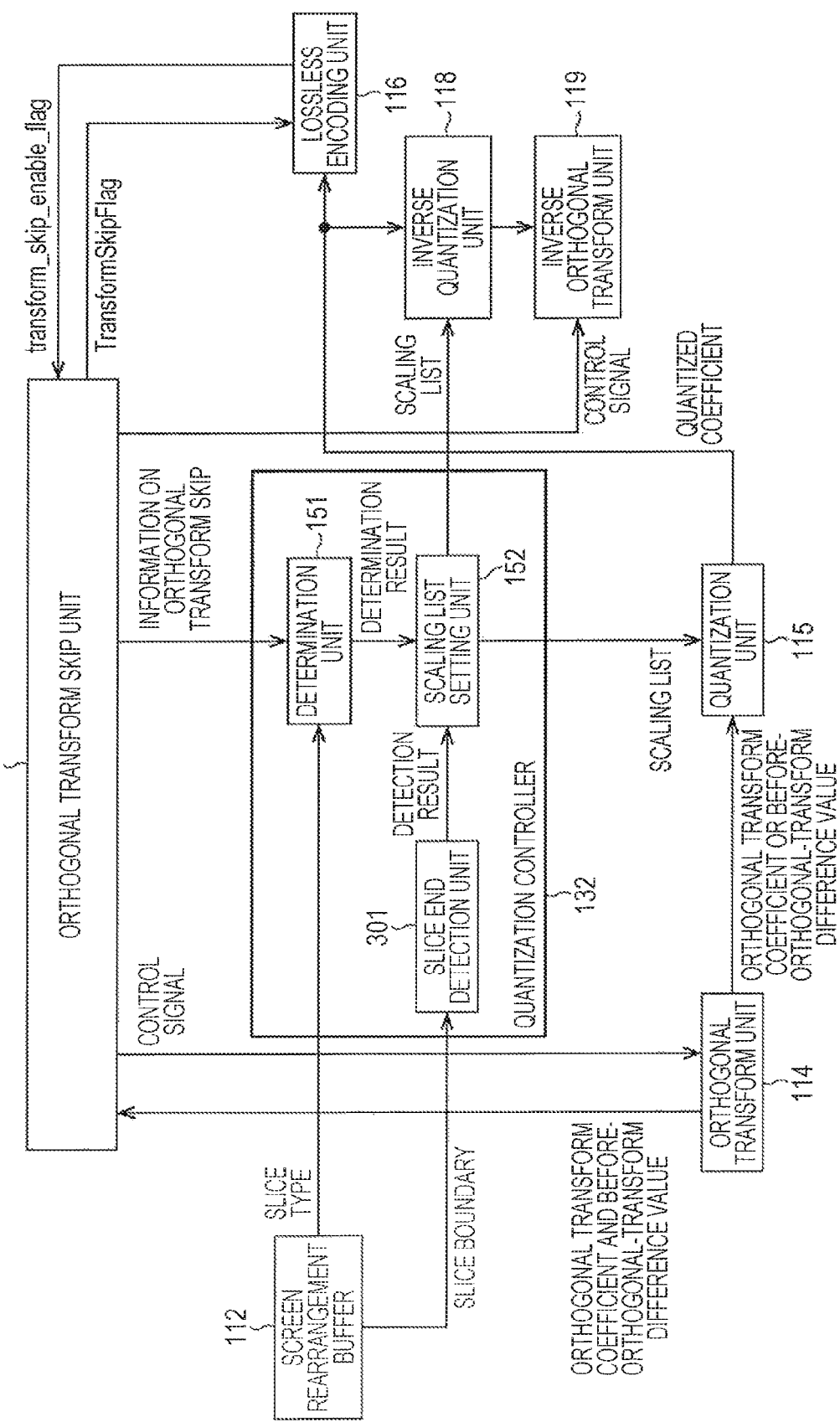
FIG. 18 is a block diagram illustrating an example of a main configuration of a quantization controller.

FIG. 18 is a block diagram illustrating an example of a main configuration of the quantization controller 132 in this case. As illustrated in FIG. 18, in this case, the quantization controller 132 is configured to include a slice end detection unit 301 in addition to the determination unit 151 and the scaling list setting unit 152.

The screen rearrangement buffer 112 supplies the information representing the slice end (slice boundary) to the slice end detection unit 301. The slice end detection unit 301 determines based on the information whether or not the current block is adjacent to the slice end. The slice end detection unit 301 supplies the detection result to the scaling list setting unit 152.

As described in the first embodiment, the scaling list setting unit 152 selects whether the custom scaling list is applied or the default scaling list is applied. In the case of applying the custom scaling list, the custom scaling list according to the detection result of the slice end supplied from the slice end detection unit 301 is applied.

The scaling list setting unit 152 supplies the set custom scaling list to the quantization unit 15 and the inverse quantization unit 118.

By doing in this manner, the image encoding device 100 can suppress an unnecessary increase in quantization error caused by setting the quantization steps to be unnecessarily small, can suppress an unnecessary increase in code amount, and can suppress deterioration in image quality caused by the encoding/decoding.

[Flow of Quantization Control Process]

Figure 19:
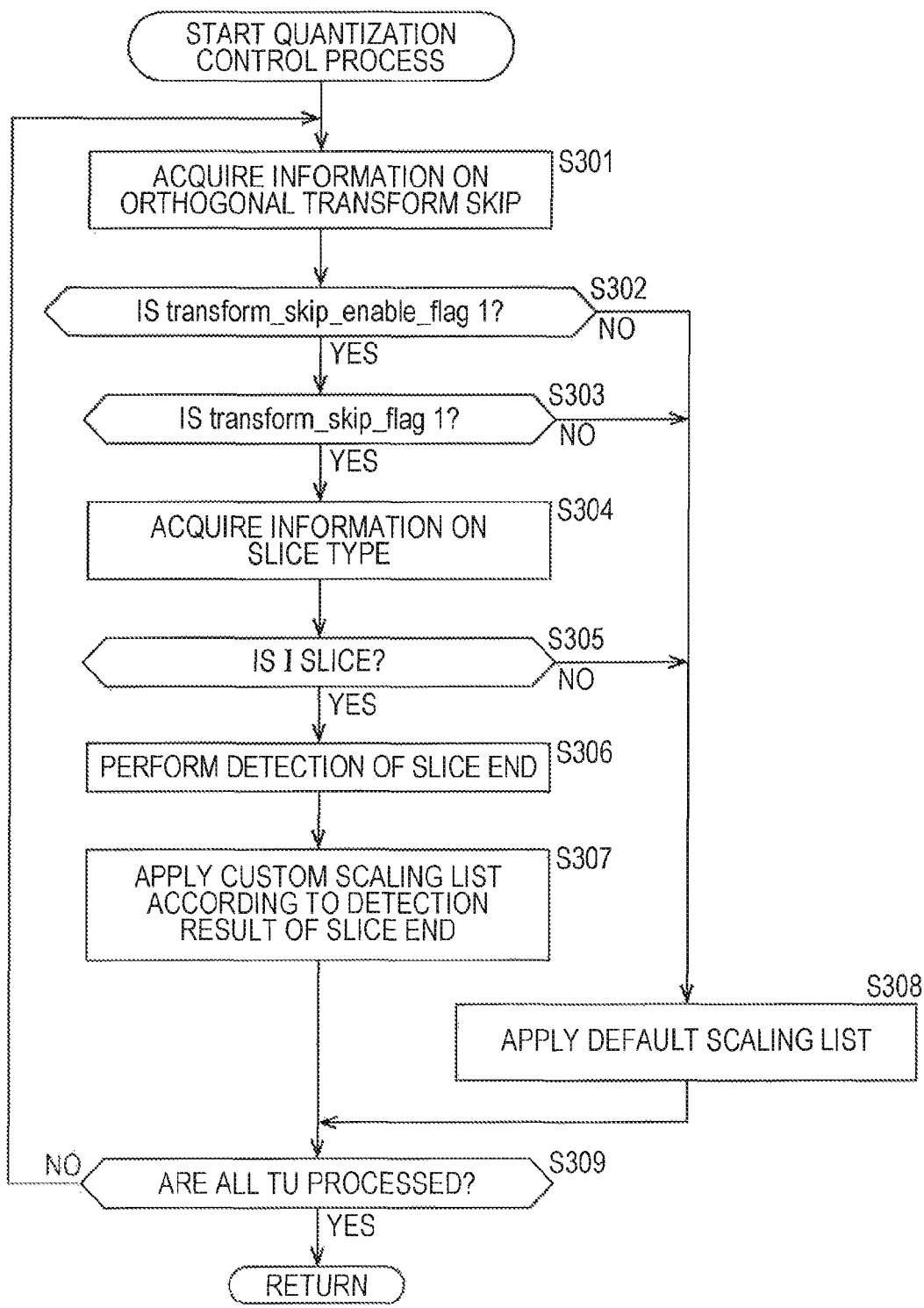
FIG. 19 is a flowchart illustrating an example of a flow of a quantization control process.

Next, an example of a flow of the quantization control process performed by the quantization controller 132 in this case will be described with reference to a flowchart of FIG. 19.

In this case, the quantization control process is also performed basically similarly to the case of the first embodiment. Namely, each process of steps S301 to S305 is performed similarly to each process of steps S131 to S135 of FIG. 11.

In step S306, the slice end detection unit 301 performs the detection of the slice end. In step S307, the scaling list setting unit 152 applies the custom scaling list according to the detection result of the slice end. When the process of step S307 is ended, the process proceeds to step S309.

In addition, in a case where it is determined in step S302 that the value of the skip enabling information (transform_skip_enable_flag) is false, in a case where it is determined in step S303 that the value of the skip identifying information (transform_skip_flag) is false, or in a case where it is determined in step S305 that the current slice is not the I slice, the process proceeds to step S308.

In step S308, the scaling list setting unit 152 applies the default scaling list as the scaling list used for the quantization of the current block. When the process of step S308 is ended, the process proceeds to step S309.

In step S309, the determination unit 151 determines whether or not all the blocks (TU) are processed. In a case where it is determined that a non-processed block exists, the process returns to step S301, and the subsequent processes are repeated. The processes of step S301 to step S309 are repetitively performed, so that the process for each block is performed. In a case where it is determined in step S309 that all blocks (TU) are processed, the quantization control process is ended, the process returns to FIG. 10.

By performing each process as described above, the image encoding device 100 can suppress an increased in quantization error, suppress a reduction in encoding efficiency, and suppress a deterioration in image quality caused by the encoding/decoding.

4. Fourth Embodiment

Inverse Quantization Controller

Figure 20:
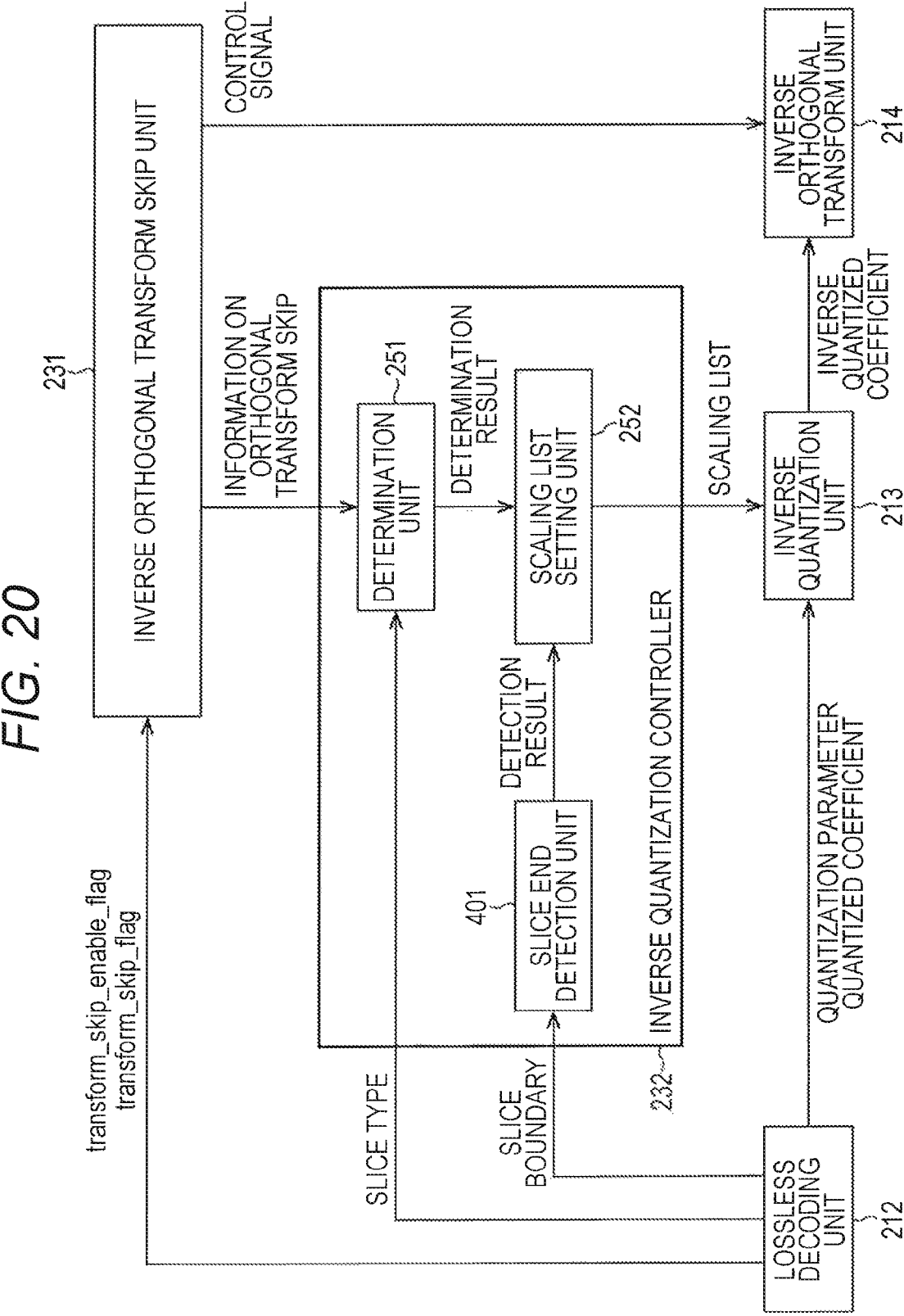
FIG. 20 is a block diagram illustrating an example of a main configuration of an inverse quantization controller.

FIG. 20 is a block diagram illustrating an example of a main configuration of the inverse quantization controller 232 in this case. As illustrated in FIG. 20, in this case, the inverse quantization controller 232 is configured to further include a slice end detection unit 401 in addition to the determination unit 251 and the scaling list setting unit 252. The slice end detection unit 401 is basically the same processing unit as that of the slice end detection unit 301.

The lossless decoding unit 212 supplies the information representing the slice end (slice boundary) extracted from the encoded data to the slice end detection unit 401. The slice end detection unit 401 determines based on the information whether or not the current block is adjacent to the slice end. The slice end detection unit 401 supplies the detection result to the scaling list setting unit 252.

As described in the second embodiment, the scaling list setting unit 252 selects whether the custom scaling list is applied or the default scaling list is applied. In the case of applying the custom scaling list, the custom scaling list according to the detection result of the slice end supplied from the slice end detection unit 401 is applied.

The scaling list setting unit 252 supplies the set custom scaling list to the inverse quantization unit 213.

By doing in this manner, the image decoding device 200 can suppress an unnecessary increase in quantization error caused by setting the quantization steps to be unnecessarily small, can suppress an unnecessary increase in code amount, and can suppress deterioration in image quality caused by the encoding/decoding.

[Flow of Inverse Quantization Control Process]

Figure 21:
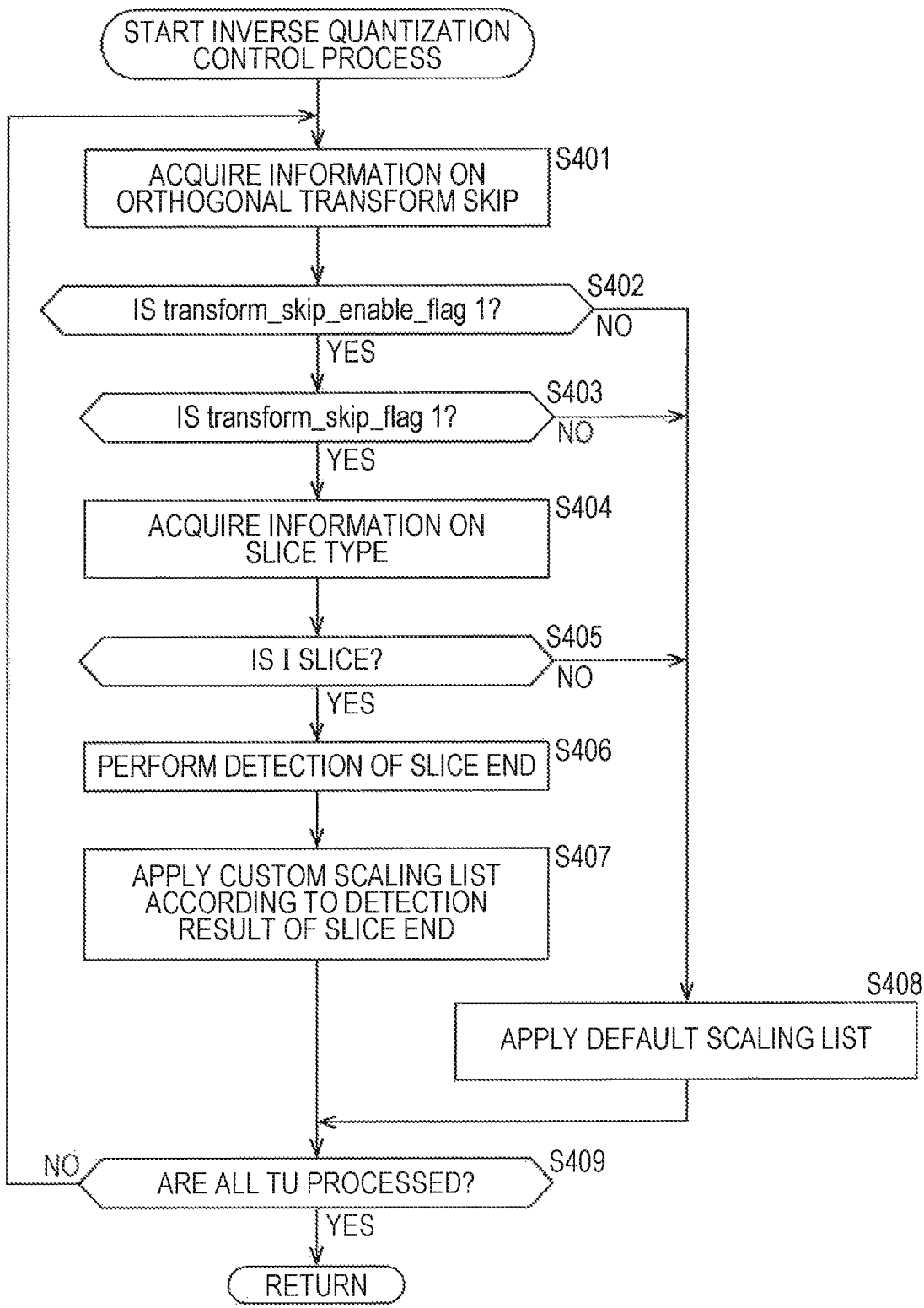
FIG. 21 is a flowchart illustrating an example of a flow of an inverse quantization control process.

Next, an example of a flow of the inverse quantization control process performed by the inverse quantization controller 232 in this case will be described with reference to a flowchart of FIG. 21.

In this case, the inverse quantization control process is also performed basically similarly to the case of the second embodiment. Namely, each process of steps S401 to S405 is performed similarly to each process of steps S231 to 3235 of FIG. 11.

In step S406, the slice end detection unit 401 performs the detection of the slice end. In step S407, the scaling list setting unit 252 applies the custom scaling list according to the detection result of the slice end. When the process of step S407 is ended, the process proceeds to step S409.

In addition, in a case where it is determined in step S402 that the value of the skip enabling information (transform_skip_enable_flag) is false, in a case where it is determined in step S403 that the value of the skip identifying information (transform_skip_flag) is false, or in a case where it is determined in step S405 that the current slice is not the I slice, the process proceeds to step S408.

In step S408, the scaling list setting unit 252 applies the default scaling list as the scaling list used for the quantization of the current block. When the process of step S408 is ended, the process proceeds to step S309.

In step S409, the determination unit 251 determines whether or not all the blocks (TU) are processed. In a case where it is determined that a non-processed block exists, the process returns to step S401, and the subsequent processes are repeated. The processes of step S401 to step 3409 are repetitively performed, so that the process for each block is performed. In a case where it is determined in step S409 that all blocks (TU) are processed, the inverse quantization control process is ended, the process returns to FIG. 14.

By performing each process as described above, the image decoding device 200 can suppress an increased in quantization error, suppress a reduction in encoding efficiency, and suppress a deterioration in image quality caused by the encoding/decoding.

5. Fifth Embodiment

Application to Multi-View Image Encoding/Multi-View Image Decoding

Figure 22:
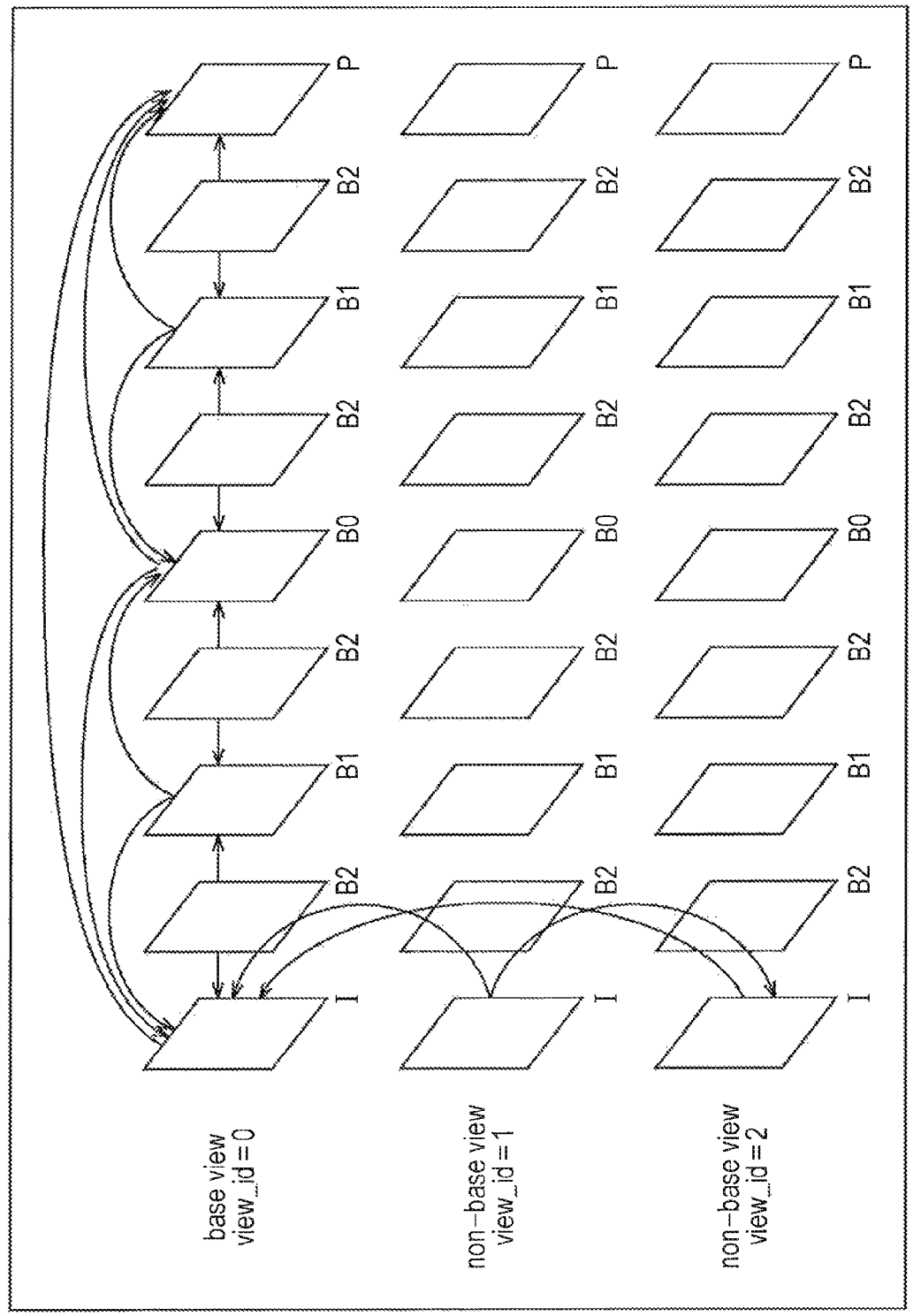
FIG. 22 is a diagram illustrating an example of a multi-view image encoding scheme.

A series of the processes described above may be applied to multi-view image encoding/multi-view image decoding. FIG. 22 illustrates an example of a multi-view image encoding scheme.

As illustrated in FIG. 22, the multi-view image includes images of multiple viewpoints, and the image of a predetermined one viewpoint among the multiple viewpoints is designated as an image of a base view. The image of each viewpoint other than the image of the base view is treated as an image of a non-base view.

In the case of encoding/decoding the multi-view image as illustrated in FIG. 22, the image of each view is encoded/decoded, and any one of the above-described embodiments may be applied to the encoding/decoding of each view. By doing in this manner, it is possible to realize a decrease in quantization error, and it is possible to realize suppression of deterioration in image quality caused by the encoding/decoding.

Furthermore, in the encoding/decoding of each view, the flags or parameters used in the methods according to the above-described embodiments may be configured to be shared.

More specifically, for example, the information on the skip of the orthogonal transform process including the information such as the skip enabling information (transform_skip_enable_flag) and the skip identifying information (transform_skip_flag) or the like may be configured to be shared in the encoding/decoding of each view. In addition, for example, the information on the slice type or the slice boundary may be configured to be shared in the encoding/decoding of each view.

Of course, necessary information other than the above information may also be configured to be shared in the encoding/decoding of each view.

[Multi-View Image Encoding Device]

Figure 23:
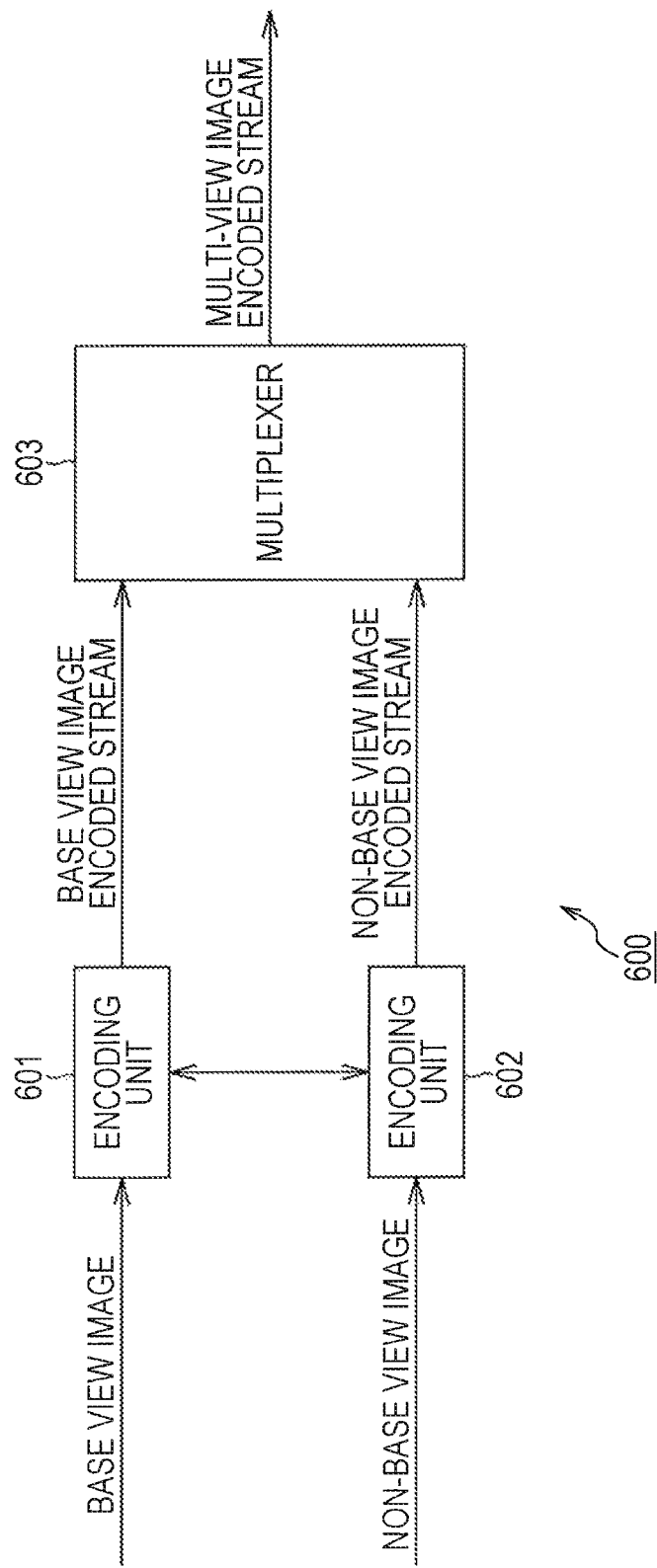
FIG. 23 is a diagram illustrating an example of a main configuration of a multi-view image encoding device to which the present technique is applied.

FIG. 23 is a diagram illustrating a multi-view image encoding device which performs the above-described multi-view image encoding. As illustrated in FIG. 23, a multi-view image encoding device 600 is configured to include an encoding unit 601, an encoding unit 602, and a multiplexer 603.

The encoding unit 601 encodes the base view image to generate a base view image encoded stream. The encoding unit 602 encodes the non-base view image to generate a non-base view image encoded stream. The multiplexer 603 multiplexes the base view image encoded stream generated by the encoding unit 601 and the non-base view image encoded stream generated by the encoding unit 602 to generate a multi-view image encoded stream.

The image encoding device 100 may be applied to the encoding unit 601 and the encoding unit 602 of the multi-view image encoding device 600. In addition, as described above, the encoding unit 601 and the encoding unit 602 may perform the setting of the scaling list or the like by using the same flags or parameters (namely, the flags or the parameters may be shared).

[Multi-View Image Decoding Device]

Figure 24:
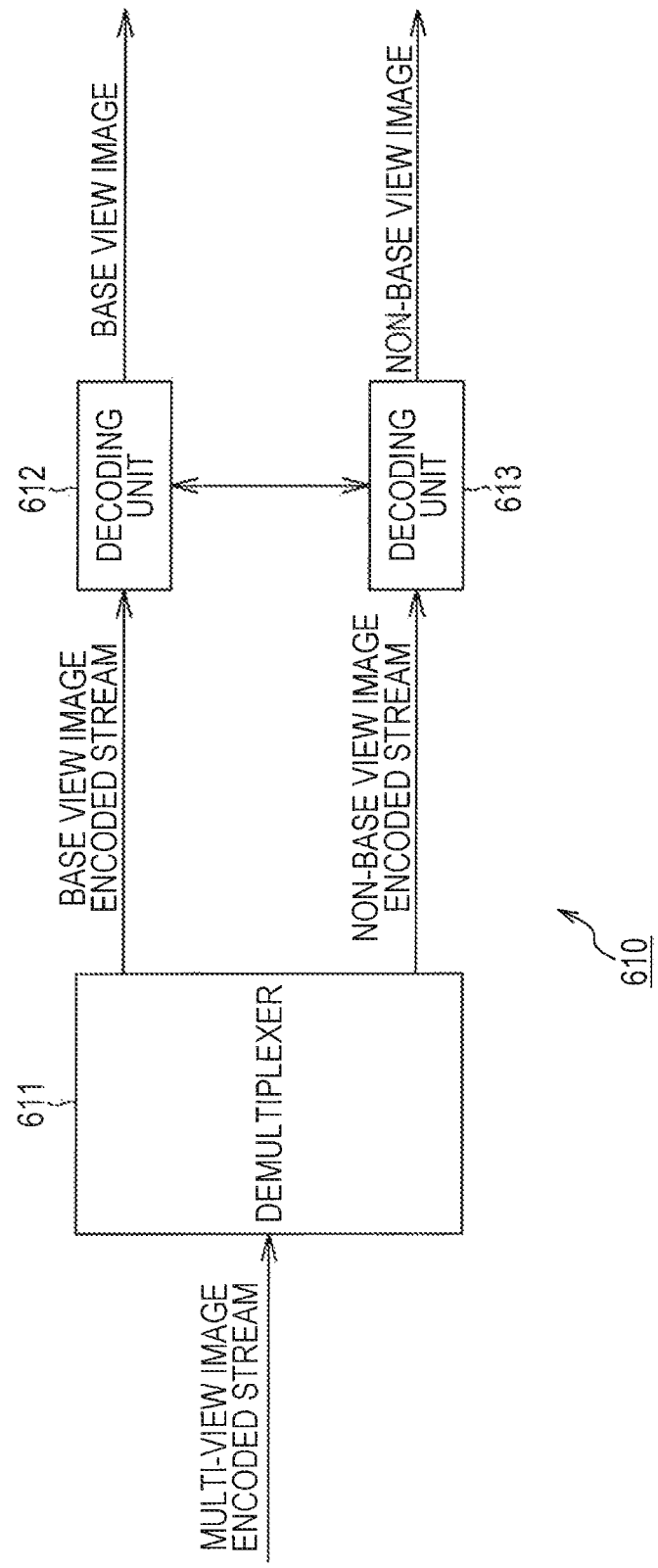
FIG. 24 is a diagram illustrating an example of a main configuration of a multi-view image decoding device hierarchical image encoding device to which the present technique is applied.

FIG. 24 is a diagram illustrating a multi-view image decoding device which performs the above-described multi-view image decoding. As illustrated in FIG. 24, a multi-view image decoding device 610 is configured to include a demultiplexer 611, a decoding unit 612, and a decoding unit 613.

The demultiplexer 611 demultiplexes the multi-view image encoded stream where the base view image encoded stream and the non-base view image encoded stream are multiplexed to extract the base view image encoded stream and the non-base view image encoded stream. The decoding unit 612 decodes the base view image encoded stream extracted by the demultiplexer 611 to acquire a base view image. The decoding unit 613 decodes the non-base view image encoded stream extracted by the demultiplexer 611 to acquire a non-base view image.

The image decoding device 200 may be applied to the decoding unit 612 and the decoding unit 613 of the multi-view image decoding device 610. In addition, as described above, the decoding unit 612 and the decoding unit 613 may perform the setting of the scaling list or the like by using the same flags or parameters (namely, the flags or the parameters may be shared).

6. Sixth Embodiment

Application to Hierarchical Image Encoding/Hierarchical Image Decoding

Figure 25:
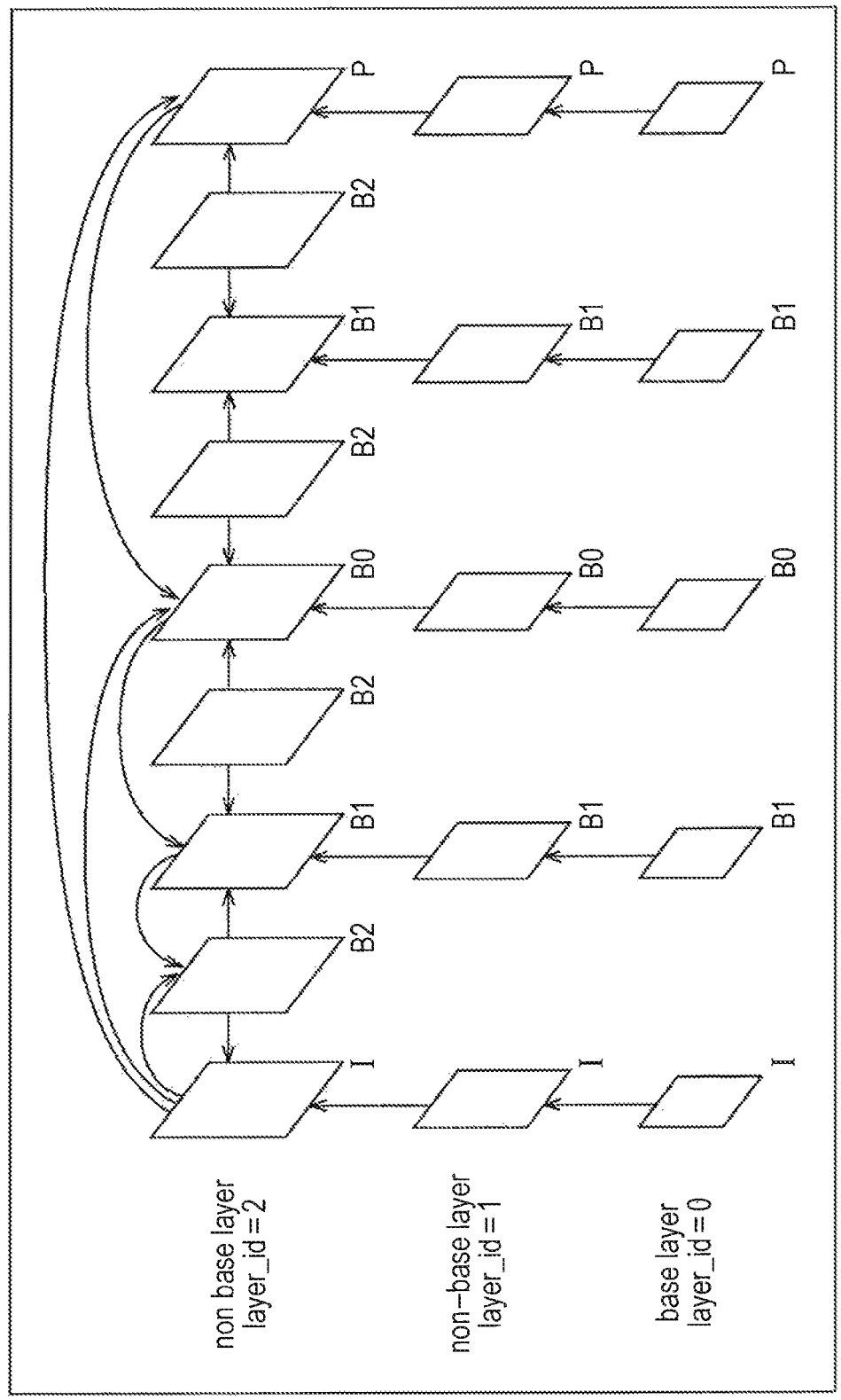
FIG. 25 is a diagram illustrating an example of a hierarchical image encoding scheme.

A series of the processes described above may be applied to hierarchical image encoding/hierarchical image decoding. FIG. 25 illustrates an example of a multi-view image encoding scheme.

As illustrated in FIG. 25, the hierarchical image includes images of multiple layers (resolution), and the image of a predetermined one layer among the multiple resolution is designated as an image of a base layer. The image of each layer other than the image of the base layer is treated as an image of a non-base layer.

In the case of encoding/decoding the hierarchical image as illustrated in FIG. 25, the image of each layer is encoded/decoded, and any one of the above-described embodiments may be applied to the encoding/decoding of each layer. By doing in this manner, it is possible to suppress deterioration of the image, and it is possible to realize reduction in memory access amount and a reduction in calculation amount.

Furthermore, in the encoding/decoding of each layer, the flags or parameters used in the methods according to the above-described embodiments may be configured to be shared.

More specifically, for example, the information on the skip of the orthogonal transform process including the information such as the skip enabling information (transform_skip_enable_flag) and the skip identifying information (transform_skip_flag) or the like may be configured to be shared in the encoding/decoding of each layer. In addition, for example, the information on the slice type or the slice boundary may be configured to be shared in the encoding/decoding of each layer.

Of course, necessary information other than the above information may also be configured to be shared in the encoding/decoding of each layer.

[Hierarchical Image Encoding Device]

Figure 26:
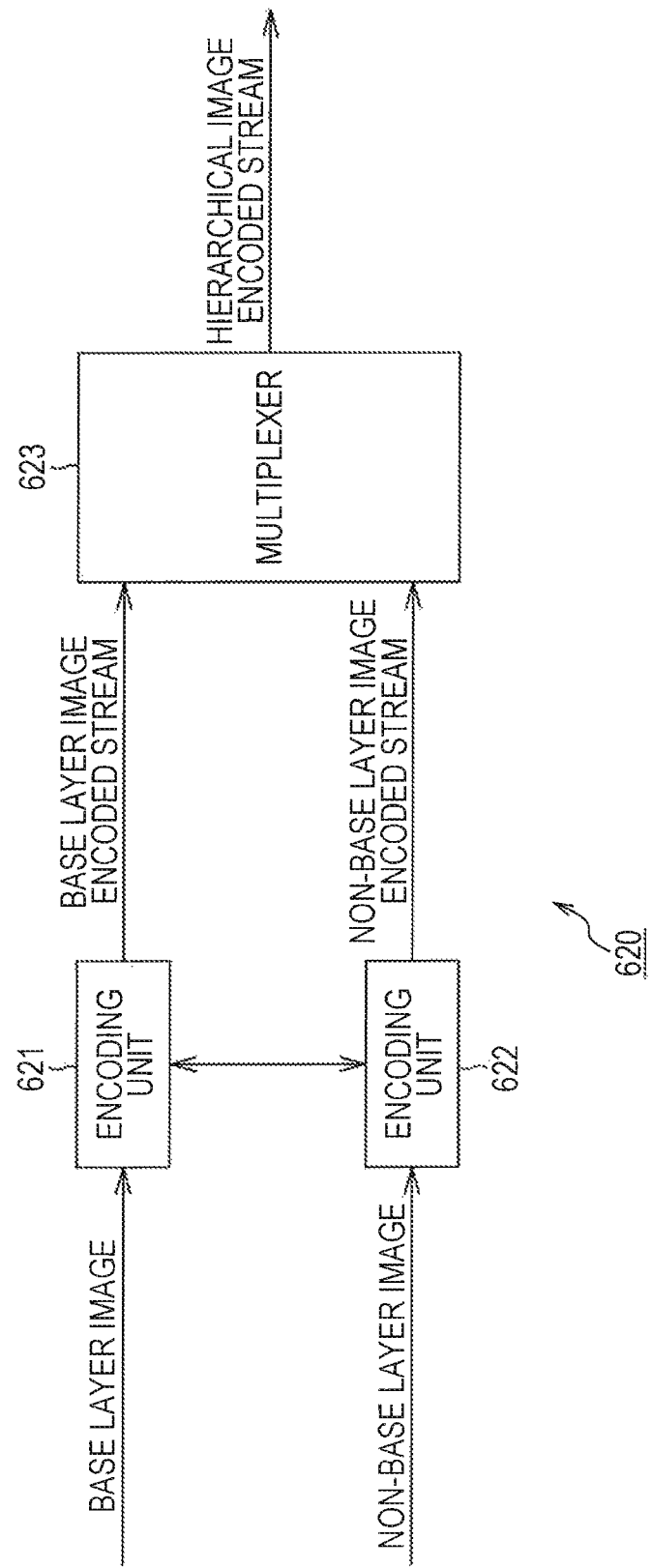
FIG. 26 is a diagram illustrating an example of a main configuration of a hierarchical image encoding device to which the present technique is applied.

FIG. 26 is a diagram illustrating a hierarchical image encoding device which performs the above-described hierarchical image encoding. As illustrated in FIG. 26, a hierarchical image encoding device 620 is configured to include an encoding unit 621, an encoding unit 622, and a multiplexer 623.

The encoding unit 621 encodes the base layer image to generate a base layer image encoded stream. The encoding unit 622 encodes the non-base layer image to generate a non-base layer image encoded stream. The multiplexer 623 multiplexes the base layer image encoded stream generated by the encoding unit 621 and the non-base layer image encoded stream generated by the encoding unit 622 to generate a hierarchical image encoded stream.

The image encoding device 100 may be applied to the encoding unit 621 and the encoding unit 622 of the hierarchical image encoding device 620. In addition, as described above, the encoding unit 621 and the encoding unit 622 may perform the setting of the scaling list or the like by using the same flags or parameters (namely, the flags or the parameters may be shared).

[Hierarchical Image Decoding Device]

Figure 27:
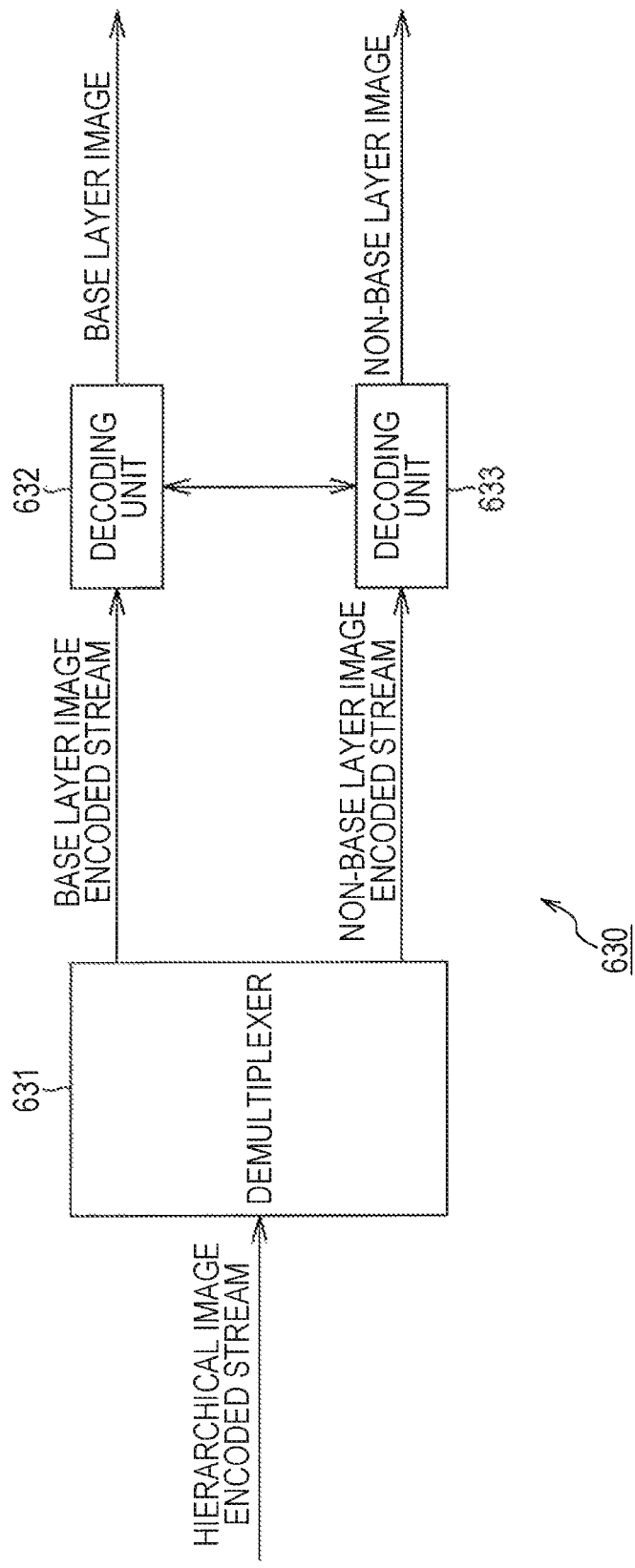
FIG. 27 is a diagram illustrating an example of a main configuration of a hierarchical image decoding device to which the present technique is applied.

FIG. 27 is a diagram illustrating a hierarchical image decoding device which performs the above-described hierarchical image decoding. As illustrated in FIG. 27, a hierarchical image decoding device 630 is configured to include a demultiplexer 631, a decoding unit 632, and a decoding unit 633.

The demultiplexer 631 demultiplexes the hierarchical image encoded stream where the base layer image encoded stream and the non-base layer image encoded stream are multiplexed to extract the base layer image encoded stream and the non-base layer image encoded stream. The decoding unit 632 decodes the base layer image encoded stream extracted by the demultiplexer 631 to acquire a base layer image. The decoding unit 633 decodes the non-base layer image encoded stream extracted by the demultiplexer 631 to acquire a non-base layer image.

The image decoding device 200 may be applied to the decoding unit 632 and the decoding unit 633 of the hierarchical image decoding device 630. In addition, as described above, the decoding unit 632 and the decoding unit 633 may perform the setting of the scaling list or the like by using the same flags or parameters (namely, the flags or the parameters may be shared).

Furthermore, the present technique may be applied to HTTP streaming such as MPEG DASH which selectively uses appropriate one among multiple encoded data having different resolutions, which are prepared in advance, in units of a segment.

As described above, with respect to the application range of the present technique, the present technique may be applied to all the image encoding devices and image decoding devices which are based on the quantization/inverse quantization process and the encoding/decoding scheme using the quantization/inverse quantization process and the skip (Transform Skip) of the orthogonal transform/inverse orthogonal transform.

In addition, the present technique may be applied to the image encoding device and the image decoding device which are used when receiving the image information (bit stream) compressed by the orthogonal transform such discrete cosine transform and motion compensation, for example, in MPEG, H.26x, or the like, through satellite broadcasting, cable television, a network medium such as the Internet or a mobile phone. In addition, the present technique may be applied to the image encoding device and the image decoding device which are used when processing on a storage medium such as an optical disc, a magnetic disc, or flash memory. Furthermore, the present technique may also be applied to the orthogonal transform device or the inverse orthogonal transform device which is included in the image encoding device, the image decoding device, and the like.

7. Seventh Embodiment

Computer

A series of the processes described above may be executed by hardware or executed by software. In a case where a series of the processes are executed by software, programs constituting the software are installed in a computer. Herein, the computer includes a computer incorporated in dedicated hardware or a general-purpose personal computer where various programs are installed to execute various functions, and the like.

Figure 28:
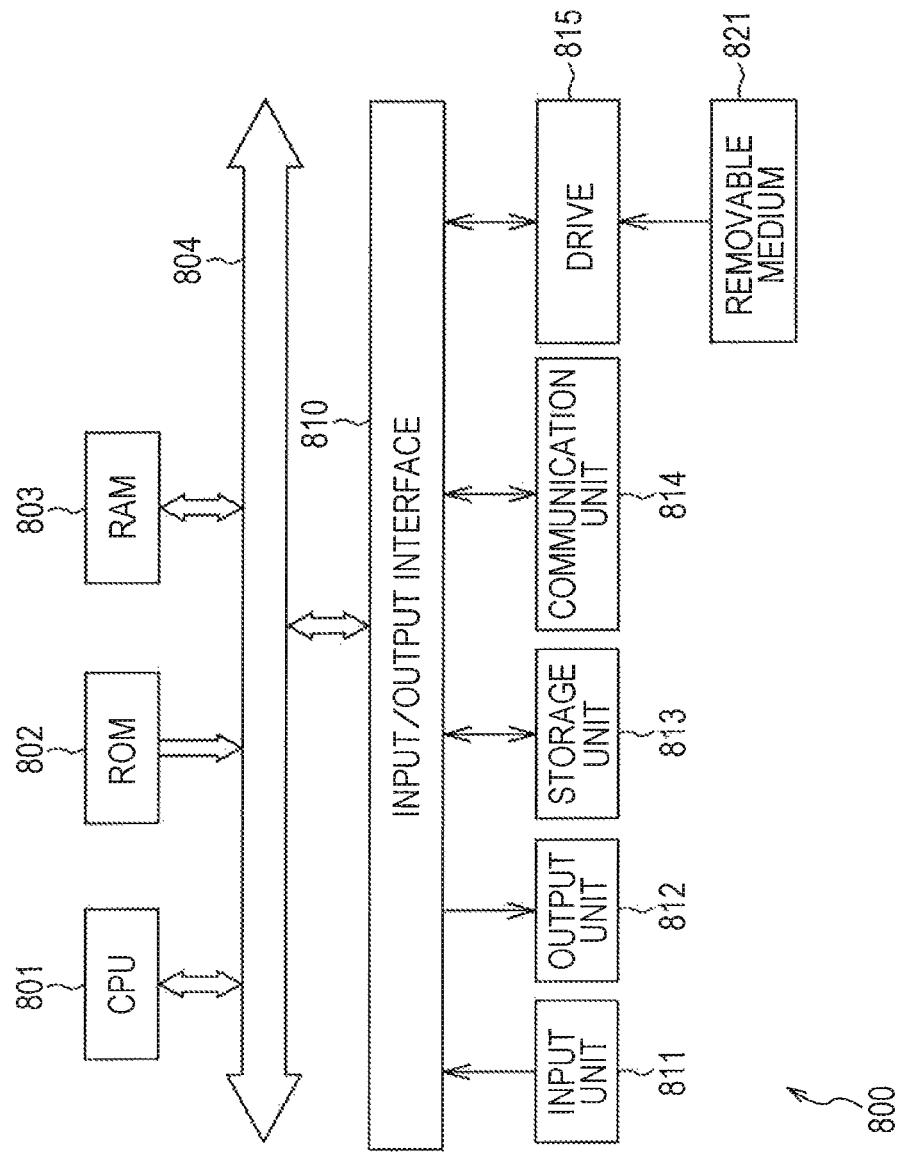
FIG. 28 is a block diagram illustrating an example of a main configuration of a computer.

FIG. 28 is a block diagram illustrating an example of a configuration of hardware of a computer which executes a series of processes described above by programs.

In a computer 800 illustrated in FIG. 28, a CPU (Central Processing Unit) 801, ROM (Read Only Memory) 802, and RAM (Random Access Memory) 803 are connected to each other via a bus 804.

In addition, an input/output interface 810 is also connected to the bus 804. An input unit 811, an output unit 812, a storage unit 813, a communication unit 814, and a drive 815 are connected to the input/output interface 810.

The input unit 811 is configured to include, for example, a keyboard, a mouse, a microphone, a touch panel, an input terminal, and the like. The output unit 812 is configured to include, for example, a display, a speaker, an output terminal, and the like. The storage unit 813 is configured to include, for example, a hard disk, a RAM disk, non-volatile memory, and the like. The communication unit 814 is configured to include, for example, a network interface. The drive 815 drives a removable medium 821 such as a magnetic disc, an optical disc, a magneto-optical disc, semiconductor memory, or the like.

In the computer having the configuration described above, the CPU 801 loads the program stored in, for example, the storage unit 813 on the RAM 803 through the input/output interface 810 and the bus 804 and executes the program, so that a series of the processes described above are performed. The RAM 803 also appropriately includes data or the like required by the CPU 801 executing various processes.

The program executed by the computer (CPU 801) may be recorded in, for example, the removable medium 821 as a package medium or the like to be applied. In addition, the program may be provided through a wired or wireless transmission medium including a local area network, the Internet, digital satellite broadcasting, and the like.

In the computer, the program may be installed in the storage unit 813 through the input/output interface 810 by mounting the removable medium 821 on the drive 815. In addition, the program may be received through the wired or wireless transmission medium by using the communication unit 814 and may be installed in the storage unit 813. Besides, the program may be installed in the ROM 802 or the storage unit 813 in advance.

Furthermore, the program executed by the computer may be a program which performs processes in time series according to an order described in the specification or may be a program which performs processes in parallel or at necessary timing such as at the time when a call is made.

In addition, in the specification, steps describing the program recorded in the recording medium include processes which are performed in time series according to a written order and processes which are performed in parallel or individually even without being processed in time series.

In addition, in the specification, the term "system" denotes a set of multiple components (devices, modules (parts), and the like), and it does not matter whether or not all components are enclosed in the same case. Therefore, multiple devices which are accommodated in separate cases and are connected to each other via a network and one device configured so that multiple modules are accommodated in one case are a system.

In addition, in the above description, the configuration described as one device (or a processing unit) may be divided so as to be configured as multiple devices (or processing units). On the contrary, in the above description, the configurations described as multiple devices (or processing units) may be collectively configured as one device (or a processing unit). In addition, the configuration of each device (or each processing unit) may be added with other configurations described above. Furthermore, if the configurations or operations of the overall system are substantially the same, a portion of the configuration of any one device (or a processing unit) may be included in the configuration of another device (or another device).

Heretofore, while the preferred embodiments of the present disclosure are described with reference to the attached drawings, the present disclosure is not limited the examples. It is obvious that various modifications or changes can be contrived within the scope of the technical spirit disclosed in the claims by the ordinarily skilled in the technical field to which the present disclosure belongs, and it should be understood that these are included in the technical scope of the present disclosure.

For example, the present technique may have a configuration of cloud computing where one function is shared by multiple devices through a network to be cooperatively processed.

In addition, each step described in the above-described flowcharts may be shared by multiple devices to be performed in addition to being performed by one device.

Furthermore, in a case where multiple processes are included in one step, the multiple processes included in the one step may be shared by multiple devices to be performed in addition to being performed by one device.

The image encoding devices and the image decoding devices according to the above-described embodiments may be applied to various electronic devices such as a transmitter or a receiver in satellite broadcasting, wired broadcasting such as cable TV, delivery on the Internet, or delivery to a terminal through cellular communication, a recording device which records an image in a medium such as an optical disc, a magnetic disc, and flash memory, or a reproducing device which reproduces an image from a storage medium described above. Hereinafter, four application examples will be described.

8. Application Example

First Application Example

Television Receiver

Figure 29:
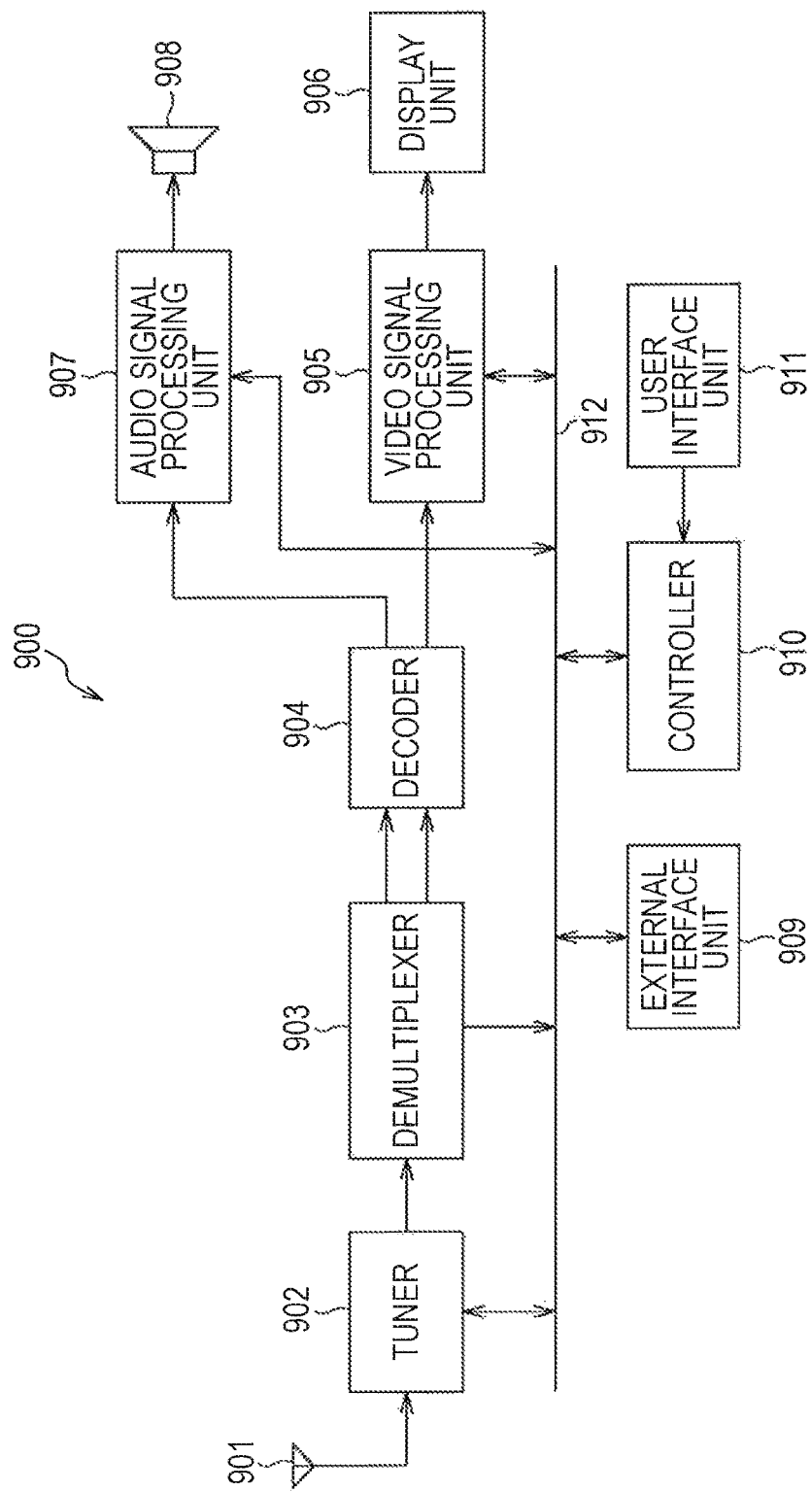
FIG. 29 is a block diagram illustrating an example of a schematic configuration of a television apparatus.

FIG. 29 illustrates an example of a schematic configuration of a television apparatus employing the above-described embodiments. A television apparatus 900 is configured to include an antenna 901, a tuner 902, a demultiplexer 903, a decoder 904, a video signal processing unit 905, a display unit 906, an audio signal processing unit 907, a speaker 908, an external interface 909, a controller 910, a user interface 911, and a bus 912.

The tuner 902 extracts signals of a desired channel from broadcast signals received through the antenna 901 and demodulates the extracted signals. Next, the tuner 902 outputs an encoded bit stream obtained through the demodulation to the demultiplexer 903. Namely, the tuner 902 has a function as a transmission unit in the television apparatus 900 which receives the encoded stream where the image is encoded.

The demultiplexer 903 separates a video stream and an audio stream of a current viewing program from the encoded stream and outputs each separated stream to the decoder 904. In addition, the demultiplexer 903 extracts auxiliary data such as EPG (Electronic Program Guide) from the encoded bit stream and supplies the extracted data to the controller 910. Furthermore, in a case where the encoded bit stream is scrambled, demultiplexer 903 may perform descrambling.

The decoder 904 decodes the video stream and the audio stream which are input from the demultiplexer 903. Next, the decoder 904 outputs the video data generated by the decoding process to the video signal processing unit 905. In addition, the decoder 904 outputs the audio data generated by the decoding process to the audio signal processing unit 907.

The video signal processing unit 905 reproduces the video data input from the decoder 904 and displays the video on the display unit 906. In addition, the video signal processing unit 905 may display an application screen supplied through a network on the display unit 906. In addition, the video signal processing unit 905 may also perform an additional process such as noise removing according to settings on the video data. Furthermore, the video signal processing unit 905 may generate an image of GUI (Graphical User Interface) such as a menu, a button, or a cursor and superimposes the generated image on the output image.

The display unit 906 is driven according to driving signals supplied from the video signal processing unit 905 and displays a video or an image on a video plane of the display device (for example, a liquid crystal display, a plasma display, an OELD (Organic Electro-Luminescence Display) (organic EL display), or the like).

The audio signal processing unit 907 performs reproducing process such as D/A conversion, amplification, and the like on the audio data input from the decoder 904 and outputs the audio from the speaker 908. In addition, the audio signal processing unit 907 may also perform additional process such as noise removing on the audio data.

The external interface 909 is an interface for connecting the television apparatus 900 with an external device or a network. For example, the video stream or the audio stream received through the external interface 909 may be decoded by the decoder 904. Namely, the external interface 909 also has a function as a transmission unit in the television apparatus 900 which receives the encoded stream where the image is encoded.

The controller 910 is configured to include a processor such as a CPU and a memory such as RAM and ROM. The memory stores programs executed by the CPU, program data, EPG data, data acquired through the network, and the like. The program stored in the memory is read out by the CPU to be executed, for example, at the time of starting up the television apparatus 900. The CPU executes the program to control operations of the television apparatus 900 in response to manipulation signals input from, for example, the user interface 911.

The user interface 911 is connected to the controller 910. The user interface 911 is configured to include, for example, buttons and switches by which the user manipulates the television apparatus 900, a reception unit for remote control signals, or the like. The user interface 911 detects user's manipulation through these components to generate a manipulation signal and outputs the generated manipulation signal to the controller 910.

The tuner 902, the demultiplexer 903, the decoder 904, the video signal processing unit 905, the audio signal processing unit 907, the external interface 909, and the controller 910 are connected to each other via the bus 912.

In the television apparatus 900 having the configuration described above, the decoder 904 has the functions of the image decoding device 200 according to the above-described embodiment. Therefore, during the decoding of the image in the television apparatus 900, it is possible to realize a decrease in quantization error, and it is possible to suppress deterioration in image quality caused by the encoding/decoding.

Second Application Example

Mobile Phone

Figure 30:
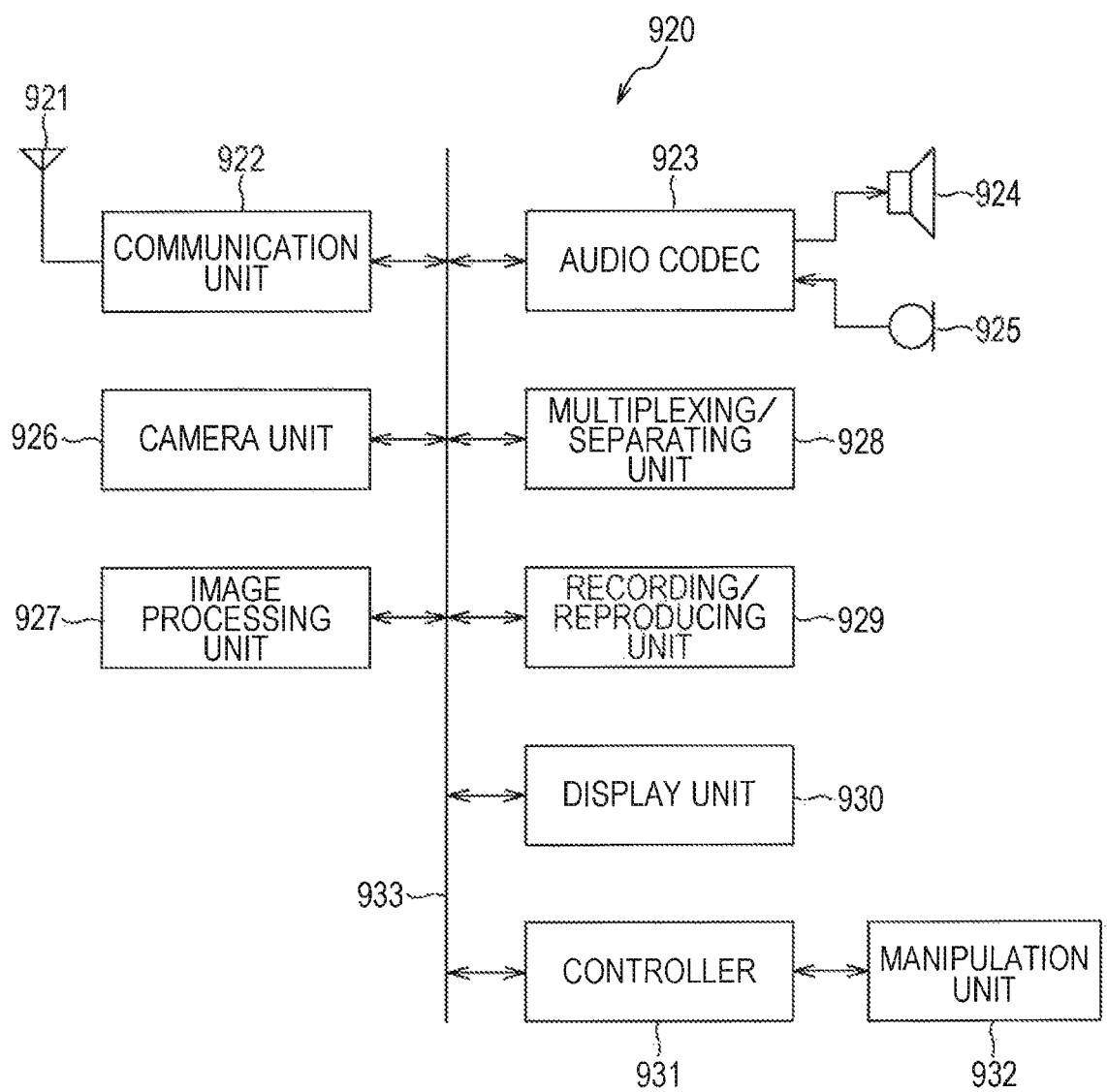
FIG. 30 is a block diagram illustrating an example of a schematic configuration of a mobile phone.

FIG. 30 illustrates an example of a schematic configuration of a mobile phone employing the above-described embodiments. A mobile phone 920 is configured to include an antenna 921, a communication unit 922, an audio codec 923, a speaker 924, a microphone 925, a camera unit 926, an image processing unit 927, a multiplexing/separating unit 928, a recording/reproducing unit 929, a display unit 930, a controller 931, a manipulation unit 932, and a bus 933.

The antenna 921 is connected to the communication unit 922. The speaker 924 and the microphone 925 are connected to the audio codec 923. The manipulation unit 932 is connected to the controller 931. The communication unit 922, the audio codec 923, the camera unit 926, the image processing unit 927, the multiplexing/separating unit 928, the recording/reproducing unit 929, the display unit 930, and the controller 931 are connected to each other via the bus 933.

The mobile phone 920 performs operations such as transmission and reception of audio signals, transmission and reception of electronic mails or image data, imaging, and data recording in various operation modes such as a voice call mode, a data communication mode, an imaging mode, and a TV phone mode.

In the voice call mode, analog audio signals generated by the microphone 925 are supplied to the audio codec 923. The audio codec 923 converts the analog audio signals into audio data and A/D-converts the converted audio data to compress the audio data. Next, the audio codec 923 outputs the compressed audio data to the communication unit 922. The communication unit 922 encodes and modulates the audio data to generate transmission signals. Next, the communication unit 922 transmits the generated transmission signals through the antenna 921 to a base station (not shown). In addition, the communication unit 922 amplifies and frequency-transforms radio signals received through the antenna 921 to acquire reception signals. Next, the communication unit 922 demodulates and decodes the reception signals to generated audio data and outputs the generated audio data to the audio codec 923. The audio codec 923 extends and D/A-converts the audio data to generate analog audio signals. Next, the audio codec 923 supplies the generated audio signals to the speaker 924 to output audio.

In addition, in the data communication mode, for example, the controller 931 generates text data constituting an electronic mail in response to user's manipulation through the manipulation unit 932. In addition, the controller 931 displays the text on the display unit 930. In addition, the controller 931 generates electronic mail data in response to a transmission instruction through the manipulation unit 932 from a user and outputs the generated electronic mail data to the communication unit 922. The communication unit 922 encodes and modulates the electronic mail data to generate transmission signals. Next, the communication unit 922 transmits the generated transmission signals through the antenna 921 to a base station (not shown). In addition, the communication unit 922 amplifies and frequency-transform the radio signals received through the antenna 921 to acquire reception signals. Next, the communication unit 922 demodulates and decodes the reception signals to recover the electronic mail data and outputs the recovered electronic mail data to the controller 931. The controller 931 displays a content of the electronic mail on the display unit 930 and stores the electronic mail data in a storage medium of the recording/reproducing unit 929.

The recording/reproducing unit 929 is configured to include an arbitrary readable/writable storage medium. For example, the storage medium may be a built-in storage medium such as RAM or flash memory or may be an external mounted storage medium such as a hard disk, a magnetic disc, a magneto-optical disc, an optical disc, a USB (Unallocated Space Bitmap) memory, or a memory card.

In addition, in the imaging mode, for example, the camera unit 926 generates image data by imaging a subject and outputs the generated image data to the image processing unit 927. The image processing unit 927 encodes the image data input from the camera unit 926 and stores the encoded stream in the storage medium of the storing/reproducing unit 929.

In addition, in the TV phone mode, for example, the multiplexing/separating unit 928 multiplexes the video stream encoded by the image processing unit 927 and the audio stream input from the audio codec 923 and outputs the multiplexed stream to the communication unit 922. The communication unit 922 encodes and modulates the stream to generate transmission signals. Next, the communication unit 922 transmits the generated transmission signals through the antenna 921 to a base station (not shown). In addition, the communication unit 922 amplifies and frequency-transforms the radio signals received though the antenna 921 to acquire reception signals. The transmission signals and the reception signals may include an encoded bit stream. Next, the communication unit 922 demodulates and decodes the reception signals to recover the stream and outputs the recovered stream to the multiplexing/separating unit 928. The multiplexing/separating unit 928 separates the video stream and the audio stream from the input stream and outputs the video stream to the image processing unit 927 and outputs the audio stream to the audio codec 923. The image processing unit 927 decodes the video stream to generate the video data. The video data are supplied to the display unit 930, so that a series of images are displayed by the display unit 930. The audio codec 923 extends and D/A-converts the audio stream to generate analog audio signals. Next, the audio codec 923 supplies the generated audio signals to the speaker 924 to output audio.

In the mobile phone 920 having the configuration described above, the image processing unit 927 has the functions of the image encoding device 100 and the image decoding device 200 according to the above-described embodiment. Therefore, during the encoding and the decoding of the image in the mobile phone 920, it is possible to realize a decrease in quantization error, and it is possible to suppress deterioration in image quality caused by the encoding/decoding.

Third Application Example

Recording/Reproducing Device

Figure 31:
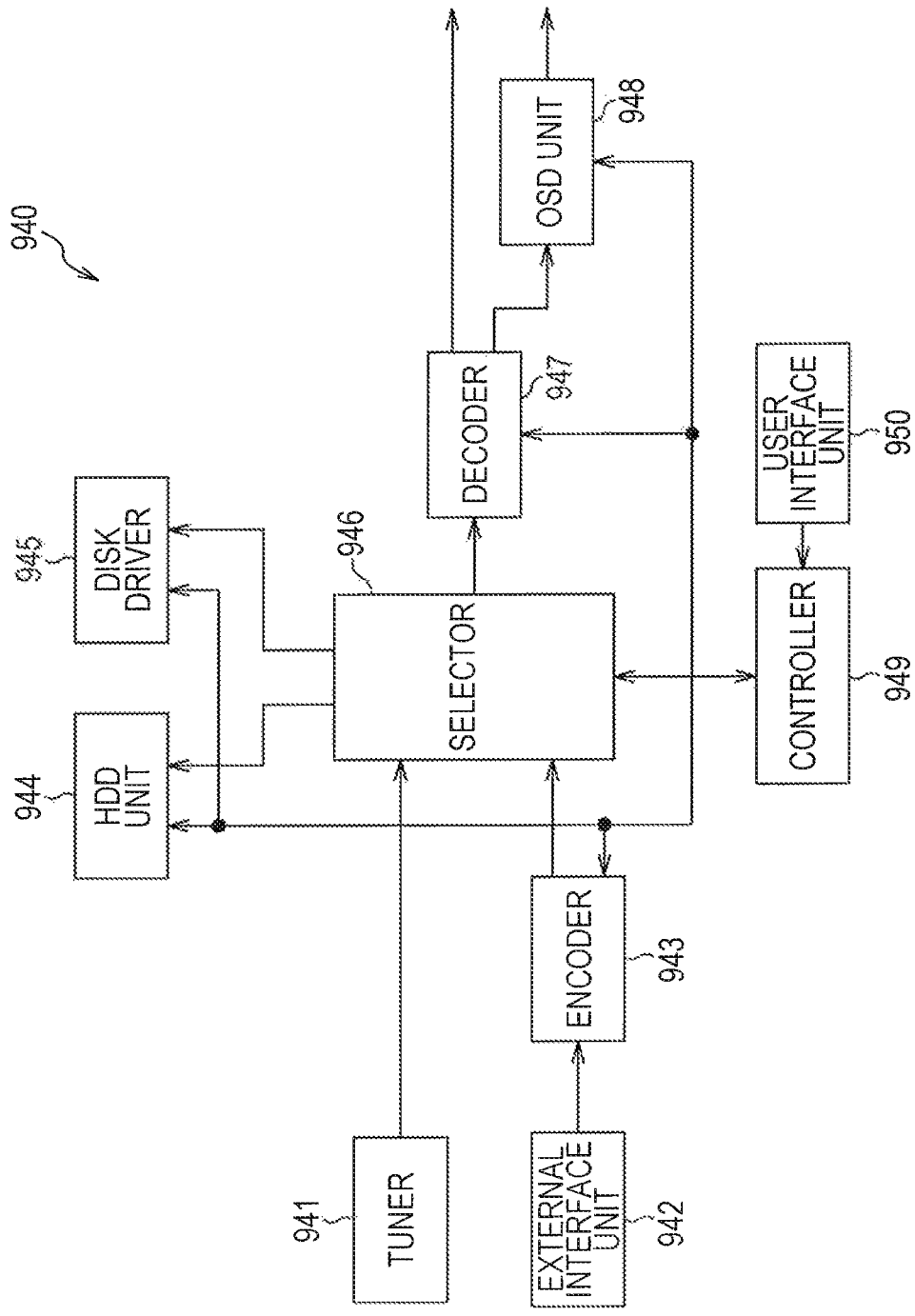
FIG. 31 is a block diagram illustrating an example of a schematic configuration of a recording/reproducing device.

FIG. 31 illustrates an example of a schematic configuration of a recording/reproducing device employing the above-described embodiments. The recording/reproducing device 940 encodes audio data and video data of, for example, a received broadcast program and records the audio data and the video data in the recording medium. In addition, the recording/reproducing device 940 encodes audio data and video data acquired from, for example, other devices and records the audio data and the video data in the recording medium. In addition, the recording/reproducing device 940 reproduces data stored in the recording medium on a monitor or a speaker, for example, in response to a user's instruction. At this time, the recording/reproducing device 940 decodes the audio data and the video data.

The recording/reproducing device 940 is configured to include a tuner 941, an external interface 942, an encoder 943, an HDD (Hard Disk Drive) 944, a disk driver 945, a selector 946, a decoder 947, an OSD (On-Screen Display) 948, a controller 949, and a user interface 950.

The tuner 941 extracts signals of a desired channel from broadcast signals received through an antenna (not shown) and demodulates the extracted signals. Next, the tuner 941 outputs an encoded bit stream obtained through the demodulation to the selector 946. Namely, the tuner 941 has a function as a transmission unit in the recording/reproducing device 940.

The external interface 942 is an interface for connecting the recording/reproducing device 940 with an external device or a network. The external interface 942 may be, for example, an IEEE 1394 interface, a network interface, a USB interface, flash memory interface, or the like. For example, the video data and the audio data received through the external interface 942 are input to the encoder 943. Namely, the external interface 942 has a function as a transmission unit in recording/reproducing device 940.

In a case where the video data and the audio data input from the external interface 942 are in a non-encoded state, the encoder 943 encodes the video data and the audio data. Next, the encoder 943 outputs the encoded bit stream to the selector 946.

The HDD 944 records the encoded bit stream where the content data such as video and audio are compressed, various programs, and other data in an internal hard disk. In addition, during the reproducing the video and the audio, the HDD 944 reads out the data from the hard disk.

The disk driver 945 performs recording data in the mounted recording medium and performs reading data out from the mounted recording medium. The recording medium mounted on the disk driver 945 may be, for example, a DVD disc (DVD-Video, DVD-RAM, DVD-R, DVD-RW, DVD+R, DVD+RW, or the like), a Blu-ray (registered trade mark) disc, or the like.

During the recording of the video and the audio, the selector 946 selects the encoded bit stream input from the tuner 941 or the encoder 943 and outputs the selected encoded bit stream to the HDD 944 or the disk driver 945. In addition, during the reproducing of the video and the audio, the selector 946 outputs the encoded bit stream input from the HDD 944 or the disk driver 945 to the decoder 947.

The decoder 947 decodes the encoded bit stream to generate the video data and the audio data. Next, the decoder 947 outputs the generated video data to the OSD 948. In addition, the decoder 904 outputs the generated audio data to an external speaker.

The OSD 948 reproduce the video data input from the decoder 947 and displays the video. In addition, the OSD 948 may superimpose an image of GUI such as a menu, a button, or a cursor on the displayed video.

The controller 949 is configured to include a processor such as a CPU and a memory such as RAM and ROM. The memory stores programs executed by the CPU, program data, and the like. The program stored in the memory is read out by the CPU to be executed, for example, at the time of starting up the recording/reproducing device 940. The CPU executes the program to control operations of the recording/reproducing device 940 in response to manipulation signals input from, for example, the user interface 950.

The user interface 950 is connected to the controller 949. The user interface 950 is configured to include, for example, buttons and switches by which the user manipulates the recording/reproducing device 940, a reception unit for remote control signals, or the like. The user interface 950 detects user's manipulation through these components to generate a manipulation signal and outputs the generated manipulation signal to the controller 949.

In the recording/reproducing device 940 having the configuration described above, the encoder 943 has the functions of the image encoding device 100 according to the above-described embodiment. In addition, the decoder 947 has the functions of the image decoding device 200 according to the above-described embodiment. Therefore, during the encoding and the decoding of the image in the recording/reproducing device 940, it is possible to realize a decrease in quantization error, and it is possible to suppress deterioration in image quality caused by the encoding/decoding.

Fourth Application Example

Imaging Device

Figure 32:
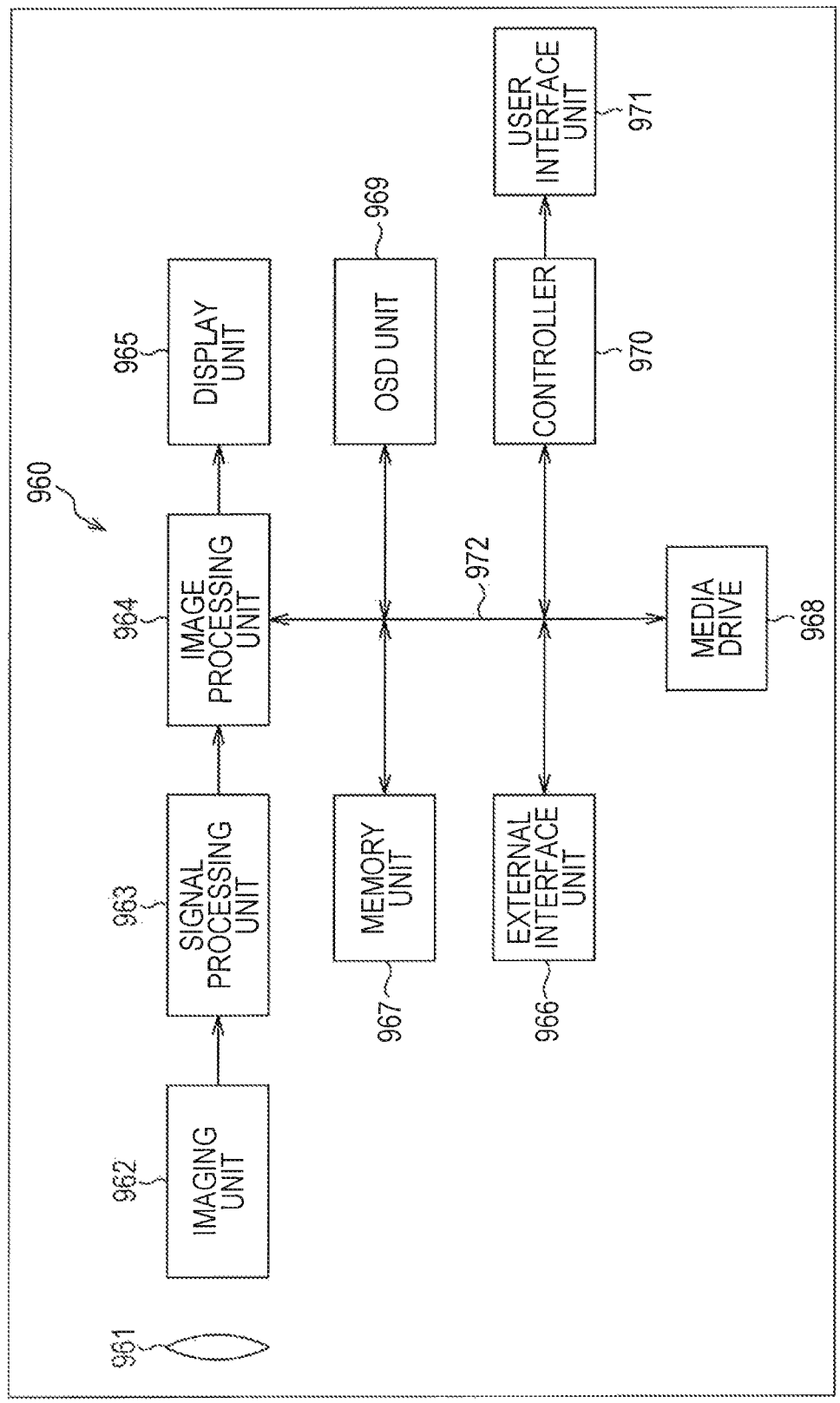
FIG. 32 is a block diagram illustrating an example of a schematic configuration of an imaging device.

FIG. 32 illustrates an example of a schematic configuration of an imaging device employing the above-described embodiments. The imaging device 960 generates an image by imaging a subject and encodes the image data and records the encoded data in the recording medium.

The imaging device 960 is configured to include an optical block 961, an imaging unit 962, a signal processing unit 963, an image processing unit 964, a display unit 965, an external interface 966, a memory 967, a media drive 968, an OSD 969, a controller 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the controller 970. The image processing unit 964, the external interface 966, the memory 967, the media drive 968, the OSD 969, and the controller 970 are connected to each other via the bus 972.

The optical block 961 is configured to include a focus lens, an aperture mechanism, and the like. The optical block 961 forms an optical image of the subject on an imaging surface of the imaging unit 962. The imaging unit 962 is configured to include an image sensor such as a CCD (Charge Coupled Device) or a CMOS (Complementary Metal Oxide Semiconductor) and converts the optical image formed on the imaging surface into image signals as electrical signals by photoelectric conversion. Next, the imaging unit 962 outputs the image signals to the signal processing unit 963.

The signal processing unit 963 performs various camera signal processes such as knee correction, gamma correction, or color correction on the image signals input from the imaging unit 962. The signal processing unit 963 outputs the image data after the camera signal process to the image processing unit 964.

The image processing unit 964 encodes the image data input from the signal processing unit 963 to generate encoded data. Next, the image processing unit 964 outputs the generated encoded data to the external interface 966 or the media drive 968. In addition, the image processing unit 964 decodes the encoded data input from the external interface 966 or the media drive 968 to generate image data. Next, the image processing unit 964 outputs the generated image data to the display unit 965. In addition, the image processing unit 964 may output the image data input from the signal processing unit 963 to the display unit 965 to display the image. In addition, the image processing unit 964 may superimpose the data for display acquired from the OSD 969 on the image output to the display unit 965.

The OSD 969 generates an image of GUI such as a menu, a button, or a cursor and outputs the generated image to the image processing unit 964.

The external interface 966 is configured as, for example, a USB input/output terminal. For example, during printing an image, the external interface 966 connects the imaging device 960 and a printer. In addition, if necessary, a drive is connected to the external interface 966. A removable medium such as a magnetic disc or an optical disc is mounted in the drive, and a program read out from the removable medium may be installed in the imaging device 960. Furthermore, the external interface 966 may be configured as a network interface which is connected to a network such as a LAN or the Internet. Namely, the external, interface 966 has a function as a transmission unit in the imaging device 960.

The recording medium mounted on the media drive 968 may be an arbitrary readable/writable removable medium such as a magnetic disc, a magneto-optical disc, an optical disc, or semiconductor memory. In addition, the recording medium is fixedly mounted on the media drive 968 and may be configured as a non-portable storage unit such as a built-in hard disk drive or an SSD (Solid State Drive).

The controller 970 is configured to include a processor such as a CPU and a memory such as RAM and ROM. The memory stores programs executed by the CPU, program data, and the like. The program stored in the memory is read out by the CPU to be executed, for example, at the time of starting up the imaging device 960. The CPU executes the program to control operations of the imaging device 960 in response to manipulation signals input from, for example, the user interface 971.

The user interface 971 is connected to the controller 970. The user interface 971 is configured to include, for example, buttons and switches by which the user manipulates imaging device 960. The user interface 971 detects user's manipulation through these components to generate a manipulation signal and outputs the generated manipulation signal to controller 970.

In the imaging device 960 having the configuration described above, the image processing unit 964 has the functions of the image encoding device 100 and the image decoding device 200 according to the above-described embodiments. Therefore, during the encoding and the decoding of the image in the imaging device 960, it is possible to realize a decrease in quantization error, and it is possible to suppress deterioration in image quality caused by the encoding/decoding.

9. Application Example of Scalable Encoding

First System

Next, a specific example of use of scalable encoded data which are scalable-encoded (hierarchically encoded). The scalable encoding is used to select transmission data, for example, like an example illustrated in FIG. 33.

Figure 33:
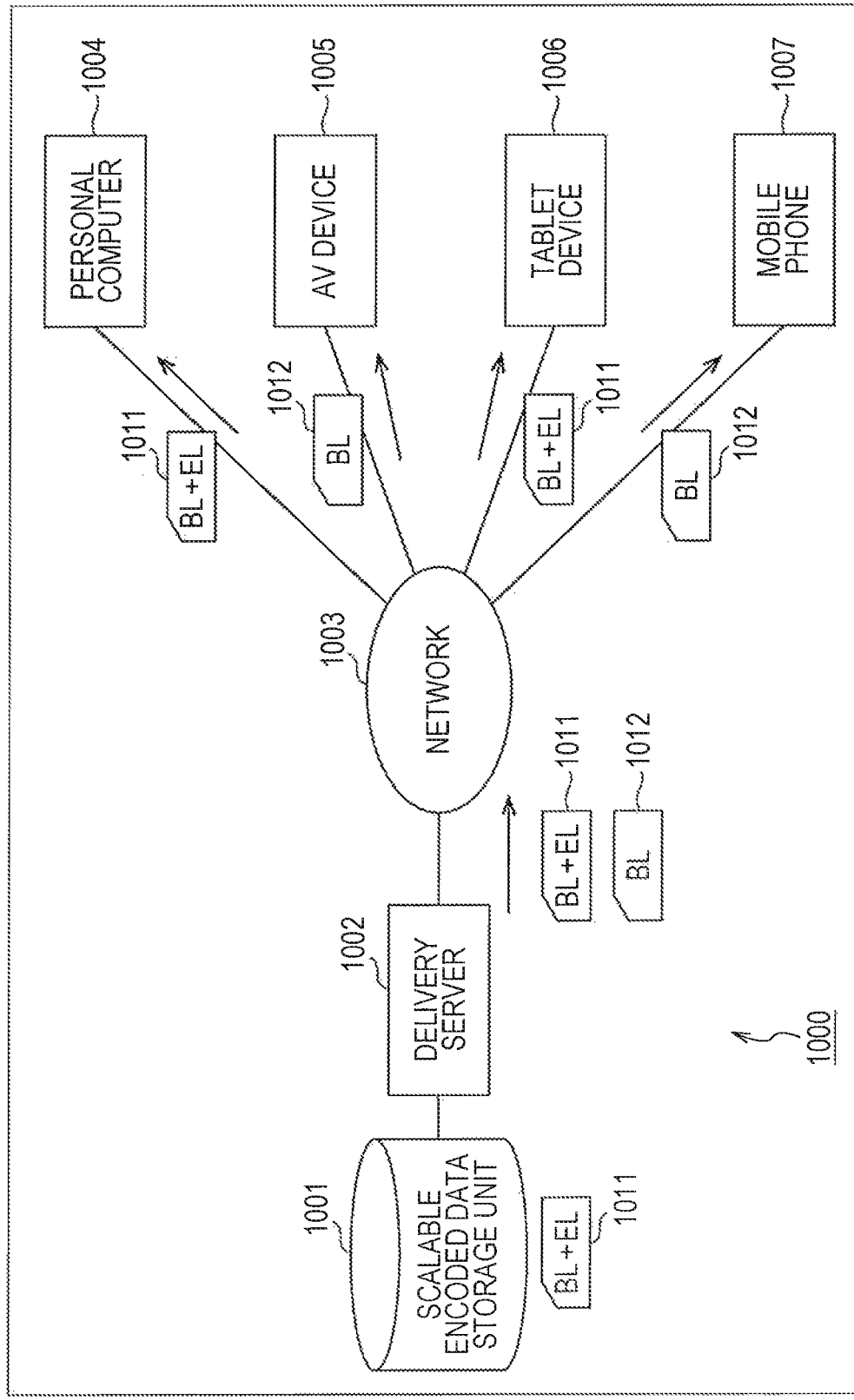
FIG. 33 is a block diagram illustrating an example of the use of scalable encoding.

In a data transmission system 1000 illustrated in FIG. 33, a delivery server 1002 reads out scalable encoded data stored in a scalable encoded data storage unit 1001 and delivers the scalable encoded data through a network 1003 to a personal computer 1004, an AV device 1005, a tablet device 1006, and a mobile phone 1007.

In this case, the delivery server 1002 selectively transmits the encoded data having appropriate quality according to the capability of the terminal device, communication environment, and the like. Even though the delivery server 1002 transmits unnecessarily high quality data, there is a risk in that an image having a high image quality may not necessarily be obtained in the terminal device, and it becomes a cause of occurrence of delay or overflow. In addition, there is a risk in that a communication band is unnecessarily occupied or a load of the terminal device is unnecessarily increased. On the contrary, even although the delivery server 1002 transmits unnecessarily low quality data, there is a risk in that an image having a sufficient image quality may not be obtained in the terminal device. Therefore, the delivery server 1002 reads out and transmits the scalable encoded data stored in the scalable encoded data storage unit 1001 appropriately as encoded data having a quality appropriate for the capability of the terminal device, communication environment, and the like.

For example, the scalable encoded data storage unit 1001 stores scalable encoded data (BL+EL) 1011 which are scalable-encoded. The scalable encoded data (BL+EL) 1011 are encoded data including encoded data of both of the base layer and the enhancement layer, and by decoding the data, both of the image of the base layer and the image of the enhancement layer can be obtained.

The delivery server 1002 selects an appropriate layer according to the capability of the terminal device which transmits data, communication environment, and the like and reads out the data of the layer. For example, with respect to the personal computer 1004 or the tablet device 1006 having high processing capability, the delivery server 1002 reads out the scalable encoded data (BL+EL) 1011 having high quality from the scalable encoded data storage unit 1001 and transmits the scalable encoded data without change. On the contrary, for example, with respect to the AV device 1005 or the mobile phone 1007 having low processing capability, the delivery server 1002 extracts the data of the base layer from the scalable encoded data (BL+EL) 1011 and transmits scalable encoded data (BL) 1012 which has the same content as the scalable encoded data (BL+EL) 1011 but has lower quality than the scalable encoded data (BL EL) 1011.

Since the data amount can be easily adjusted by using the scalable encoded data in this manner, it is possible to suppress the occurrence of delay or overflow, and it is possible to suppress an unnecessary increase in load to the terminal device or the communication medium. In addition, since the redundancy between layers in the scalable encoded data (BL+EL) 1011 is reduced, in comparison to a case where the encoded data of each layer are treated as individual data, it is possible to reduce the data amount. Therefore, it is possible to more efficiently use the storage area of the scalable encoded data storage unit 1001.

Furthermore, since various devices such as the personal computer 1004 and the mobile phone 1007 are applied as the terminal device, the performance of hardware of the terminal device is different among the devices. In addition, since the application executed by the terminal device is also various, the performance of the software is also various. Furthermore, all kinds of communication networks including wired or wireless networks such as the internet or a LAN (Local Area Network) or both of wired and wireless networks can be applied to the network 1003 which is a communication medium, and the data transmission capability is various. Furthermore, there is a risk in that the data transmission capability may be changed by other communication or the like.

Therefore, before the delivery server starts data transmission, the delivery server 1002 may communicate with a terminal device which is to be a data transmission destination to obtain information on the capability of the terminal device such as hardware performance of the terminal device, performance of application (software) executed by the terminal device, and the like and information on the communication environment such as an available bandwidth of the network 1003. In addition, the delivery server 1002 may select an appropriate layer based on the obtained information.

Furthermore, the extraction of layer may be performed in the terminal device. For example, the personal computer 1004 may decode the transmitted scalable encoded data (BL+EL) 1011 to display the image of the base layer or to display the image of the enhancement layer. In addition, for example, the personal computer 1004 may extract the scalable encoded data (BL) 1012 of the base layer from the transmitted scalable encoded data (BL+EL) 1011 to store, to transmit to other devices, or to decode to display the image of the base layer.

Of course, the number of scalable encoded data storage units 1001, the number of delivery servers 1002, the number of networks 1003, and the number of terminal devices are arbitrary. In addition, heretofore, the example where the delivery server 1002 transmits data to the terminal device is described, but the example of use is not limited thereto. The data transmission system 1000 may be applied to an arbitrary system which selects an appropriate layer according to the capability of a terminal device, communication environment and transmits encoded data at the time of transmitting the encoded data which is scalable-encoded to the terminal device.

Second System

Figure 34:
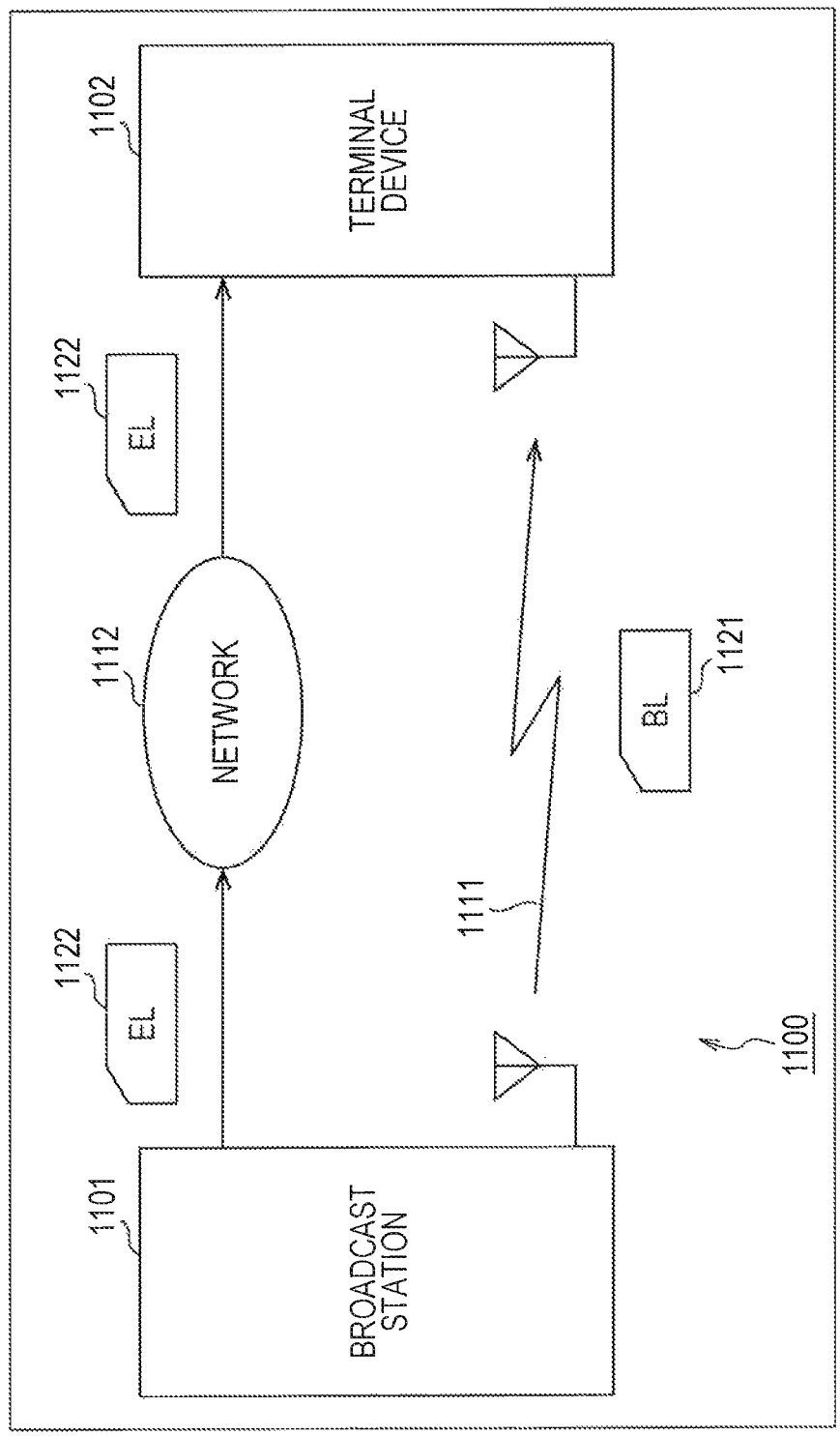
FIG. 34 is a block diagram illustrating another example of the use of scalable encoding.

In addition, the scalable encoding is used for transmission through multiple communication media, for example, like an example illustrated in FIG. 34.

In a data transmission system 1100 illustrated in FIG. 34, a broadcast station 1101 transmits scalable encoded data (BL) 1121 of a base layer through terrestrial broadcast 1111. In addition, the broadcast station 1101 transmits scalable encoded data (EL) 1122 of an enhancement layer through an arbitrary network 1112 which is a communication network including wired or wireless network or both of wired and wireless networks (for example, packetizes and transmits).

A terminal device 1102 has a reception function for the terrestrial broadcast 1111 broadcast by the broadcast station 1101 to receive the transmitted scalable encoded data (BL) 1121 of the base layer through the terrestrial broadcast 1111.

In addition, the terminal device 1102 has a communication function of performing communication through the network 1112 to receive the transmitted scalable encoded data (EL) 1.122 of the enhancement layer through the network 1112.

The terminal device 1102 decodes the scalable encoded data (BL) 1121 of the base layer acquired through the terrestrial broadcast 1111 to obtain the image of the base layer, to store, or to transmit to other devices, for example, in response to a user's instruction.

In addition, the terminal device 1102 combines the scalable encoded data (BL) 1121 of the base layer acquired through the terrestrial broadcast 1112 and the scalable encoded data (EL) 1122 of the enhancement layer acquired through the network 1112 to obtain scalable encoded data (BL+EL), to decode to obtain the image of the enhancement layer, to store, or to transmit to other devices, for example, in response to a user's instruction.

As described, the scalable encoded data may be transmitted, for example, through different communication medium for each layer. Therefore, it is possible to share the load, and it is possible to suppress the occurrence of delay or overflow.

In addition, the communication medium used for transmission may be selected for each layer according to situation. For example, the scalable encoded data (BL) 1121 of the base layer of which data amount is relatively large may be transmitted through a communication medium having a wide bandwidth, and the scalable encoded data (EL) 1122 of the enhancement layer of which data amount is relatively small may be transmitted through a communication medium having a narrow bandwidth. In addition, for example, it may be switched according to the available bandwidth of the network 1112 whether the communication medium through which the scalable encoded data (EL) 1122 of the enhancement layer is to be transmitted is set to the network 1112 or to the terrestrial broadcast 1111. Of course, with respect to data of an arbitrary layer, the same configuration is applied.

By controlling in this manner, it is possible to further suppress an increase in load in the data transmission.

Of course, the number of layers is arbitrary, and the number of communication media which are to be used for transmission is also arbitrary. In addition, the number of terminal devices 1102 which is to be data transmission destination is also arbitrary. Furthermore, heretofore, the example of broadcast from the broadcast station 1101 is described, but the example of use is not limited thereto. The data transmission system 1100 may be applied to an arbitrary system which divides encoded data which are scalable-encoded into multiple units and transmits the encoded data through multiple transmission lines.

Third System

Figure 35:
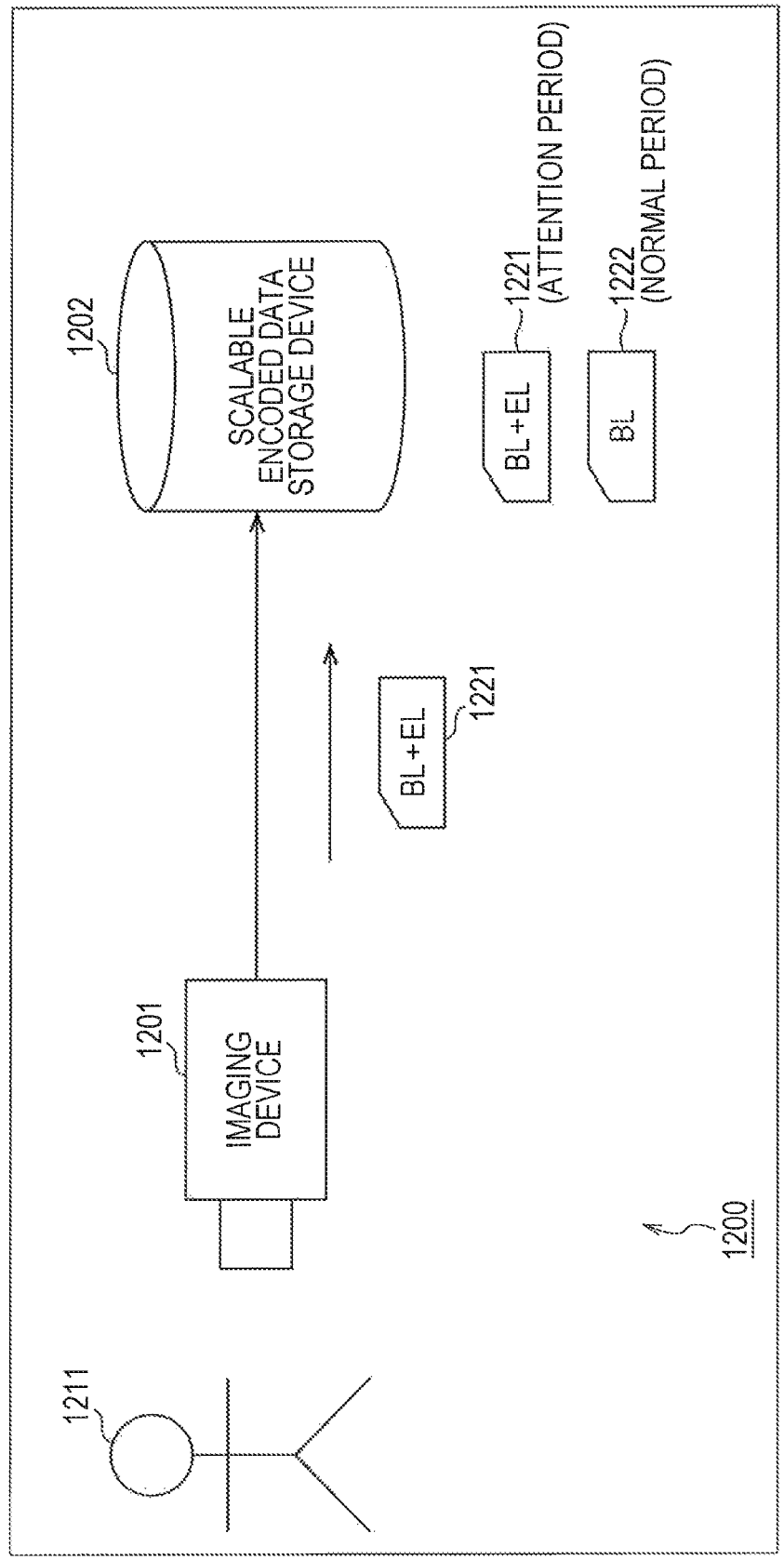
FIG. 35 is a block diagram illustrating still another example of the use of scalable encoding.

In addition, the scalable encoding is used for storing the encoded data, for example, like an example illustrated in FIG. 35.

In an imaging system 1200 illustrated in FIG. 35, an imaging device 1201 performs scalable encoding on image data obtained by imaging a subject 1211 and supplies scalable encoded data (BL+EL) 1221 to a scalable encoded data storage device 1202.

The scalable encoded data storage device 1202 stores the scalable encoded data (BL+EL) 1221 supplied from the imaging device 1201 with a quality according to situation. For example, in a normal period, the scalable encoded data storage device 1202 extracts the data of the base layer from the scalable encoded data (BL+EL) 1221 and stores as the scalable encoded data (BL) 1222 of the base layer having small data amount with low quality. On the contrary, for example, in an attention period, the scalable encoded data storage device 1202 stores the scalable encoded data (BL+EL) 1221 having large data amount with high quality without change.

By doing in this manner, since the scalable encoded data storage device 1202 stores the image with high quality only if necessary, it is possible to suppress a reduction in value of the image caused by deterioration in image quality, to suppress an increase in data amount, and to improve utilization efficiency of the storage area.

For example, the imaging device 1201 is assumed to be a surveillance camera. In a case where a monitoring object (for example, intruder) is not reflected on a captured image (in the case of a normal period), the content of the captured image is highly likely not to be important, and thus, priority is given to a reduction in data amount. Therefore, the image data (scalable encoded data) are stored with low quality. On the contrary, in a case where the monitoring subject is reflected as the subject 1211 on the captured image (in the case of an attention period), the content of the captured image is highly likely to be important, priority is given to image quality. The image data (scalable encoded data) are stored with high quality.

Furthermore, it may be determined, for example, by the scalable encoded data storage device 1202 analyzing the image whether the period is the normal period or the attention period. In addition, the imaging device 1201 may perform the determination and transmits the determination result to the scalable encoded data storage device 1202.

Furthermore, a criterion of determination as to whether the period is the normal period or the attention period is arbitrary, and the content of the image used as the criterion of determination is arbitrary. Of course, conditions other than the content of the image may also be used as the criterion of determination. For example, it may be switched according to a size, waveform, or the like of recorded audio, it may be switched at every predetermined time interval, or it may be switched in response to an external instruction such as a user's instruction.

In addition, heretofore, the example where two states of the normal period and the attention period are switched is described, but the number of states is arbitrary. For example, three or more states of a normal period, a little attention period, attention period, a much attention period, and the like may be switched. Herein, the upper limit of the number of states depends on the number of layers of the scalable encoded data.

In addition, the imaging device 1201 may determine the number of layers in the scalable encoding according to the states. For example, in the case of the normal period, the imaging device 1201 generates the scalable encoded data (BL) 1222 of the base layer having a small data amount with low quality and supplies the scalable encoded data (BL) to scalable encoded data storage device 1202. In addition, for example, in the case of the attention period, the imaging device 1201 generates the scalable encoded data (BL+EL) 1221 of the base layer having a large data amount with high quality and supplies the scalable encoded data (BL+EL) 1221 to the scalable encoded data storage device 1202.

Heretofore, the example of a surveillance camera is described, but the use of the imaging system 1200 is arbitrary and is not limited to the surveillance camera.

Furthermore, in the specification, the example where various types of information such as skip enabling information or skip identifying information are multiplexed into an encoded stream and the multiplexed encoded stream is transmitted from the encoding side to the decoding side is described. However, the transmission method for the information is not limited to the example. For example, the information may be transmitted or recorded as separate data associated with the encoded bit stream without being duplexes into the encoded bit stream. Herein, the phrase "associated with" denotes that an image (including a portion of an image, for example, a slice, a block, or the like) included in a bit stream and information corresponding to the image are able to be linked to each other during decoding. Namely, the information may be transmitted in a transmission line different from that for the image (or bit stream). In addition, the information may be stored in a recording medium different from that for the image (or bit stream) (or in a different recording area of the same recording medium). Furthermore, the information and the image (or bit stream) may be associated with each other, for example, in units of multiple frames, one frame, or a portion inside a frame, namely, in an arbitrary unit.

Heretofore, while the preferred embodiments of the present disclosure are described with reference to the attached drawings, the present disclosure is not limited the examples. It is obvious that various modifications or changes can be contrived within the scope of the technical spirit disclosed in the claims by the ordinarily skilled in the technical field to which the present disclosure belongs, and it should be understood that these are included in the technical scope of the present disclosure.

Furthermore, the present technique may have the following configurations.

(1) An image processing device including:
a setting unit which, in decoding of encoded data where image data are encoded, in a case where a current block is a block on which an orthogonal transform process is skipped, sets a custom scaling list for the block on which the orthogonal transform process is skipped as a scaling list used for an inverse quantization process on the current block; and
a decoding unit which performs a decoding process including the inverse quantization process using the scaling list set by the setting unit and decodes the encoded data.

(2) The image processing device according to any of (1) to (9), wherein the custom scaling list is configured so that a quantization step of a portion corresponding to a pixel which has a possibility to be referred to in intra prediction is smaller than a quantization step of a portion corresponding to a pixel which has no possibility to be referred to in the intra prediction.

(3) The image processing device according to any of (1) to (9), wherein the custom scaling list is configured so that the quantization step of the portion corresponding to the pixel which has a possibility to be referred to in the intra prediction is set to be smaller than a value in the case of a default custom scaling list or so that the quantization step of the portion corresponding to the pixel which has no possibility to be referred to in the intra prediction is set to be larger than the value in the case of the default custom scaling list.

(4) The image processing device according to any of (1) to (9), wherein each quantization step of the portion corresponding to the pixel which has a possibility to be referred to in the intra prediction of the custom scaling list has a value according to the level of the possibility that the corresponding pixel is referred to in the intra prediction.

(5) The image processing device according to any of (1) to (9), wherein, in a case where the current block is a block on which the orthogonal transform process is not skipped, the setting unit sets a default scaling list where all values of quantization steps are the same or a quantization step of a pixel corresponding to a high frequency component has a large value as the scaling list used for the inverse quantization process on the current block.

(6) The image processing device according to any of (1) to (9), further including an end detection unit which detects an end of a reference available range in the intra prediction,
wherein, in a case where the current block is a block in the end of the reference available range detected by the end detection unit, the setting unit sets the custom scaling list according to a position of the end of the reference available range as the scaling list used for the inverse quantization process on the current block.

(7) The image processing device according to any of (1) to (9), further including:
a reception unit which receives information on the skip of the orthogonal transform process; and
a determination unit which determines based on the information on the skip of the orthogonal transform process which received by the reception unit whether or not the current block is the block on which the orthogonal transform process is skipped,
wherein, in a case where it is determined by the determination unit that the current block is the block on which the orthogonal transform process is skipped, the setting unit sets the custom scaling list as the scaling list used for the inverse quantization process on the current block.

(8) The image processing device according to any of (1) to (9), wherein, in a case where a value of skip enabling information which is included in the information on the skip of the orthogonal transform process and indicates as to whether to enable the skip of the orthogonal transform process in a picture is false, the determination unit disables the skip of the orthogonal transform process in the picture.

(9) The image processing device according to any of (1) to (9),
wherein the determination unit further determines a slice type of the current block, and
wherein, in a case where it is determined by the determination unit that the current block is the block on which the orthogonal transform process is skipped and the current slice is a slice on which only the intra prediction is performed, the setting unit sets the custom scaling list as the scaling list used for the inverse quantization process on the current block.

(10) An image processing method of an image processing device, including:
by the image processing device,
in decoding of encoded data where image data are encoded, in a case where a current block Is a block on which an orthogonal transform process is skipped, setting a custom scaling list for the block on which the orthogonal transform process is skipped as a scaling list used for an inverse quantization process on the current block; and
performing a decoding process including the inverse quantization process using the set scaling list and decoding the encoded data.

(11) An image processing device including:
a setting unit which, in encoding of image data, in a case where an orthogonal transform process on a current block is skipped, sets a custom scaling list for a block on which the orthogonal transform process is skipped as a scaling list used for a quantization process on the current block; and
an encoding unit which performs an encoding process including the quantization process using the scaling list set by the setting unit and encodes the image data.

(12) The image processing device according to any of (11) to (19), wherein the custom scaling list is configured so that a quantization step of a portion corresponding to a pixel which has a possibility to be referred to in intra prediction is smaller than a quantization step of a portion corresponding to a pixel which has no possibility to be referred to in the intra prediction.

(13) The image processing device according to any of (11) to (19), wherein the custom scaling list is configured so that the quantization step of the portion corresponding to the pixel which has a possibility to be referred to in the intra prediction is set to be smaller than a value in the case of a default custom scaling list or so that the quantization step of the portion corresponding to the pixel which has no possibility to be referred to in the intra prediction is set to be larger than the value in the case of the default custom scaling list.

(14) The image processing device according to any of (11) to (19), wherein each quantization step of the portion corresponding to the pixel which has a possibility to be referred to in the intra prediction of the custom scaling list has a value according to the level of the possibility that the corresponding pixel is referred to in the intra prediction.

(15) The image processing device according to any of (11) to (19), wherein in a case where the current block is a block on which the orthogonal transform process is not skipped, the setting unit sets a default scaling list where all values of quantization steps are the same or a quantization step of a pixel corresponding to a high frequency component has a large value as the scaling list used for the quantization process on the current block.

(16) The image processing device according to any of (11) to (19), further including an end detection unit which detects an end of a reference available range in the intra prediction,
wherein, in a case where the current block is a block in the end of the reference available range detected by the end detection unit, the setting unit sets the custom scaling list according to a position of the end of the reference available range as the scaling list used for the quantization process on the current block.

(17) The image processing device according to any of (11) to (19), further including a determination unit which determines based on the information on the skip of the orthogonal transform process whether or not the orthogonal transform process on the current block is skipped,
wherein, in a case where it is determined by the determination unit that the orthogonal transform process on the current block is skipped, the setting unit sets the custom scaling list as the scaling list used for the quantization process on the current block.

(18) The image processing device according to any of (11) to (19), wherein, in a case where a value of skip enabling information which is included in the information on the skip of the orthogonal transform process and indicates as to whether to enable the skip of the orthogonal transform process in a picture is false, the determination unit disables the skip of the orthogonal transform process in the picture.

(19) The image processing device according to any of (11) to (19),
wherein the determination unit further determines a slice type of the current block, and
wherein, in a case where it is determined by the determination unit that the current block is the block on which the orthogonal transform process is skipped and the current slice is a slice on which only the intra prediction is performed, the setting unit sets the custom scaling list as the scaling list used for the quantization process on the current block.

(20) An image processing method of an image processing device, including:
by the image processing device,
in encoding of image data, in a case where an orthogonal transform process on a current block is skipped, setting a custom scaling list for a block on which the orthogonal transform process is skipped as a scaling list used for a quantization process on the current block; and
performing an encoding process including the quantization process using the set scaling list and encoding the image data.

REFERENCE SIGNS LIST

100 Image encoding device
114 Orthogonal transform unit
115 Quantization unit
116 Lossless encoding unit
118 Inverse quantization unit
119 Inverse orthogonal transform unit
131 Orthogonal transform skip unit
132 Quantization controller
151 Determination unit
152 Scaling list setting unit
200 Image decoding device
212 Lossless decoding unit
213 Inverse quantization unit
214 Inverse orthogonal transform unit
231 Inverse orthogonal transform skip unit
232 Inverse quantization controller
251 Determination unit
252 Scaling list setting unit
301 Slice end detection unit
401 Slice end detection unit

The invention claimed is:

1. An image processing device comprising:
a setting unit which, in decoding of encoded data where image data are encoded, in a case where a current block is a block on which an orthogonal transform process is skipped, sets a custom scaling list for the block on which the orthogonal transform process is skipped as a scaling list used for an inverse quantization process on the current block; and
a decoding unit which performs a decoding process including the inverse quantization process using the scaling list set by the setting unit and decodes the encoded data,
wherein the custom scaling list is configured so that a quantization step of a portion corresponding to a pixel which has a possibility to be referred to in intra prediction is set to be smaller than a value in case of a default custom scaling list or so that a quantization step of a portion corresponding to a pixel which has no possibility to be referred to in the intra prediction is set to be larger than the value in the case of the default custom scaling list,
wherein each quantization step of the portion corresponding to the pixel which has the possibility to be referred to in the intra prediction of the custom scaling list has a value according to a level of the possibility that the corresponding pixel is referred to in the intra prediction, and
wherein the setting unit and the decoding unit are each implemented via at least one processor.

2. The image processing device according to claim 1, wherein the custom scaling list is configured so that the quantization step of the portion corresponding to the pixel which has the possibility to be referred to in intra prediction is smaller than the quantization step of the portion corresponding to the pixel which has no possibility to be referred to in the intra prediction.

3. The image processing device according to claim 1, wherein, in a case where the current block is a block on which the orthogonal transform process is not skipped, the setting unit sets a default scaling list where all values of quantization steps are the same or a quantization step of a pixel corresponding to a high frequency component has a large value as the scaling list used for the inverse quantization process on the current block.

4. The image processing device according to claim 1, further comprising an end detection unit which detects an end of a reference available range in the intra prediction,
wherein, in a case where the current block is a block in the end of the reference available range detected by the end detection unit, the setting unit sets the custom scaling list according to a position of the end of the reference available range as the scaling list used for the inverse quantization process on the current block,
wherein the end detection unit is implemented via at least one processor.

5. The image processing device according to claim 1, further comprising:
a reception unit which receives information on the skip of the orthogonal transform process; and
a determination unit which determines based on the information on the skip of the orthogonal transform process which received by the reception unit whether or not the current block is the block on which the orthogonal transform process is skipped,
wherein, in a case where it is determined by the determination unit that the current block is the block on which the orthogonal transform process is skipped, the setting unit sets the custom scaling list as the scaling list used for the inverse quantization process on the current block,
wherein the reception unit and the determination unit are each implemented via at least one processor.

6. The image processing device according to claim 5, wherein, in a case where a value of skip enabling information which is included in the information on the skip of the orthogonal transform process and indicates as to whether to enable the skip of the orthogonal transform process in a picture is false, the determination unit disables the skip of the orthogonal transform process in the picture.

7. The image processing device according to claim 5,
wherein the determination unit further determines a slice type of the current block, and
wherein, in a case where it is determined by the determination unit that the current block is the block on which the orthogonal transform process is skipped and the current slice is a slice on which only the intra prediction is performed, the setting unit sets the custom scaling list as the scaling list used for the inverse quantization process on the current block.

8. An image processing method of an image processing device, the method being executed via at least one processor and comprising:
by the image processing device,
in decoding of encoded data where image data are encoded, in a case where a current block is a block on which an orthogonal transform process is skipped, setting a custom scaling list for the block on which the orthogonal transform process is skipped as a scaling list used for an inverse quantization process on the current block; and
performing a decoding process including the inverse quantization process using the set scaling list and decoding the encoded data,
wherein the custom scaling list is configured so that a quantization step of a portion corresponding to a pixel which has a possibility to be referred to in intra prediction is set to be smaller than a value in case of a default custom scaling list or so that a quantization step of a portion corresponding to a pixel which has no possibility to be referred to in the intra prediction is set to be larger than the value in the case of the default custom scaling list, and
wherein each quantization step of the portion corresponding to the pixel which has the possibility to be referred to in the intra prediction of the custom scaling list has a value according to a level of the possibility that the corresponding pixel is referred to in the intra prediction.

9. An image processing device comprising:
a setting unit which, in encoding of image data, in a case where an orthogonal transform process on a current block is skipped, sets a custom scaling list for a block on which the orthogonal transform process is skipped as a scaling list used for a quantization process on the current block; and
an encoding unit which performs an encoding process including the quantization process using the scaling list set by the setting unit and encodes the image data,
wherein the custom scaling list is configured so that a quantization step of a portion corresponding to a pixel which has a possibility to be referred to in intra prediction is set to be smaller than a value in case of a default custom scaling list or so that a quantization step of a portion corresponding to a pixel which has no possibility to be referred to in the intra prediction is set to be larger than the value in the case of the default custom scaling list,
wherein each quantization step of the portion corresponding to the pixel which has the possibility to be referred to in the intra prediction of the custom scaling list has a value according to a level of the possibility that the corresponding pixel is referred to in the intra prediction, and
wherein the setting unit and the encoding unit are each implemented via at least one processor.

10. The image processing device according to claim 9, wherein the custom scaling list is configured so that the quantization step of the portion corresponding to the pixel which has the possibility to be referred to in intra prediction is smaller than the quantization step of the portion corresponding to the pixel which has no possibility to be referred to in the intra prediction.

11. The image processing device according to claim 9, wherein in a case where the current block is a block on which the orthogonal transform process is not skipped, the setting unit sets a default scaling list where all values of quantization steps are the same or a quantization step of a pixel corresponding to a high frequency component has a large value as the scaling list used for the quantization process on the current block.

12. The image processing device according to claim 9, further comprising an end detection unit which detects an end of a reference available range in the intra prediction, wherein, in a case where the current block is a block in the end of the reference available range detected by the end detection unit, the setting unit sets the custom scaling list according to a position of the end of the reference available range as the scaling list used for the quantization process on the current block, wherein the end detection unit is implemented via at least one processor.

13. The image processing device according to claim 9, further comprising a determination unit which determines based on the information on the skip of the orthogonal transform process whether or not the orthogonal transform process on the current block is skipped, wherein, in a case where it is determined by the determination unit that the orthogonal transform process on the current block is skipped, the setting unit sets the custom scaling list as the scaling list used for the quantization process on the current block, wherein the determination unit is implemented via at least one processor.

14. The image processing device according to claim 13, wherein, in a case where a value of skip enabling information which is included in the information on the skip of the orthogonal transform process and indicates as to whether to enable the skip of the orthogonal transform process in a picture is false, the determination unit disables the skip of the orthogonal transform process in the picture.

15. The image processing device according to claim 13, wherein the determination unit further determines a slice type of the current block, and wherein, in a case where it is determined by the determination unit that the current block is the block on which the orthogonal transform process is skipped and the current slice is a slice on which only the intra prediction is performed, the setting unit sets the custom scaling list as the scaling list used for the quantization process on the current block.

16. An image processing method of an image processing device, the method being executed via at least one processor, and comprising:

by the image processing device, in encoding of image data, in a case where an orthogonal transform process on a current block is skipped, setting a custom scaling list for a block on which the orthogonal transform process is skipped as a scaling list used for a quantization process on the current block; and performing an encoding process including the quantization process using the set scaling list and encoding the image data, wherein the custom scaling list is configured so that a quantization step of a portion corresponding to a pixel which has a possibility to be referred to in intra prediction is set to be smaller than a value in case of a default custom scaling list or so that a quantization step of a portion corresponding to a pixel which has no possibility to be referred to in the intra prediction is set to be larger than the value in the case of the default custom scaling list, and wherein each quantization step of the portion corresponding to the pixel which has the possibility to be referred to in the intra prediction of the custom scaling list has a value according to a level of the possibility that the corresponding pixel is referred to in the intra prediction.

\* \* \* \* \*